US012507009B2

(12) United States Patent
Nelson et al.

(10) Patent No.: US 12,507,009 B2
(45) Date of Patent: Dec. 23, 2025

(54) SYSTEMS AND METHODS FOR CORRECTING SOUND LOSS THROUGH PARTIALLY ACOUSTICALLY TRANSPARENT MATERIALS

(71) Applicant: THE LOVESAC COMPANY, Stamford, CT (US)

(72) Inventors: Shawn Nelson, Washington, UT (US); David Underwood, Hurricane, UT (US); Brian Kuchler, Hurricane, UT (US); Clint Gibson, St. George, UT (US)

(73) Assignee: THE LOVESAC COMPANY, Stamford, CT (US)

( * ) Notice: Subject to any disclaimer, the term of this patent is extended or adjusted under 35 U.S.C. 154(b) by 0 days.

(21) Appl. No.: 18/178,319

(22) Filed: Mar. 3, 2023

(65) Prior Publication Data

US 2023/0209263 A1 Jun. 29, 2023

Related U.S. Application Data

(63) Continuation-in-part of application No. 17/491,858, filed on Oct. 1, 2021, and a continuation-in-part of (Continued)

(51) Int. Cl.
*H04R 5/02* (2006.01)
*A47C 7/72* (2006.01)
(Continued)

(52) U.S. Cl.
CPC ............... *H04R 5/023* (2013.01); *A47C 7/72* (2013.01); *A47C 7/727* (2018.08); (Continued)

(58) Field of Classification Search
CPC .... H04R 5/023; H04R 1/025; H04R 2420/07; A47C 7/727; A47C 7/72; A61H 23/0236
(Continued)

(56) References Cited

U.S. PATENT DOCUMENTS

| | | | |
|---|---|---|---|
| 988,059 | A | 3/1911 | Allen |
| 2,625,983 | A | 1/1953 | Raymond et al. |

(Continued)

FOREIGN PATENT DOCUMENTS

| | | | |
|---|---|---|---|
| CN | 2236262 | Y | 10/1996 |
| CN | 101005741 | A | 7/2007 |

(Continued)

OTHER PUBLICATIONS

Corrected Notice of Allowability Mailed on Aug. 16, 2023 for U.S. Appl. No. 17/348,088, 6 pages.

(Continued)

*Primary Examiner* — Ammar T Hamid
(74) *Attorney, Agent, or Firm* — Polsinelli PC

(57) ABSTRACT

An audio-enhanced furniture system comprises: a furniture assembly having a partially acoustically transparent material, such as an upholstery fabric or a perforated, rigid structure that is perforated in order to be more acoustically transparent; and a speaker system positioned within the furniture assembly, the speaker system including a speaker covered by the partially acoustically transparent material. The speaker is configured to be tuned to compensate for sound being emitted from the speaker through the perforated partially acoustically transparent material.

28 Claims, 21 Drawing Sheets

Related U.S. Application Data application No. 17/348,088, filed on Jun. 15, 2021, now Pat. No. 11,832,039, said application No. 17/491,858 is a continuation-in-part of application No. 16/696,696, filed on Nov. 26, 2019, now Pat. No. 11,178,486, which is a continuation-in-part of application No. 16/273,773, filed on Feb. 12, 2019, now Pat. No. 11,172,301, which is a continuation of application No. 15/348,068, filed on Nov. 10, 2016, now Pat. No. 10,212,519, which is a continuation-in-part of application No. 15/270,339, filed on Sep. 20, 2016, now Pat. No. 10,236,643.

(60) Provisional application No. 63/173,899, filed on Apr. 12, 2021, provisional application No. 62/417,091, filed on Nov. 3, 2016, provisional application No. 62/257,623, filed on Nov. 19, 2015.

(51) Int. Cl.
*A61H 23/02* (2006.01)
*H04R 1/02* (2006.01)

(52) U.S. Cl.
CPC ......... *A61H 23/0236* (2013.01); *H04R 1/025* (2013.01); *H04R 2201/028* (2013.01); *H04R 2420/07* (2013.01)

(58) Field of Classification Search
USPC .................................................. 381/301, 300
See application file for complete search history.

(56) References Cited

U.S. PATENT DOCUMENTS 2,653,648 A 9/1953 Marshall
3,113,633 A 12/1963 Eberhardt et al.
3,870,297 A 3/1975 Elder
3,880,152 A 4/1975 Nohmura
3,893,731 A 7/1975 Maggs
4,120,017 A 10/1978 Sickles
4,124,249 A 11/1978 Abbeloos
4,321,717 A 3/1982 Serra
4,507,816 A 4/1985 Smith, Jr.
4,734,946 A 4/1988 Saputo
4,846,525 A 7/1989 Manning
5,106,153 A 4/1992 Durling
5,133,017 A 7/1992 Cain et al.
5,173,943 A 12/1992 Dzurko
5,362,296 A 11/1994 Wang et al.
5,367,727 A 11/1994 Dyer, Jr.
5,368,359 A 11/1994 Eakin
5,397,727 A 3/1995 Lee et al.
5,544,938 A 8/1996 Saul et al.
5,624,156 A 4/1997 Leal et al.
5,681,179 A 10/1997 Lane
5,683,139 A 11/1997 Golynsky et al.
5,735,573 A 4/1998 Vredevoogd
5,740,564 A 4/1998 Hankins et al.
5,790,993 A 8/1998 Roma et al.
5,828,766 A 10/1998 Gallo
5,895,365 A 4/1999 Tomlinson
5,967,820 A 10/1999 Siegal et al.
5,995,634 A 11/1999 Zwolski
6,000,353 A 12/1999 De Leu
6,000,758 A 12/1999 Schaffner et al.
6,073,723 A 6/2000 Gallo
6,092,867 A 7/2000 Miller
6,322,146 B1 11/2001 Fisher, Jr.
6,683,965 B1 1/2004 Sapiejewski
6,814,709 B2 11/2004 Schwartz et al.
7,003,832 B2 2/2006 Wilson
7,090,297 B2 8/2006 Mohn et al.
7,164,255 B2 1/2007 Hui
7,172,196 B2 2/2007 Randall
7,213,885 B2 5/2007 White, III et al.
D547,087 S 7/2007 Natuzzi
7,312,393 B2 12/2007 McCarthy
7,385,357 B2 6/2008 Kuennen et al.
7,419,220 B2 9/2008 White et al.
7,421,608 B2 9/2008 Schron
7,547,073 B2 6/2009 White et al.
7,553,288 B2 6/2009 Cohen
7,575,279 B2 8/2009 Robertson
7,631,937 B2 12/2009 Robertson
7,699,389 B2 4/2010 Robertson
7,735,912 B2 6/2010 Robertson
7,766,421 B2 8/2010 Lawson
7,825,625 B2 11/2010 Posamentier
7,868,587 B2 1/2011 Stevens et al.
7,871,280 B2 1/2011 Henriott
7,918,308 B2 4/2011 Cohen
7,963,612 B2 6/2011 Nelson
7,982,436 B2 7/2011 Randall
8,004,235 B2 8/2011 Baarman et al.
8,035,340 B2 10/2011 Stevens et al.
8,061,864 B2 11/2011 Metcalf et al.
8,074,581 B2 12/2011 Epstein et al.
8,097,984 B2 1/2012 Baarman et al.
8,132,856 B2 3/2012 Wilson et al.
8,146,229 B2 4/2012 Henriott et al.
8,188,854 B2 5/2012 Yamashita
8,228,026 B2 7/2012 Johnson et al.
8,258,653 B2 9/2012 Kitamura et al.
8,290,463 B2 10/2012 Liu et al.
8,299,753 B2 10/2012 Hui
8,324,759 B2 12/2012 Karalis et al.
8,330,414 B2 12/2012 Takahashi et al.
8,344,552 B2 1/2013 Cook et al.
RE44,038 E 3/2013 Cho
8,421,407 B2 4/2013 Johnson
8,427,011 B2 4/2013 Jung et al.
8,446,046 B2 5/2013 Fells et al.
8,471,410 B2 6/2013 Karalis et al.
8,519,668 B2 8/2013 Hui
8,552,593 B2 10/2013 Jung et al.
8,554,165 B2 10/2013 Liu et al.
8,618,697 B2 12/2013 Karaoguz et al.
RE44,713 E 1/2014 Jung
8,629,578 B2 1/2014 Kurs et al.
8,664,914 B2 3/2014 Toya et al.
8,668,045 B2 3/2014 Cohen
8,669,676 B2 3/2014 Karalis et al.
8,716,977 B2 5/2014 Walley et al.
8,760,010 B2 6/2014 Jung et al.
8,783,778 B2 7/2014 Nelson et al.
8,786,252 B2 7/2014 Toya et al.
8,831,513 B2 9/2014 Baarman
8,853,892 B2 10/2014 Fells et al.
8,914,080 B2 12/2014 Kowalewski
8,920,191 B2 12/2014 Carpanzano
8,935,985 B2 1/2015 Hjelm
9,010,851 B2 4/2015 Lapointe
9,088,117 B2 7/2015 Rosenblum
9,095,209 B2 8/2015 Mirth et al.
9,119,000 B2 8/2015 Tracy
9,124,106 B2 9/2015 Toya et al.
9,124,308 B2 9/2015 Metcalf
9,130,395 B2 9/2015 Jung
9,142,995 B2 9/2015 Jung
9,178,376 B2 11/2015 Jung et al.
9,185,988 B1 11/2015 Sanchez
9,277,826 B2 3/2016 Nelson et al.
9,295,339 B2 3/2016 Hampton
9,312,711 B2 4/2016 Toya et al.
9,318,912 B2 4/2016 Baarman et al.
9,362,779 B2 6/2016 Takahashi et al.
RE46,111 E 8/2016 Kook
9,419,478 B2 8/2016 Jung et al.
9,438,069 B2 9/2016 Hongo
9,490,654 B2 11/2016 Tomiki et al.
9,520,738 B2 12/2016 Rejman et al.
9,529,431 B2 12/2016 Bleacher et al.
9,531,197 B2 12/2016 Jung et al.

(56) References Cited

U.S. PATENT DOCUMENTS

| | | | |
|---|---|---|---|
| 9,585,468 | B2 | 3/2017 | Udagawa et al. |
| 9,608,474 | B2 | 3/2017 | Mack |
| 9,685,817 | B2 | 6/2017 | Jung |
| 9,734,815 | B2 | 8/2017 | Defranks et al. |
| 9,735,836 | B2 | 8/2017 | Van Wageningen |
| 9,762,092 | B2 | 9/2017 | Jung et al. |
| 9,788,092 | B2 | 10/2017 | Rawls-Meehan et al. |
| 9,843,230 | B2 | 12/2017 | John |
| 9,853,405 | B2 | 12/2017 | Suri |
| 9,905,217 | B2 | 2/2018 | Hyde et al. |
| 9,912,188 | B2 | 3/2018 | Lohr |
| 9,975,459 | B2 | 5/2018 | Takada et al. |
| 9,984,686 | B1 | 5/2018 | Mutagi et al. |
| 9,985,463 | B2 | 5/2018 | Seki et al. |
| 10,051,354 | B2 | 8/2018 | Linjama et al. |
| 10,074,475 | B2 | 9/2018 | Lohr et al. |
| 10,101,488 | B2 | 10/2018 | Krupezevic et al. |
| 10,103,584 | B2 | 10/2018 | Van Wageningen et al. |
| 10,123,621 | B2 | 11/2018 | Nelson et al. |
| 10,143,307 | B2 | 12/2018 | Nelson et al. |
| 10,212,519 | B2 | 2/2019 | Nelson et al. |
| 10,235,543 | B2 | 3/2019 | Pachler et al. |
| 10,235,643 | B2 | 3/2019 | Sawka |
| 10,236,643 | B2 | 3/2019 | Nelson et al. |
| 10,239,413 | B2 | 3/2019 | Riedel et al. |
| D848,393 | S | 5/2019 | Pennanen et al. |
| 10,299,095 | B2 | 5/2019 | Porat et al. |
| 10,305,329 | B2 | 5/2019 | Baarman et al. |
| 10,320,244 | B2 | 6/2019 | Van Wageningen |
| 10,326,317 | B2 | 6/2019 | Krupezevic et al. |
| 10,340,744 | B2 | 7/2019 | Tominaga et al. |
| 10,439,445 | B2 | 10/2019 | Jung et al. |
| 10,511,183 | B2 | 12/2019 | Pan et al. |
| 10,545,180 | B2 | 1/2020 | Van Wageningen |
| 10,679,601 | B2 | 6/2020 | Linjama et al. |
| RE48,193 | E | 9/2020 | Cho |
| 10,827,280 | B2 | 11/2020 | Linjama et al. |
| 10,957,302 | B2 | 3/2021 | Linjama et al. |
| 10,972,838 | B2 | 4/2021 | Nelson et al. |
| 10,979,241 | B2 | 4/2021 | Nelson et al. |
| 11,039,234 | B2 | 6/2021 | Linjama et al. |
| 11,112,301 | B2 | 9/2021 | Lee et al. |
| 11,139,698 | B2 | 10/2021 | Jung et al. |
| 11,159,026 | B2 | 10/2021 | Kim |
| 11,172,301 | B2 | 11/2021 | Nelson |
| 11,178,486 | B2 | 11/2021 | Nelson et al. |
| 11,178,487 | B2 | 11/2021 | Nelson et al. |
| 11,374,417 | B2 | 6/2022 | Bober et al. |
| 11,381,091 | B2 | 7/2022 | Fang et al. |
| 11,435,534 | B2 | 9/2022 | Hill et al. |
| 11,444,485 | B2 | 9/2022 | Partovi |
| 11,469,615 | B2 | 10/2022 | Bober et al. |
| 11,647,840 | B2 | 5/2023 | Nelson et al. |
| 11,689,856 | B2 | 6/2023 | Nelson et al. |
| 2001/0020810 | A1 | 9/2001 | Kennedy |
| 2002/0063454 | A1 | 5/2002 | Illulian |
| 2003/0025366 | A1 | 2/2003 | Barreiro |
| 2003/0090135 | A1 | 5/2003 | Newman et al. |
| 2003/0102657 | A1 | 6/2003 | Kuo |
| 2003/0139693 | A1 | 7/2003 | Swift |
| 2003/0167222 | A1 | 9/2003 | Mehrotra et al. |
| 2004/0026998 | A1 | 2/2004 | Henriott et al. |
| 2004/0061943 | A1 | 4/2004 | Bosch et al. |
| 2004/0095000 | A1 | 5/2004 | Durling |
| 2005/0007067 | A1 | 1/2005 | Baarman et al. |
| 2005/0008147 | A1 | 1/2005 | Lee |
| 2005/0053252 | A1 | 3/2005 | Cohen |
| 2005/0096098 | A1 | 5/2005 | Woods |
| 2005/0185801 | A1 | 8/2005 | McCarty et al. |
| 2005/0253430 | A1 | 11/2005 | George et al. |
| 2005/0264044 | A1 | 12/2005 | Lee |
| 2006/0036201 | A1 | 2/2006 | Cohen |
| 2006/0061148 | A1 | 3/2006 | Pollard et al. |
| 2006/0076813 | A1 | 4/2006 | Mohn et al. |
| 2006/0102657 | A1 | 5/2006 | Naslund et al. |
| 2006/0147067 | A1 | 7/2006 | Lee |
| 2006/0220435 | A1 | 10/2006 | Carter et al. |
| 2006/0238087 | A1 | 10/2006 | Holt |
| 2006/0279124 | A1 | 12/2006 | White et al. |
| 2007/0001494 | A1 | 1/2007 | Hoover |
| 2007/0164178 | A1 | 7/2007 | Beilstein et al. |
| 2008/0012404 | A1 | 1/2008 | Dewert |
| 2008/0037794 | A1 | 2/2008 | Sugawara et al. |
| 2008/0122241 | A1 | 5/2008 | Blackmore et al. |
| 2008/0150329 | A1 | 6/2008 | Lawson |
| 2008/0220646 | A1 | 9/2008 | Leddusire |
| 2008/0262657 | A1 | 10/2008 | Howell et al. |
| 2009/0001775 | A1 | 1/2009 | Smith |
| 2009/0032660 | A1 | 2/2009 | Wadsworth et al. |
| 2009/0072782 | A1 | 3/2009 | Randall |
| 2009/0096255 | A1 | 4/2009 | Robertson |
| 2009/0212638 | A1 | 8/2009 | Johnson |
| 2009/0212639 | A1 | 8/2009 | Johnson |
| 2009/0212737 | A1 | 8/2009 | Johnson et al. |
| 2009/0250982 | A1 | 10/2009 | Cohen |
| 2010/0055928 | A1 | 3/2010 | Randall |
| 2010/0092022 | A1 | 4/2010 | Hopkinson et al. |
| 2010/0178797 | A1 | 7/2010 | Byrne |
| 2010/0290215 | A1 | 11/2010 | Metcalf et al. |
| 2010/0320819 | A1 | 12/2010 | Cohen et al. |
| 2011/0012403 | A1 | 1/2011 | Wilson et al. |
| 2011/0025915 | A1 | 2/2011 | Daban |
| 2011/0109163 | A1 | 5/2011 | Bennett |
| 2011/0109211 | A1 | 5/2011 | Kirkeby et al. |
| 2011/0110075 | A1 | 5/2011 | Smith |
| 2011/0298340 | A1 | 12/2011 | Nelson et al. |
| 2012/0026724 | A1 | 2/2012 | Metcalf et al. |
| 2012/0051579 | A1 | 3/2012 | Cohen |
| 2012/0123897 | A1 | 5/2012 | Gargiulo |
| 2012/0200129 | A1 | 8/2012 | Wilson, Jr. |
| 2012/0286557 | A1 | 11/2012 | Hoffman et al. |
| 2012/0316884 | A1 | 12/2012 | Rozaieski et al. |
| 2013/0002001 | A1 | 1/2013 | Allen et al. |
| 2013/0066636 | A1 | 3/2013 | Singhal |
| 2013/0129105 | A1 | 5/2013 | Hua |
| 2013/0137524 | A1 | 5/2013 | Scott |
| 2013/0177198 | A1 | 7/2013 | Hogue et al. |
| 2013/0199421 | A1 | 8/2013 | Hjelm |
| 2013/0207478 | A1 | 8/2013 | Metcalf et al. |
| 2013/0234481 | A1 | 9/2013 | Johnson |
| 2013/0249257 | A1 | 9/2013 | Suhre et al. |
| 2013/0304475 | A1 | 11/2013 | Gratke et al. |
| 2013/0333940 | A1 | 12/2013 | Stencil |
| 2014/0010387 | A1 | 1/2014 | Cohen |
| 2014/0022084 | A1 | 1/2014 | Drimusz et al. |
| 2014/0197666 | A1 | 7/2014 | Koch |
| 2014/0272266 | A1 | 9/2014 | Svilar |
| 2014/0285140 | A1 | 9/2014 | Jung |
| 2014/0368476 | A1 | 12/2014 | Rauch et al. |
| 2015/0061258 | A1 | 3/2015 | Flores et al. |
| 2015/0069965 | A1 | 3/2015 | Verschueren |
| 2015/0076881 | A1 | 3/2015 | Lapointe |
| 2015/0076891 | A1 | 3/2015 | Lapointe et al. |
| 2015/0230622 | A1 | 8/2015 | Orbelian |
| 2015/0255914 | A1 | 9/2015 | Kong et al. |
| 2015/0300627 | A1 | 10/2015 | Wang et al. |
| 2015/0334482 | A1 | 11/2015 | Rawls-Meehan et al. |
| 2016/0118035 | A1 | 4/2016 | Hyde et al. |
| 2016/0126916 | A1 | 5/2016 | Kappus et al. |
| 2016/0136529 | A1 | 5/2016 | Weston et al. |
| 2016/0174715 | A1 | 6/2016 | Nelson et al. |
| 2016/0257227 | A1 | 9/2016 | Takada et al. |
| 2016/0286291 | A1 | 9/2016 | Linjama et al. |
| 2016/0379631 | A1 | 12/2016 | Wang et al. |
| 2017/0135490 | A1 | 5/2017 | Andrix et al. |
| 2017/0143122 | A1 | 5/2017 | Nelson et al. |
| 2017/0149181 | A1 | 5/2017 | Nelson et al. |
| 2017/0150264 | A1 | 5/2017 | Nelson et al. |
| 2017/0214197 | A1 | 7/2017 | Suri |
| 2017/0221340 | A1 | 8/2017 | Rhoads et al. |
| 2017/0295941 | A1 | 10/2017 | King et al. |
| 2017/0317458 | A1 | 11/2017 | Byrne et al. |
| 2018/0000244 | A1 | 1/2018 | Nelson et al. |
| 2018/0041354 | A1 | 2/2018 | Nelson et al. |

(56) References Cited

U.S. PATENT DOCUMENTS

| | | | |
|---|---|---|---|
| 2018/0158192 A1 | 6/2018 | Rocque et al. | |
| 2018/0191178 A1 | 7/2018 | Byrne et al. | |
| 2018/0253947 A1 | 9/2018 | Muhsin et al. | |
| 2019/0222935 A1 | 7/2019 | Nelson et al. | |
| 2019/0266993 A1 | 8/2019 | Linjama et al. | |
| 2020/0100030 A1* | 3/2020 | Nelson | H04R 5/023 |
| 2020/0100031 A1 | 3/2020 | Nelson et al. | |
| 2020/0221227 A1 | 7/2020 | Nelson et al. | |
| 2021/0002170 A1 | 1/2021 | Chien et al. | |
| 2021/0105563 A1 | 4/2021 | Marten | |
| 2021/0112341 A1 | 4/2021 | Nelson et al. | |
| 2021/0352422 A1 | 11/2021 | Lin et al. | |
| 2022/0060829 A1 | 2/2022 | Nelson et al. | |
| 2022/0078555 A1 | 3/2022 | Nelson et al. | |
| 2022/0095060 A1 | 3/2022 | Yang et al. | |
| 2022/0115907 A1 | 4/2022 | Bober et al. | |
| 2022/0337928 A1 | 10/2022 | Nelson | |
| 2022/0400868 A1 | 12/2022 | Nelson et al. | |
| 2022/0408925 A1 | 12/2022 | Rafieha | |
| 2023/0111916 A1 | 4/2023 | Nelson et al. | |
| 2023/0126734 A1* | 4/2023 | Piccin | B60R 13/02<br>296/146.7 |
| 2023/0209262 A1 | 6/2023 | Nelson et al. | |
| 2023/0209263 A1 | 6/2023 | Nelson et al. | |
| 2023/0217170 A1 | 7/2023 | Nelson et al. | |
| 2023/0336911 A1 | 10/2023 | Orth | |

FOREIGN PATENT DOCUMENTS

| | | | |
|---|---|---|---|
| CN | 201135239 | Y | 10/2008 |
| CN | 201178847 | Y | 1/2009 |
| CN | 201282826 | Y | 8/2009 |
| CN | 201341645 | Y | 11/2009 |
| CN | 201452358 | U | 5/2010 |
| CN | 201518894 | U | 7/2010 |
| CN | 101909490 | A | 12/2010 |
| CN | 202211357 | U | 5/2012 |
| CN | 202530580 | U | 11/2012 |
| CN | 202553058 | U | 11/2012 |
| CN | 101909490 | B | 3/2013 |
| CN | 202817641 | U | 3/2013 |
| CN | 202907151 | U | 4/2013 |
| CN | 202981088 | U | 6/2013 |
| CN | 203563950 | U | 4/2014 |
| CN | 203609079 | U | 5/2014 |
| DE | 102012211865 | A1 | 5/2013 |
| EP | 3244633 | A1 | 5/2016 |
| EP | 3244628 | A1 | 11/2017 |
| EP | 3097703 | B1 | 10/2018 |
| FI | 20196020 | A1 | 5/2021 |
| GB | 2300329 | A | 10/1996 |
| JP | 47-004753 | Y1 | 2/1972 |
| JP | 56-087863 | A | 7/1981 |
| JP | 59-067079 | A | 4/1984 |
| JP | 59-107523 | A | 6/1984 |
| JP | S59107523 | U | 7/1984 |
| JP | 06-079086 | A | 3/1994 |
| JP | 08-063174 | A | 3/1996 |
| JP | 3047023 | U | 3/1998 |
| JP | 3047023 | B2 | 5/2000 |
| JP | 2001-285976 | A | 10/2001 |
| JP | 2004-097273 | A | 4/2004 |
| JP | 2007-003994 | A | 1/2007 |
| JP | 2008-513138 | A | 5/2008 |
| JP | 2008-545504 | A | 12/2008 |
| JP | 2011505921 | A | 3/2011 |
| JP | 2013-094405 | A | 5/2013 |
| JP | 2014-230026 | A | 12/2014 |
| JP | 2015-126460 | A | 7/2015 |
| KR | 20080012919 | A | 2/2008 |
| WO | 99/63786 | A1 | 12/1999 |
| WO | 2006/135509 | A2 | 12/2006 |
| WO | 2009/113319 | A1 | 9/2009 |
| WO | 2012/093398 | A2 | 7/2012 |
| WO | WO-2012093398 | A3 | 10/2012 |
| WO | 2014/072975 | A1 | 5/2014 |
| WO | 2015/118217 | A1 | 8/2015 |
| WO | 2016/044884 | A1 | 3/2016 |
| WO | 2017/087266 | A1 | 5/2017 |
| WO | 2017/087268 | A1 | 5/2017 |
| WO | WO-2017087224 | A1 | 5/2017 |
| WO | 2017/194785 | A1 | 11/2017 |
| WO | 2018/134142 | A1 | 7/2018 |
| WO | 2018/189422 | A1 | 10/2018 |
| WO | 2021/105554 | A1 | 6/2021 |
| WO | 2021/141783 | A1 | 7/2021 |
| WO | 2022/262950 | A1 | 12/2022 |

OTHER PUBLICATIONS

Notice of Allowance Mailed on Aug. 31, 2023 for U.S. Appl. No. 18/065,329, 16 pages.

Gear Diary, "Lovesac Sactionals StealthTech Sound + Charge System Brings Invisible and Immersive Harmon Kardon Sound to Your Home Theater", posted Oct. 18, 2021, publicly accessed Oct. 24, 2022, 6 pages.

Lovesac.com "An Unparalled, Immersive Home Experience", publicly accessed Oct. 24, 2022, 8 pages.

Office Action published Jan. 30, 2023, U.S. Trademark Application Serial No. 97627790, 41 pages.

U.S. Trademark Application, Serial No. 97627790, filed Oct. 11, 2022, publicly accessed Oct. 24, 2022, 3 pages.

Photos of Lovesac Stealthech sectional furniture Side upright member/arm rest (fabric covering and foam removed) with speakers, which was publicly available at least as early as Feb. 2022; 6 photos; 3 pages.

"The Wireless Speaker and Audio (WISA(Registered)) Association," retrieved Nov. 7, 2016 at www.wisaassocation.org, 2 pages.

"WISA Wireless Speaker & Audio," retrieved on Nov. 7, 2016 at www.wisaassociation.org, 3 pages.

Black Sobro Smart End Table with Built-In-Outlets, 7 pages, www.wayfair.com, Nov. 30, 2022.

Bose Corporation, Wikipedia, http://en.wikipedia.org/wiki/Bose_Corporation, Apr. 25, 2012.

Corrected Notice of Allowance received for U.S. Appl. No. 15/786,922, mailed on Sep. 23, 2020.

Corrected Notice of Allowance received for U.S. Appl. No. 15/786,922, mailed on Sep. 28, 2020.

Curry, M. "Its Speakers Sound Good Even in Terrible Listening Environments, i.e. Your Apartment;" Core77; Article [online]. Sep. 29, 2015 [retrieved Jan. 30, 2017]. Retrieved from the Internet: <URL: http://www.core77.com/posts/41080/Sonos-Debuts-Software-That-Makes-Its-Speakers-Sound-Good-Even-in-Terrible-Listening-Environments-ie-Your-Apartment; p. 2, paragraph 2 to p. 4, paragraph 1.

Equalization (audio) Wikipedia, web.archive.org archived pages, https://web.archive.org/web/20210325042554/https://en.wikipedia.org/wiki/Equalization_(audio) dated Mar. 25, 2021, last updated Mar. 20, 2021 (11 pages).

Equalization (audio); Wikipedia, https://en.wikipedia.org/wiki/Equalization_(audio), printed Jul. 13, 2021 (11 pages).

Equalization—What's the difference of frequency sets for 10 band equalizers?—Sound Design Stock Exchange; sound.stackechange.com question/answer website pages; dated Jan. 22, 2015 (2 pages).

Final Office Action dated May 22, 2019 from U.S. Appl. No. 15/786,922.

Final Office Action received for U.S. Appl. No. 13/869,600, mailed on Sep. 14, 2016.

Final Office Action received for U.S. Appl. No. 15/270,339, mailed on Mar. 12, 2018.

Final Office Action received for U.S. Appl. No. 16/273,773, mailed on Feb. 12, 2020.

Final Office Action received for U.S. Appl. No. 16/273,773, mailed on Oct. 13, 2020.

Final Rejection Mailed on May 24, 2021 for U.S. Appl. No. 16/738,916.

(56) References Cited

OTHER PUBLICATIONS

Final Rejection received for U.S. Appl. No. 16/696,696, mailed on May 3, 2021.
Final Rejection received for U.S. Appl. No. 15/348,068, Mailed on Apr. 2, 2018.
Issue Notification received for U.S. Appl. No. 15/270,339, mailed on Feb. 27, 2019.
Issue Notification received for U.S. Appl. No. 15/348,068, mailed on Jan. 30, 2019.
Issue Notification received for U.S. Appl. No. 15/786,922, mailed on Aug. 5, 2020.
Jason Cartwright, This connected bed has wireless charging, bluetooth and a subwoofer, 8 pages, Aug. 12, 2019, www.techau.com.au, Nov. 28, 2022.
Leviton, "2-Gang White Duplex Outlet/Quick Port Plate Recessed Device," retrieved Nov. 17, 2017 at homedepot.com, (2 pages).
Leviton, "Product Bulletin for Recessed Devices Cal. Nos. 689 and 690," Copyright 2008, published and available, on information and belief, at least as early as 2008 (2 pages).
Non-Final Office Action received for U.S. Appl. No. 16/273,773, mailed on Jun. 16, 2020, 18 pages.
Non-Final Office Action received for U.S. Appl. No. 17/128,575, mailed on Oct. 24, 2022, 32 pages.
Non-Final Office Action received for U.S. Appl. No. 17/349,363, mailed on Aug. 25, 2022, 6 pages.
Non-Final Rejection Mailed on Apr. 19, 2021 for U.S. Appl. No. 16/273,773.
Non-Final Rejection Mailed on Jan. 28, 2021 for U.S. Appl. No. 16/738,916.
Non-Final Rejection Mailed on Jul. 26, 2022 for U.S. Appl. No. 17/348,088.
Non-Final Rejection received for U.S. Appl. No. 16/696,696, mailed on Jan. 14, 2021.
Notice of Allowance and Fees Due (PTOL-85) Mailed on Feb. 13, 2023 for U.S. Appl. No. 17/128,575, 15 page(s).
Notice of Allowance and Fees Due (PTOL-85) Mailed on Jul. 27, 2021 for U.S. Appl. No. 16/273,773.
Notice of Allowance and Fees Due (PTOL-85) Mailed on Sep. 21, 2021 for U.S. Appl. No. 16/696,696.
Notice of Allowance and Fees Due (PTOL-85) Mailed on Sep. 28, 2021 for U.S. Appl. No. 16/738,916.
Notice of Allowance Office Action received for U.S. Appl. No. 17/520,488, mailed on Mar. 17, 2023, 5 pages.
Notice of Allowance received for U.S. Appl. No. 15/270,339, mailed on Jan. 24, 2019.
Notice of Allowance received for U.S. Appl. No. 15/348,068, mailed on Dec. 12, 2018.
Notice of Allowance received for U.S. Appl. No. 15/786,922, mailed on Jul. 10, 2020.
Notice of Allowance received for U.S. Appl. No. 15/786,922, mailed on Mar. 2, 2020.
Notice of Allowance received for U.S. Appl. No. 15/786,922, mailed on Sep. 15, 2020.
Notice of Allowance received for U.S. Appl. No. 16/696,712, mailed on Aug. 27, 2020.
Notice of Allowance received for U.S. Appl. No. 16/696,712, mailed on Dec. 30, 2020.
Notice of Allowance received for U.S. Appl. No. 17/348,088, mailed on Dec. 19, 2022, 23 pages.
Notice of Allowance received for U.S. Appl. No. 17/348,088, mailed on Mar. 23, 2023.
Notice of Allowance received for U.S. Appl. No. 17/349,363, mailed on Jan. 5, 2023, 6 pages.
Notice of Allowance received for U.S. Appl. No. 17/349,363, mailed on Sep. 28, 2022, 8 pages.
Office Action dated Oct. 1, 2019 from U.S. Appl. No. 15/786,922.
Office Action from U.S. Appl. No. 13/869,600, dated Dec. 15, 2015 (9 pages).
Office Action received for U.S. Appl. No. 15/270,339, mailed on Aug. 6, 2018.
Issue Notification issued for U.S. Appl. No. 17/128,575 mailed Jun. 7, 2023.
Issue Notification issued for U.S. Appl. No. 17/349,363 mailed Apr. 27, 2023.
Lovesac Stealthtech, Sactionals Sound + Charge System, Setup Guide, 48 pages, Publicly available at least as early as Feb. 2023.
Lovesac Stealthtech, sound by harman/kardon, Get Ready for a Fully Immersive Audio Experience, Welcome to Sactionals StealthTech Sound + Charge, Software Application Screen Prints, 41 pages, publicly available, on information and belief, at least as early as Nov. 2021, Printed Feb. 2023.
Non-Final Office Action received for U.S. Appl. No. 18/065,329, mailed on May 30, 2023, 7 pages.
Notice of Allowance and Fees Due (PTOL-85) Mailed on Apr. 13, 2023 for U.S. Appl. No. 17/128,575, 3 page(s).
Notice of Allowance received for U.S. Appl. No. 17/348,088, mailed on Mar. 28, 2023, 5 pages.
Office Action received for U.S. Appl. No. 15/270,339, mailed on Jun. 22, 2017.
Office Action received for U.S. Appl. No. 15/348,068, mailed on Nov. 1, 2017.
Office Action received for U.S. Appl. No. 15/348,068, mailed on Oct. 2, 2018.
Office Action received for U.S. Appl. No. 17/520,488, mailed on Feb. 24, 2023.
Office Action received for U.S. Appl. No. 16/273,773, mailed on Oct. 25, 2019.
Restriction Requirement received for U.S. Appl. No. 15/348,068, mailed on Aug. 2, 2017.
Restriction Requirement received for U.S. Appl. No. 17/349,363, mailed on Jun. 10, 2022, 8 pages.
Sobro Coffee Table with Built in Fridge, Speakers, Outlets, LED Light, and More—Black, 12 pages, www.amazon.com, Nov. 29, 2022.
Sobro Smart Side/Nightstand Table—with Cooling Drawer, Wireless Charging, Bluetooth Speakers, USB-C and 120V outlets, LED Light, Black/Black, 11 pages, www.amazon.com, Nov. 29, 2022.
The Wall Street Journal newspaper article entitled, "Wireless Charging Everywhere," dated Dec. 30, 2015.
U.S. Appl. No. 15/786,922, Nov. 28, 2018, Office Action.
U.S. Appl. No. 60/778,761, entitled Power Delivery Surface Power Supply Safety, dated Mar. 3, 2006 (59 pages).
Mar. 22, 2024—(US) Notice of Allowance—U.S. Appl. No. 18/300,148, 12 Pages.
Mar. 26, 2024—(US) Non-Final Office Action—U.S. Appl. No. 17/491,858, 93 Pages.
Amendment and Response to Office Action for U.S. Appl. No. 16/273,773 dated May 11, 2020, 13 pages.
Communication Pursuant to Article 94(3) EPC for European Patent Application No. 16866890.3, mailed on Dec. 12, 2019, 4 pages.
International Search Report and Written Opinion for Application No. PCT/US2016/061085, mailed on Jan. 31, 2017, 11 pages.
International Search Report and Written Opinion for Application No. PCT/US2016/061491, mailed on Apr. 3, 2017, with Search History, 25 pages.
International Search Report and Written Opinion for Application No. PCT/US2016/061508, mailed on Apr. 19, 2017, 12 pages.
Invitation to Pay Additional Fees and, Where Applicable, Protest Fee, for International Application No. PCT/US2016/061491, dated Jan. 24, 2017, 2 pages.
Korean Office Action for Application No. 10-2018-7014059 dated Nov. 1, 2023 (32 pages).
Notice of Allowance and Fees Due (PTOL-85) Mailed on Jul. 17, 2023 for U.S. Appl. No. 17/348,088, 22 page(s).
Notice of Allowance and Fees Due (PTOL-85) Mailed on Jul. 25, 2023 for U.S. Appl. No. 17/520,488, 5 page(s).
International Search Report and the Written Opinion of the International Searching Authority for International Application No. PCT/US2024/018378 dated Jun. 25, 2024 (21 pages).
Dec. 4, 2024—(US) Non-Final Office Action—U.S. Appl. No. 18/178,287, 79 Pages.
Dec. 9, 2024—(US) Non-Final Office Action—U.S. Appl. No. 18/178,304, 90 Pages.

(56) References Cited

OTHER PUBLICATIONS

Dec. 17, 2024—Notification of Reexamination—Chinese Patent Application No. 201680067504.2, 20 Pages.
Jul. 18, 2024—(US) Non-Final Office Action—U.S. Appl. No. 18/458,350, 58 Pages.
Nov. 5, 2024—(US) Final Office Action—U.S. Appl. No. 18/458,350, 15 Pages.
Oct. 9, 2024—(US) Final Office Action—U.S. Appl. No. 17/491,858, 36 Pages.
Feb. 18, 2025—(CN) Decision of Reexamination—App No. 201680067504.2, 15 Pages.
Feb. 25, 2025—(US) Non-Final Office Action—U.S. Appl. No. 18/458,350, 11 Pages.
May 13, 2025—(US) Non-Final Office Action—U.S. Appl. No. 17/491,858, 35 Pages.
Currey ("Its speakers sounds good even in terrible sound environments i. e. your apartment"). (Year: 2010).
Handbagio ("Guide to Leather Weight and Thickness (With Charts)" Aug. 4, 2022) (Year: 2022).

* cited by examiner

| | | | | | |
|---|---|---|---|---|---|
| Target Frequency (Hz) | F1 | F2 | F3 | ... | Fn |
| Baseline EQ (dB) | V1 | V2 | V3 | ... | Vn |
| w/ Partially Acoustically Transparent Material (dB) | V1_ATS | V2_ATS | V3_ATS | ... | Vn_ATS |
| EQ Compensation | ÄV1 | ÄV2 | ÄV3 | ... | ÄVn |

*FIG. 10*

POLYESTER

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 94 | 92 | 89 | 87 | 89 | 90 | 87 | 84 |
| w/ PSATS (dB) | 72 | 83 | 94 | 92 | 88 | 84 | 83 | 82 | 78 | 76 |
| EQ Compensation (dB) | 0 | 0 | 0 | 0 | 1 | 3 | 6 | 8 | 9 | 8 |

*FIG. 11A*

CHENILLE

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ PSATS (dB) | 72 | 83 | 94 | 92 | 89 | 86 | 85 | 85 | 82 | 79 |
| EQ Compensation (dB) | 0 | 0 | 1 | 0 | 0 | 1 | 4 | 5 | 5 | 5 |

*FIG. 11B*

TWEED

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ PSATS (dB) | 70 | 82 | 94 | 92 | 89 | 87 | 89 | 89 | 85 | 81 |
| EQ Compensation (dB) | 2 | 1 | 1 | 0 | 0 | 0 | 0 | 1 | 2 | 3 |

*FIG. 11C*

LINEN

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ PSATS (dB) | 71 | 83 | 95 | 92 | 89 | 86 | 89 | 89 | 85 | 81 |
| EQ Compensation (dB) | 1 | 0 | 0 | 0 | 0 | 1 | 0 | 1 | 2 | 3 |

*FIG. 11D*

VELVET

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ PSATS (dB) | 70 | 82 | 93 | 92 | 89 | 87 | 88 | 88 | 82 | 79 |
| EQ Compensation (dB) | 2 | 1 | 2 | 0 | 0 | 0 | 1 | 2 | 5 | 5 |

*FIG. 11E*

LEATHER

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ PSATS (dB) | 72 | 83 | 92 | 92 | 89 | 85 | 82 | 79 | 72 | 68 |
| EQ Compensation (dB) | 0 | 0 | 3 | 0 | 0 | 2 | 7 | 11 | 15 | 16 |

*FIG. 11F*

POLYESTER LINEN

| Target Frequency (Hz) | **32** | **63** | **125** | **250** | **500** | **1K** | **2K** | **4K** | **8K** | **16K** |
|---|---|---|---|---|---|---|---|---|---|---|
| Baseline EQ (dB) | 72 | 83 | 95 | 92 | 89 | 87 | 89 | 90 | 87 | 84 |
| w/ PSATS (dB) | 71 | 83 | 93 | 92 | 88 | 87 | 84 | 84 | 77 | 73 |
| EQ Compensation (dB) | 1 | 0 | 2 | 0 | 1 | 0 | 5 | 6 | 10 | 11 |

*FIG. 11G*

FAUX FUR

| Target Frequency (Hz) | **32** | **63** | **125** | **250** | **500** | **1K** | **2K** | **4K** | **8K** | **16K** |
|---|---|---|---|---|---|---|---|---|---|---|
| Baseline EQ (dB) | 72 | 83 | 95 | 92 | 89 | 87 | 89 | 90 | 87 | 84 |
| w/ PSATS (dB) | 72 | 82 | 94 | 92 | 89 | 85 | 81 | 80 | 76 | 74 |
| EQ Compensation (dB) | 0 | 1 | 1 | 0 | 0 | 2 | 8 | 10 | 11 | 10 |

*FIG. 11H*

SYSTEMS AND METHODS FOR CORRECTING SOUND LOSS THROUGH PARTIALLY ACOUSTICALLY TRANSPARENT MATERIALS

CROSS-REFERENCE TO RELATED APPLICATIONS

This application is a continuation in part of U.S. patent application Ser. No. 17/491,858 filed Oct. 1, 2021, entitled SYSTEMS AND METHODS FOR TUNING BASED ON FURNITURE CONFIGURATION, which application is a continuation-in-part of U.S. patent application Ser. No. 16/696,696 filed Nov. 26, 2019, entitled MODULAR FURNITURE SPEAKER ASSEMBLY WITH RECONFIGURABLE TRANSVERSE MEMBERS, which application is a continuation-in-part of U.S. patent application Ser. No. 16/273,773 filed Feb. 12, 2019, entitled ELECTRONIC FURNITURE SYSTEMS WITH INTEGRATED INTERNAL SPEAKERS, which application is a continuation of U.S. patent application Ser. No. 15/348,068 (now U.S. Pat. No. 10,212,519), filed on Nov. 10, 2016, entitled ELECTRONIC FURNITURE SYSTEMS WITH INTEGRATED INTERNAL SPEAKERS, which:

(A) is a continuation-in-part of U.S. patent application Ser. No. 15/270,339 (now U.S. Pat. No. 10,236,643), filed on Sep. 20, 2016, entitled ELECTRICAL HUB FOR FURNITURE ASSEMBLIES, which claims priority to and the benefit of U.S. Provisional Patent Application Ser. No. 62/257,623, filed on Nov. 19, 2015, entitled FURNITURE WITH ELECTRONIC ASSEMBLIES; and (B) also claims priority to and the benefit of U.S. Provisional Patent Application Ser. No. 62/417,091, filed on Nov. 3, 2016, entitled ELECTRONIC FURNITURE SYSTEMS WITH INTEGRATED INTERNAL SPEAKERS.

This application is also a continuation-in-part of U.S. patent application Ser. No. 17/348,088, filed Jun. 15, 2021, entitled TUNING CALIBRATION TECHNOLOGY FOR SYSTEMS AND METHODS FOR ACOUSTICALLY CORRECTING SOUND LOSS THROUGH FABRIC, which claims priority to and the benefit of U.S. Provisional Patent Application Ser. No. 63/173,899, filed Apr. 12, 2021, entitled TUNING CALIBRATION TECHNOLOGY FOR SYSTEMS AND METHODS FOR ACOUSTICALLY CORRECTING SOUND LOSS THROUGH FABRIC.

Each of the foregoing patent applications is incorporated herein in its entirety by reference.

BACKGROUND

Technical Field

This disclosure generally relates to sound systems integrated within furniture.

Related Technology

Speaker systems are widely used for home, business, social accommodations, entertainment and for practical, commercial, and household uses. Unfortunately, speaker systems take up a great deal of space in a home, office, or business environment, and even if small, they are often unsightly. Moreover, wiring and cabling associated with such systems is also unsightly and cumbersome.

Furniture also tends to take up a great deal of space in a home, office or business environment. When sitting on furniture, it is often desirable to listen to music, watch TV, or watch a movie in a home theater environment, or employ one or more electronic components. Improved furniture is needed with improved electronic assembly systems that can be used in association with modern furniture assemblies or devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments of the present disclosure solve one or more of the foregoing or other problems in the art with systems, methods, and apparatuses for acoustically correcting sound loss through various types and compositions of material. In particular, systems, methods and apparatuses of the present disclosure can be implemented to improve the sound quality of a speaker system having at least one speaker integrated within a furniture component and covered by a material that is partially acoustically transparent, such as: (i) an upholstery fabric that is partially acoustically transparent; or (ii) a solid, nondrapable, rigid structure that has perforations therein to increase the acoustic transparency of the rigid structure. Leather, e.g., perforated leather, is an example of an upholstery fabric of the present invention. Solid, nondrapable, rigid structures, e.g., portions of tables, coffee tables, end tables, side tables, desks, bed frames, bed rails, headboards, footboards, etc. are typically not acoustically transparent without the specific perforations described herein, but are, rather, typically configured to provide durability and/or aesthetics to a furniture surface.

In particular, one or more embodiments includes an audio-enhanced furniture system comprising (i) a furniture assembly e.g., a table, having a partially acoustically transparent material in the form of a solid, nondrapable, rigid structure, such as a table top, panel, or other furniture portion having perforations in the native surface thereof; and (ii) a speaker system positioned within the furniture assembly, the speaker system comprising at least one speaker covered by the perforated, rigid structure, such that the at least one speaker is hidden from view. The rigid, perforated structure is partially acoustically transparent, but not fully acoustically transparent. Thus, the at least one speaker is configured to be tuned to compensate for sound being emitted from the at least one speaker through the rigid, perforated structure (e.g., for sound loss or other variations from the sound being emitted through the perforated structure) by adjusting the equalization of one or more target frequencies or frequency bands emitted by the at least one speaker. Embodiments can also include a plurality of tuning profiles corresponding to a plurality of perforated structures, wherein a user may select a tuning profile from the plurality of tuning profiles.

To make the rigid structure more aesthetically pleasing and to provide the appearance of a smooth, uninterrupted surface, the perforations in the perforated, rigid structure, e.g., a desktop or table top, are designed to be small microperforations in the native surface of the structure (rather than separately added grills, etc.) that are small enough that they are invisible or substantially invisible to the unaided eye. Furthermore, such invisible or substantially invisible microperperforations are less likely than large holes to allow water or other environmental hazards to leak onto the speakers covered by a respective perforated surface.

Because of the limited size of the perforations, the solid, rigid, perforated structure may cause a certain amount of sound loss as sound is emitted therethrough. Tuning the speaker(s) to compensate for sound loss that occurs as the sound is emitted from the speaker(s) through the perforated structure improves the acoustic quality of the sound.

Other partially acoustically transparent materials of the present invention include fabrics (e.g., upholstery fabrics) that cover speakers of the present invention. Embodiments of a method of tuning a speaker to compensate for sound being emitted through a rigid, perforated, partially acoustically transparent structure, or other material (e.g., fabric) can include: selecting a desired baseline equalization (e.g., desired frequency response), configuring the speaker to emit sound at an actual equalization (e.g., frequency response) approximate to the desired baseline equalization or frequency response, covering the speaker with a rigid, perforated, partially acoustically transparent material, measuring a resultant equalization or frequency response as the speaker emits sound through the perforated partially acoustically transparent material, calculating a differential equalization, and reconfiguring the audio system to emit sound through the perforated partially acoustically transparent material according to the desired baseline equalization or frequency response by adjusting the actual equalization or frequency response by the differential equalization. Methods can also include creating a plurality of tuning profiles corresponding to a plurality of acoustically transparent materials, each tuning profile including a differential equalization calculated for each of the plurality of perforated partially acoustically transparent materials.

As mentioned, another partially acoustically transparent material of the present invention is fabric, such as upholstery fabric, through which sound can be emitted, and the variations thereof tuned. Thus, for example, systems and methods of the present disclosure can also include audio-enhanced modular furniture systems having: a modular furniture assembly including one or more bases, a plurality of upright members, at least two of the upright members being audio-enhanced upright members, and a speaker system positioned within the modular furniture assembly. The speaker system can include (a) at least one speaker mounted within a first audio-enhanced upright member, the at least one speaker being hidden from view by a first upholstery fabric that covers the first audio-enhanced upright member; (b) at least one speaker mounted within a second audio-enhanced upright member, the at least one speaker being hidden from view by a second upholstery fabric that covers the second audio-enhanced upright member; and (c) at least one speaker controller configured to control each speaker of the speaker system. Each speaker of the speaker system can be configured to be tuned through the at least one speaker controller to compensate for sound being emitted from the speaker through the respective first or second perforated partially acoustically transparent material by adjusting the equalization of one or more audio frequencies emitted by the at least one speaker.

Accordingly, systems and methods for acoustically correcting sound loss through perforated, partially acoustically transparent materials are disclosed. As used herein, it will be apparent that the term “partially acoustically transparent material” does not mean that the perforated, rigid structure or other material (e.g., fabric) is fully acoustically transparent, as in such case, no significant sound loss would occur and no significant correction would be required. As employed herein, the term “partially acoustically transparent material” refers to a material that exhibits some partial acoustic transparency or some increased acoustic transparency, such as, in the case of a perforated, rigid material, as a result of the perforations through the material. Even with such perforations, however, the resulting material is not fully acoustically transparent (e.g., exhibiting a 3 dB volume loss with respect to one or more particular frequencies or frequency bands within the audible spectrum) because of the small size of the perforations that makes the associated surface (e.g., of a table top) aesthetically pleasing. Such sound loss may be addressed by equalization, as described herein, boosting the volume of one or more frequencies or frequency bands to address any sound loss that still occurs, through the perforated material.

In one example, the perforated, partially acoustically transparent material is a solid, non-drapable, rigid material. Such a solid, non-drapable, rigid structure may include, for example, wood, veneer, plastic, polymer, metal, or other rigid, non-drapable, rigid material. The perforations are made therein in order to make such structure more acoustically transparent, but are designed to be small enough to be visually, aesthetically pleasing and to minimize potential environmental damage, e.g., potential water damage, to the speaker covered by the rigid structure.

Furniture cavities, provided within one or more portions of the furniture assembly, and within which the speakers are mounted, may enhance the sound of the speakers mounted therein. The speakers of the furniture assemblies disclosed herein are tuned in order to compensate for the sound being emitted through the partially acoustically transparent material (e.g., fabric or perforated wood) which covers the speakers embedded within the furniture assemblies. Given frequencies emitted by the speakers are tuned in order to compensate for the fact that the emitted sound extends through the interface of the partially acoustically transparent material optimizing the sound as it extends through the partially acoustically transparent material layer.

In one embodiment, the speakers used in the present invention are frequency tuned so that there is a high quality sound emitted through the partially acoustically transparent material (e.g., fabric or perforated wood). The frequencies generated by the speakers are tuned such that the sound emitted from the speakers is tuned to compensate for the sound passing through the partially acoustically transparent material. The structure and positioning and tuning of speakers is strategically useful to the sound and fidelity of the speakers as the speakers are covered by the partially acoustically transparent material.

The speakers of the present invention are tuned in order to emit sound in a high quality manner through the partially acoustically transparent material (e.g., fabric or perforated wood). For example, frequencies that are preferentially absorbed by partially acoustically transparent material (altering the loudness of a given frequency as it passes through the partially acoustically transparent material) may be boosted to compensate for loss as such frequency passes through such partially acoustically transparent material. Relatively higher frequencies are typically more drastically attenuated by such passage through such materials than relatively lower frequencies, such that the tuning may comprise preferentially boosting higher frequencies (as compared to little or no boosting of lower frequencies), in order to provide a “flat” frequency response across the frequency spectrum as heard on the other side of the partially acoustically transparent material (i.e., at the listener’s ears).

Thus, in the present invention, the speaker system is tuned by boosting one or more select frequencies to compensate for attenuation of such frequencies as sound from the speaker system is emitted through upholstery fabric, perforated wood, or other partially acoustically transparent structures.

The volume of a portion of a furniture assembly, such as a desk or upright member (or an enclosure within such space) may be used as the speaker enclosure, creating the desired resonance. Speakers are tuned for speaker output through the partially acoustically transparent material, e.g., through fabric covers covering the of the speakers.

By way of example, typically, upholstery fabrics are not acoustically transparent, e.g., they affect sound waves at one or more frequencies from 20 Hz to 20 kHz by attenuating (or boosting) any such frequency more than 3 dB (i.e., ±more than 3 dB). For example, such upholstery fabrics are relatively heavy fabrics, which may typically attenuate particularly the higher sound frequencies at more than 3 dB. As a result of such attenuation by the fabric, the sound generated at any such speaker hidden behind the upholstery fabric may be tuned to increase the volume of the attenuated frequencies to compensate for the attenuation that occurs as the sound passes through the fabric. For example, if the fabric attenuates sounds at 2 kHz by 6 dB, the tuning may increase the volume of sounds at 2 kHz by 6 dB to compensate. According to the present invention, there may typically be several frequencies or frequency bands which may be boosted to compensate for such fabric induced attenuation. As a further example, relatively higher frequencies (e.g., 200 Hz or more, 400 Hz or more, 800 Hz or more, 2 kHz or more, 4 kHz or more, etc.) generated from such speakers are often affected by passage through such fabric, and may have some degree of attenuation associated therewith, which attenuation may increase with increasing frequency. As a result of this, the speaker can be tuned by boosting such higher frequencies before they pass through the fabric so that once the speaker sound passes through the fabric, it is approximately at a volume as it is intended to be heard and received by a listener (e.g., so that the overall tuned output is within ±3 dB of the un-attenuated “target” value).

Thus, the speakers of the present invention are adjusted and tuned in order to emit sound through partially acoustically transparent materials, such as fabrics or perforated wood structures in a manner that attenuation due to such material is compensated for.

Each of these speakers may be tuned so that output from a given speaker accounts for transmission of the sound waves through the partially acoustically transparent material before reaching the user using the associated furniture assembly. Tuning of the frequencies of the speakers to provide the sound through such partially acoustically transparent materials is a unique and novel aspect of the present invention.

Furthermore, a user may control overall sound volume, sound volume of one or more of the speakers, frequency boosting (or attenuation) of one of more frequency bands associated with any of the speakers, or other controls that a user may desire to manipulate. Such a control component, e.g., a remote controller or a phone app, for example, may transmit signals or instructions through an electrical wired connection or wirelessly from a location that is remote from the associated furniture assembly, for example, adjacent a television or elsewhere. In certain embodiments, control of any of the desired parameters may be provided through a cellular phone app (smart phone app) or other software application that can be provided in any desired interface. For example, in the smartphone portable device, tablet, or other device accessible to the user, a user may make particular selections, after which the device may wirelessly transmit control signals to a receiver or other component, then implement any desired changes to parameters as instructed by a user. The receiver may be capable of receiving and/or transmitting through WiFi, Blue-tooth, or other wireless system, so as to communicate with such an app, to communicate with the associated transmitter, etc.

The present invention thus includes a speaker system that is tuned to compensate for the sound being emitted through upholstery fabric. For example, in one embodiment, the speaker system is tuned to compensate for sound being emitted from the speaker and through a partially acoustically transparent material, such as upholstery fabric or perforated wood, the speaker system is tuned so that the overall frequency response tuned output is within ±3 dB of the unattenuated target value as heard through the partially acoustically transparent material. Thus, by way of example, in one embodiment of the present invention, the speaker system is tuned to compensate for sound being emitted from the speaker and through a partially acoustically transparent material (such as upholstery fabric or perforated wood), the speaker system is tuned so that the overall tuned output of the speaker system as emitted through the upholstery fabric is within ±3 dB of an unattenuated target value.

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 10 is an illustrative table of audio frequency adjustments for acoustically correcting sound loss through any of the partially acoustically transparent materials discussed herein.

FIG. 11A is a table of audio frequency adjustments for acoustically correcting sound loss through an exemplary upholstery fabric including a polyester material.

FIG. 11B is a table of audio frequency adjustments for acoustically correcting sound loss through an exemplary chenille material.

FIG. 11C is a table of audio frequency adjustments for acoustically correcting sound loss through an exemplary tweed material.

FIG. 11D is a table of audio frequency adjustments for acoustically correcting sound loss through an exemplary linen material.

FIG. 11E is a table of audio frequency adjustments for acoustically correcting sound loss through an exemplary velvet material.

FIG. 11F is a table of audio frequency adjustments for acoustically correcting sound loss through an exemplary upholstery fabric including leather material.

FIG. 11G is a table of audio frequency adjustments for acoustically correcting sound loss through an exemplary upholstery fabric including a polyester linen material. FIG. 11H is a table of audio frequency adjustments for acoustically correcting sound loss through an exemplary upholstery fabric including a faux fur material.

DETAILED DESCRIPTION

Figure 1:
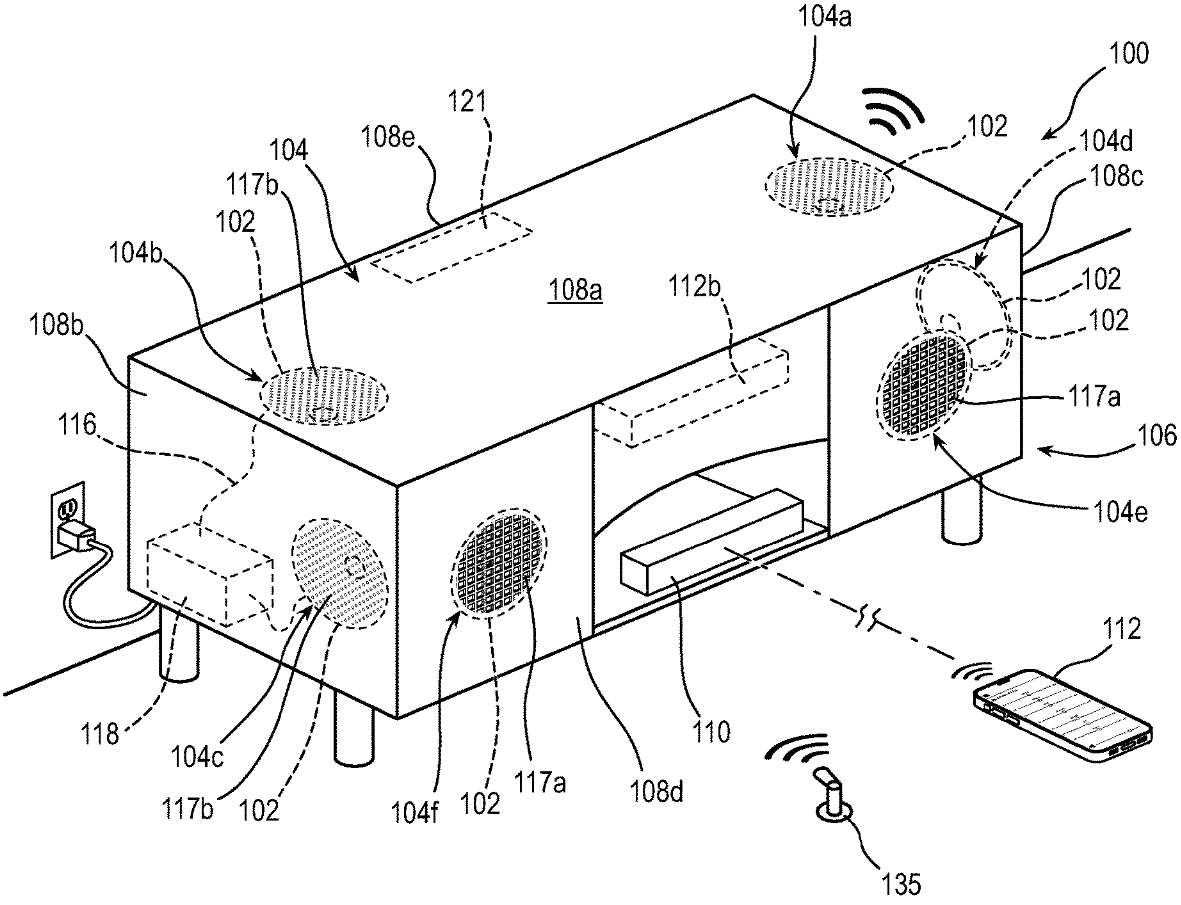
FIG. 1 illustrates a perspective view of a furniture system having audio speakers mounted thereto, each audio speaker being covered by a perforated partially acoustically transparent material, such as a perforated table top, or perforated table front panel, or perforated side panel of the furniture system.

One or more embodiments of the present disclosure generally relate to apparatuses, methods, and systems for acoustically correcting sound loss through various types and compositions of partially acoustically transparent material. The apparatuses, methods, and systems provide superior sound quality to speaker systems that include at least one speaker covered with any of various materials. By way of example, the apparatuses, methods, and systems can be used to improve the balance of audible frequencies emitted by a speaker through: (i) a solid, nondrapable, rigid structure, such as a table top, desk panel or bed frame that has been perforated to make it a partially acoustically transparent material; and/or (ii) a fabric-containing furniture system, such as a chair or couch, that is partially acoustically transparent by nature of the fabric material, after any equalization tuning that is helpful to address attenuation of sound frequencies therethrough. The apparatuses, methods, and systems can use various mechanical, electromechanical, electrical, hardware and/or software components, systems, and modules to improve audio or speaker systems integrated within furniture, whether it be a modular furniture assembly or a single integral furniture unit having integrated speakers that are embedded within the furniture and hidden from view.

For instance, "tuning" of a speaker or system of speakers, as discussed throughout the present disclosure, is to be understood to encompass all methods currently known for adjusting the frequency response of the subject speaker or system of speakers. Such methods include but are not limited to adjustment of the equalization of frequencies of a sound signal prior to transmission to the speaker or speaker system, adjustment of a transmitted audio signal prior to its receipt by the speaker or speaker system, or direct modification of the speaker(s).

By way of example and not limitation, the improved tuning of audio or speaker systems having speakers covered with perforated, rigid, partially acoustically transparent materials or covered with fabric materials provides superior sound quality or other benefits in applications where it is desired to have a speaker concealed from view. This leads to substantial opportunities for improved aesthetic and functional designs of speaker systems integrated with furniture, thereby leading to substantial improvements in the technical field.

Some embodiments of perforated rigid structures of the present disclosure include a variety of structures that can cover audio speakers, such as a panel or other portion of a furniture assembly such as a bed frame, desk, table, cupboard, door, coffee table, end table, side table, credenza, console, sideboard, cabinet, buffet, server, hutch, bookcase, cabinetry, wardrobe, or combinations thereof, etc. Other examples of furniture assemblies having at least a portion thereof that is a perforated, rigid structure through which sound can be emitted and tuned, according to the present invention, include, for example, a mantle, fireplace mantle, television frame, television frame surround, nightstand, projector shroud, shroud covering, housing for blinds, valence, valence for blinds, valence shroud, projector, or combinations thereof.

Other applications can be found in audio-enhanced furniture systems employing non-rigid, drapable fabric surfaces, such as, for example, a furniture assembly, an upholstery fabric at least partially covering the furniture assembly (such upholstery fabric being one example of a non-rigid, drapable partially acoustically transparent material), and an audio or speaker system positioned within the furniture assembly, wherein at least one of the speakers is covered and hidden from view by the upholstery fabric that at least partially covers the furniture assembly. Leather, e.g., perforated leather, is an example of such an upholstery fabric of the present invention.

The perforated, rigid, partially acoustically transparent structure of the present invention is not a drapable fabric, but is a material that exhibits very poor sound transmission without such perforations, e.g., such as wood, plastic (e.g., polymer), metal, or the like. According to embodiments of the present disclosure, each speaker that is covered by such a rigid structure, that is perforated to make the structure a more partially acoustically transparent structure, can be tuned to compensate for sound being emitted from the speaker through the perforated, rigid structure by an adjustment to an equalization or frequency response of the speaker at one or more target frequencies or frequency bands.

In the case of a perforated, rigid structure, adjustment of the equalization or frequency response of the speaker may depend on at least one of a material type (e.g., wood, metal, polymer), perforation amount, thickness, perforation size, etc. In the case of a fabric covering, adjustment of equalization or frequency response of a speaker may depend upon a weight of upholstery fabric covering the furniture assembly, etc. In certain embodiments, the tuning of each speaker, or tuning of the audio system or speaker system to change the frequency response of each speaker, is selectable from a plurality of tuning profiles corresponding to a variety of acoustically transparent materials, such that a user, retailer, or manufacturer is able to select a tuning profile configured to specifically compensate for sound loss through a particular partially acoustically transparent material.

In the case of fabric, the density and thickness of the upholstery fabric relate to the weight of the upholstery fabric. For instance, a higher density and thicker upholstery fabric can have a higher weight than a lower density and less thick upholstery fabric. Examples of weights of upholstery fabrics that can be used as covers for the furniture assemblies (and modular components/members thereof) of the present invention include, for example: fabrics having weights in a range of approximately 50 grams per square meter (GSM) to approximately 1500 grams per square meter (GSM), for example, such as approximately 100 GSM to approximately 1000 GSM, or such as approximately 190 GSM to approximately 800 GSM, although a variety of different interior and exterior fabrics may be employed. The speakers of the present invention are adjusted and tuned in order to emit sound through such fabrics in a manner that attenuation due to such fabric is compensated for.

Similarly, with respect to rigid materials, the speakers of the present invention are adjusted and tuned in a manner that attenuation due to such rigid materials is compensated for. In one embodiment, the perforations of the present invention are finely tuned perforations made in the native surface of the rigid structure that are invisible or substantially invisible to an unaided eye such that the rigid structure is visually, aesthetically pleasing. The type and thickness of the rigid material, along with perforation amount and size are adjusted in order to make the rigid material more acoustically transparent and improve the sound quality of the sound emitted through the rigid material.

Embodiments of a tuning profile include the information used to adjust the equalization of frequency response of a speaker to compensate for sound loss through a particular material. For example, a range of audible frequencies emitted by a speaker can be divided into a plurality of frequency bands, with each of those frequency bands having a frequency response adjustment to compensate for sound loss through a particular material. The particular grouping of those frequency response adjustments, with a particular identification for the particular material can be an example of a tuning profile.

The total quantity of frequency bands depends on the desired level of accuracy in adjustment of the frequency response, as well as the capability of the intended equipment for implementing the tuning profile. For example, some audio tuning devices, such as speaker controllers, amplifiers, or audio equalizers, are only capable of adjusting frequencies in the three frequency bands corresponding to low frequency ranges (i.e., bass), middle frequency ranges, and high frequency ranges (i.e., treble), whereas other tuning devices available are operable to adjust up to 31 separate frequency ranges.

Some of the embodiments discussed herein, for example, divide the audible frequencies ranging from about 20 Hz to about 21 kHz into the 10 frequency bands for individual adjustment as illustrated in Table 1 below: about 20 Hz to about 49 Hz, about 50 Hz to about 99 Hz, about 100 Hz to about 199 Hz, about 200 Hz to about 399 Hz, about 400 Hz to about 999 Hz, about 1 kHz to about 1.9 kHz, about 2 kHz to about 3.9 kHz, about 4 kHz to about 7.9 kHz, about 8 kHz to about 15.9 kHz, and about 16 kHz to about 21 kHz.

TABLE 1

| Frequency Bands | | | | | | | | | |
|---|---|---|---|---|---|---|---|---|---|
| 20-49 Hz | 50-99 Hz | 100-199 Hz | 200-399 Hz | 400-999 Hz | 1000-1999 Hz | 2-3.99 kHz | 4.00-7.99 kHz | 8.00-15.99 kHz | 16.00-21 kHz |

Alternatively, a plurality of target frequencies within the audible frequency range can be selected for adjustment by parametric equalization or similar known methods. Parametric equalization includes adjustment of one or more target frequencies by a selected amplitude, such the frequency response curve of the tuned speaker is altered by a parametric or "bell" shape centered at the target frequency. The particular data associated with the parametric equalization for one particular material, with a particular identification for the particular material can be another example of a tuning profile. One skilled in the art should appreciate that additional methods of adjusting equalization or frequency response not discussed herein can be used to implement the disclosed embodiments within the scope and spirit of the disclosed invention.

The term "equalization" is used to describe adjustments to the output volumes of one or more frequencies (the "frequency response") within the audible spectrum of sound emitted by a speaker or speaker system.

Referring now specifically to the drawings, FIG. 1 illustrates a furniture system 100 comprising: (i) a speaker system comprised of speakers 102; and (2) a furniture assembly 104, the speaker system including multiple audio speakers 102 embedded and integrated within furniture assembly 104. Speakers 102 may be mounted to and within furniture assembly 104, for example, such that the furniture assembly 104 acts as a speaker cover for each speaker 104. Furniture assembly 104, can be a coffee table, such as shown in FIG. 1, for example, having table body 106 supported by table legs. Table body 106 of furniture assembly 104 is comprised of a top panel 108*a*, and end and front and back panels 108*b-e*.

Each audio speaker 102 is embedded within table body 106 (e.g., a wooden, polymer, or metal table body 106) such that each speaker 102 is covered by a solid, rigid, nondrapable structure, e.g., by respective portions 104*a-f* of rigid table body 106 adjacent respective speakers. The solid, nondrapable, rigid panels 108*a-e* of table base 106 are perforated in such portions 104*a-f* adjacent respective speakers to make each panel 108*a-e* a partially acoustically transparent structure.

Table body 106 of furniture assembly 104 thus includes perforated panels having respective portions 104*a-f* that are adjacent respective speakers 102, e.g., covering a respective speaker 102 either above the respective speaker 102 or to the side of the respective speaker 102, as shown in FIG. 1.

Table body 106 and its respective panels are made of solid, nondrapable, rigid materials, such as wood for example, which are perforated, e.g., such as having perforations drilled or otherwise formed therein. As shown in FIG. 1, such perforations in panel portions 104*a-f* adjacent respective speakers 102 are in the native surface of table body 106, as opposed to having separate, aesthetically displeasing, perforated, grill plates or covers that are not part of the native surface mounted onto the table body 106 and covering a respective speaker. By having perforations in the native surfaces of body 106, as shown in FIG. 1, as opposed to having a separately mounted perforated plate or perforated cover that is not part of the native surface, the perforations are less visible to a user and are more hidden from view, and less disruptive to the native surface of body 106, making the furniture assembly 104 more aesthetically pleasing, less disrupted, and more similar to a natural smooth surface.

As illustrated in FIG. 1, furniture assembly 104 is in the nature of a coffee table that includes a base 106 supported by legs, it being understood that the base 106 can alternatively rest directly on a floor or other structure upon which the furniture assembly 104 is to be positioned. The furniture assembly 104 shown in FIG. 1 has the form of a table, but it will be understood that a furniture assembly of the present invention having a perforated partially acoustically transparent rigid structure such as perforated portion 104*a* of base 106 can be a variety of standalone or built-in furniture assemblies, such as but not limited to chairs, sofas, bed frames, coffee tables, end tables, side tables, desks, servers, hutches, bookcases, cupboards, doors, credenzas, consoles, sideboards, cabinets, bookcases, cabinetry, wardrobes, or combinations thereof, etc.

The base 106 includes a top panel 108*a* having perforated portions 104*a*, 104*b*, each covering an adjacent, respective hidden speaker mounted within base 106, as well as end and front and back panels 108*b-e*, each having one or more respective perforated portions, 104*c*, 104*d*, 104*e*, 104*e* covering a respective adjacent hidden speaker 102 mounted within base 106. These panels also enclose or partially enclose an interior of the base 106, wherein speakers 102 are hidden from view, but are able to emit sound through base 106, the sound transmission of which is improved by the perforations in base 106.

As shown, in one embodiment, the perforations 117*a*, 117*b* are in a vertically or substantially vertically oriented portion of the perforated rigid structure in order to be more resistant to environmental factors, such as water that might spill on the top surface of table body 106.

According to embodiments of the present disclosure, speakers 102 are covered by perforated portions 104*a-f* and the speakers 102 are tuned to compensate for sound being emitted from each speaker 102 through the perforated, rigid (e.g., wooden, polymeric, etc., partially acoustically transparent base 106 by an adjustment to an equalization (e.g., so as to adjust the frequency response) of the at least one speaker 102 at one or more target frequencies or frequency bands. Adjustment of the equalization of one or more target frequencies or frequency bands depends on at least one of a perforation type, perforation amount, perforation size, perforation diameter, thickness of table base 106, type of material of table base 106, and other structural or environmental factors.

Further, the tuning of speakers 102 can be implemented by one or more speaker controllers in communication with and configured to control the tuning of each speaker 102. For example, furniture assembly 104 includes a receiver/amplifier 110, such being an example of a speaker controller, configured to receive signals from an audio source, such as mobile device 112 (via wired connection or wireless signal) and operable to transmit the received signals and provide power to speakers 102. Tuning of speakers 102 can thus be implemented by receiver/amplifier 110 via firmware or other known methods for adjusting the equalization of the output of an amplifier. Alternatively, tuning can be implemented by adjusting the equalization of the audio signals transmitted by the audio source (e.g., by execution of tuning software on mobile device 112).

Additionally, the tuning of speakers 102 can be made selectable by mobile device 112, or by any means for communicating with the receiver/amplifier 110, such as a remote controller, a control console, mobile device, such as a cellular phone, or combinations, modifications, or alternatives thereof. Alternatively, the tuning can be permanently implemented via firmware associated with receiver/amplifier 110. In some embodiments, a microphone 135 is also provided to enable custom tuning of speakers 102 according to the methods disclosed herein. Alternatively, the disclosed methods can be performed by the consumer using a microphone of mobile device 112.

While modular furniture assembly 104 is depicted with receiver/amplifier 110 mounted within base 106, embodiments also include receivers, amplifiers, and/or speaker controllers provided at virtually any location that allows for communication with speakers 102. For example, receiver/amplifier 110 can be integral with a center console or similar device, and can be connected to speakers 102 via wired or wireless connections. Alternatively, each speaker 102 can have a speaker controller individually associated therewith and secured directly or proximate thereto. One skilled in the art should appreciate that the illustrated embodiments are provided as exemplary configurations and do not limit the scope or spirit of the present disclosure to the physical configuration specifically illustrated.

While mobile device 112 is illustrated as an exemplary audio source, it will be appreciated that any of a wide variety of audio sources 112*b* may be used with the present systems (e.g., including, but not limited to television (TV), disc player such as a compact disk (CD) player, Digital Video Disc (DVD) player, Blu-ray player, over-the air radio, TV or other transmissions, etc.). Additionally, the mobile device 112 can be used not only as an audio source, but can optionally control other audio sources, such as those described herein, and so allow a user to tune the speakers 102 based upon the signals received by other audio sources. For instance, and not by way of limitation, the mobile device 112 can tune the speakers 102 based upon a TV, disc player such as a CD player, DVD player, Blu-ray player, over-the air radio, TV or other transmissions, etc. providing a signal to the receiver/amplifier 110. The mobile device 112 can, therefore, be another speaker controller.

As illustrated in FIGS. 1-3E, perforated portions 104*a*-*f* of base 106 have a plurality of perforations extending therethrough. The form, shape, size, and density of the perforations 117*a*-*b* can be varied based, at least in part, upon a type and thickness of material used to form the perforated portions, the perforation size, and the perforation amount.

Figure 2A:
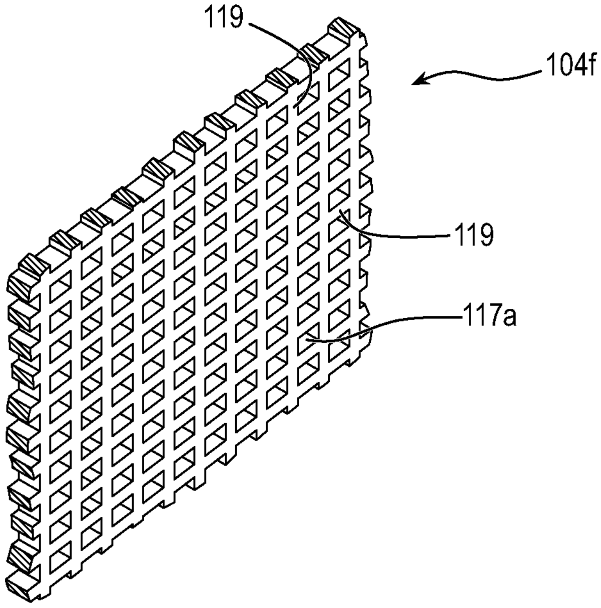
FIG. 2A illustrates a portion of a perforated partially acoustically transparent material.

For instance, as illustrated in FIGS. 1 and 2A, perforated portions 104*f* may have a mesh appearance in which the perforations 117*a* are square or rectangular shaped. The interlaced individual members 119 can have greater resistance to bending or deformation than an individual member 119 alone. The size, number, shape, and orientation of perforations 117*a* associated with the interlaced individual members 119 can vary based upon the materials forming the individual members 119, such as organic materials, polymeric material, natural material, composite materials and/or combinations thereof. The particular value selected for perforation size or amount may depend on the sound correction required to achieve the desired tuning profile, acceptable esthetics, as well as other factors. Additionally, an amount of perforation in a surface can be varied by interlacing the plurality individual members 119 more or less closely together. The tuning of speakers 102 described herein can accommodate for changes in hole 117*a* size or density.

In one embodiment, the perforations are sized in order to allow some of the sound from a particular speaker to be emitted therethrough, but are small enough that the perforations themselves are invisible or as hidden from view as possible, thus appearing as a more natural surface than a separate perforated plate or cover mounted onto a furniture surface.

Figure 2B:
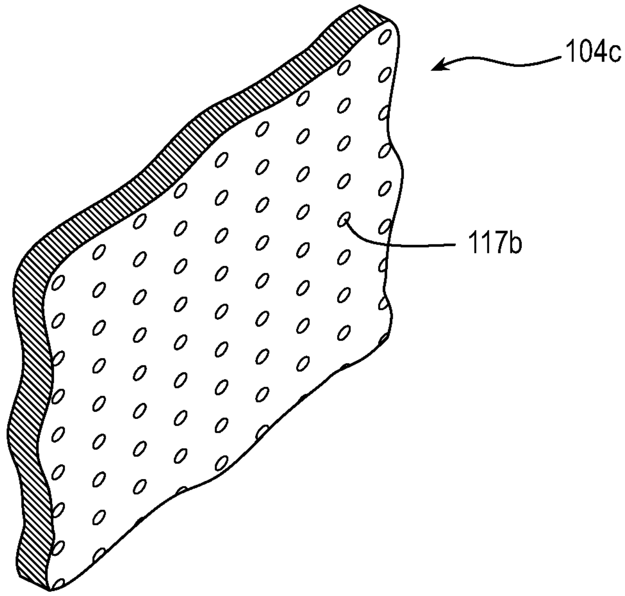
FIG. 2B illustrates a portion of another perforated partially acoustically transparent material.

In another configuration, such as illustrated in FIG. 2B, perforations of the partially acoustically transparent structure have a generally circular shape and can be formed within a monolithic structure (e.g., panels of table body 106 being monolithic panels) such as through drilling, molding, cutting, punching, piercing, laser cutting, puncturing, and/or combinations thereof. The monolithic structure can include organic materials, polymeric material, natural material, composite material, and/or combinations thereof. For instance, the perforated partially acoustically transparent structure can be formed of wood (such as MDF, other engineered wood or non-engineered wood), optionally with a veneer, in which the perforations 117*b* are drilled, cut, punched, pierced, laser cutting, punctured, and/or combinations thereof. In another configuration, the perforated partially acoustically transparent structure is formed of a polymer or composite panel or member in which the perforations 117*b* are drilled, cut, punched, pierced, laser cutting, punctured, and/or combinations thereof. As with the perforated partially acoustically transparent structure of FIG. 2A, a hole density, hole size, and perforation (void) fraction can be within the ranges and values stated herein.

Thus, the at least one speaker of the present invention is configured to be tuned by selection from a plurality of tuning profiles corresponding to: (i) material type of the perforated, rigid structure; (ii) perforation amount of the perforated rigid structure; (iii) thickness of the perforated rigid structure, and (iv) a perforation size of the perforations in the perforate rigid structure.

With respect to the amount of perforation, for example, in one embodiment, about 5% to about 70% of a portion, e.g., 104*c* of the rigid structure adjacent the at least one speaker 102 is perforated. In another embodiment, about 10% to about 60% of the portion 104*c* of the rigid structure adjacent the at least one speaker is perforated. In another embodiment, about 50% to about 60% of the portion 104*c* of the rigid structure adjacent the at least one speaker is perforated. In another embodiment, about 10% to about 30% of the portion 104*c* of the rigid structure adjacent the at least one speaker is perforated.

Figure 3A:
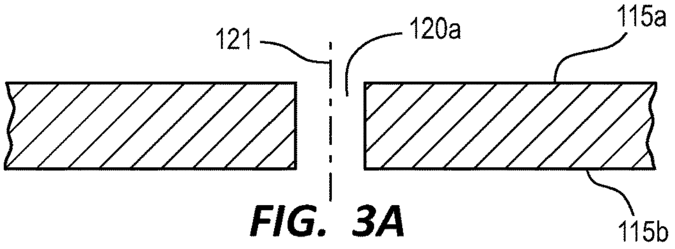
FIG. 3A illustrates a cross-sectional view of a perforation of a perforated partially acoustically transparent material.

A "perforation" or similar term herein means a hole that extends through the entire thickness of the structure, forming a passageway extending from one side of the structure to the other side of the structure, such as shown in connection with sample perforation 120*a* in FIG. 3A. A structure "is perforated" with a single perforation when such a single passageway extends therethrough, or with a plurality of perforations when a plurality of such passageways extend therethrough. In one embodiment, for example, 5 percent of a rigid structure is considered to be perforated when the area (e.g. $cm^2$) of the rigid structure is comprised of 95 percent solid material and (i) the other 5 percent of the area is accounted for by a single perforation through the solid material, or (ii) a plurality of perforations extend through the solid material that cumulatively account for the other 5 percent of the area. Thus, in one embodiment, about 95% to about 30% of the portion of the rigid structure adjacent the at least one speaker is solid, unperforated material, while about 5% to about 70% of the portion of the rigid structure adjacent the at least one speaker is perforated.

With respect to thickness, in one embodiment of the present invention, the thickness of the portion 104*c* of the perforated, rigid structure adjacent the at least one speaker is in the range of about 0.25 millimeter to about 30 millimeters. In another embodiment, the thickness of the portion 104*c* of the perforated, rigid structure adjacent the at least one speaker is in the range of about 0.5 millimeter to about 20 millimeters. In another embodiment, the thickness of the portion of the perforated, rigid structure adjacent the at least one speaker is in the range of about 1 millimeter to about 10 millimeters. In another embodiment, the thickness of the portion of the perforated, rigid structure adjacent the at least one speaker is in the range of about 1 millimeter to about 2 millimeters.

With respect to perforation diameter, in one embodiment, the diameter of each of the perforations 117*b* in the perforated rigid structure adjacent the at least one speaker is in the range of a micromillimeter to about 10 millimeters. In another embodiment, the diameter of each of the perforations 117*b* in the perforated rigid structure adjacent the at least one speaker is in the range of about 0.1 millimeter to about 10 millimeters. In another embodiment, the diameter of each of the perforations 117*b* in the perforated, rigid structure adjacent the at least one speaker is in the range of about 0.1 millimeter to about 5 millimeters. In another embodiment, the diameter of each of the perforations 117*b* in the perforated, rigid structure adjacent the at least one speaker is in the range of about 0.5 millimeter to about 1 millimeter.

Thus, considering perforation amount, thickness, and diameter, by way of example, in one embodiment, about 5% to about 70% of the portion 104*c* of the perforated rigid structure adjacent the at least one speaker is perforated; and the thickness of the portion 104*c* of the perforated, rigid structure adjacent the at least one speaker is in the range of about 0.25 millimeter to about 30 millimeters; and the diameter of each of the perforations 117*b* in the perforated rigid structure adjacent the at least one speaker is in the range of a micromillimeter to about 10 millimeters. In another embodiment, about 5% to about 70% of the portion 104*c* of the perforated, rigid structure adjacent the at least one speaker is perforated; and the thickness of the portion 104*c* of the perforated, rigid structure adjacent the at least one speaker is in the range of about 0.25 millimeter to about 30 millimeters; and the diameter of each of the perforations 117*b* in the perforated rigid structure adjacent the at least one speaker is in the range of about 0.1 millimeter to about 10 millimeters. In another embodiment, about 30% to about 60% of the portion 104*c* of the perforated, rigid structure adjacent the at least one speaker is perforated; and the thickness of the portion 104*c* of the perforated, rigid structure adjacent the at least one speaker is in the range of about 1 millimeter to about 2 millimeters; and the diameter of each of the perforations 117*b* in the perforated, rigid structure adjacent the at least one speaker is in the range of a about 0.25 millimeter to about 1 millimeter. In another embodiment, about 50% to about 60% of the portion 104*c* of the perforated, rigid structure adjacent the at least one speaker is perforated; and the thickness of the portion 104*c* of the perforated, rigid structure adjacent the at least one speaker is in the range of about 1 millimeter to about 2 millimeters, and the diameter of each of the perforations 117*b* in the perforated, rigid structure adjacent the at least one speaker is in the range of a about 0.5 millimeter to about 1 millimeter.

In addition to compensating for sound being emitted from each speaker 102 through perforated partially acoustically transparent structures having different perforation amount adjustments can be made to compensate for particular hole geometry, configuration, and orientation. For instance, as illustrated in FIGS. 3A-3F, the perforations of the present invention can have various orientations. While particular geometries, configurations, and orientations are illustrated, one skilled in the art would understand that various other geometries, configurations, and orientations can be contemplated by one skilled in the art based upon the disclosure herein.

As illustrated in FIG. 3A, certain examples of perforations 120*a* of the present invention, which may be used in any perforated structures discussed herein, have a central or longitudinal axis 121 that is generally perpendicular, i.e., at 90° relative to at least one of first surface 115*a* and second surface 115*b*. In contrast, in FIG. 3B, other examples of perforations 118*b* of the present invention, which may be used in any perforated structure discussed herein extend from first surface 115*a* in a direction transverse to the first surface 115*a*, i.e., the central or longitudinal axis 122 of the perforations 118*b* is non-perpendicular to the first surface 115*a*. The angle of such hole axis 121 relative bottom surface 115*b* may be any value, e.g., such as from 20° to 89°, or 25° to 85°, 30° to 80°, 35° to 75°, 40° to 70°, 45° to 65°, or 50° to 60°, for example.

Figure 3B:
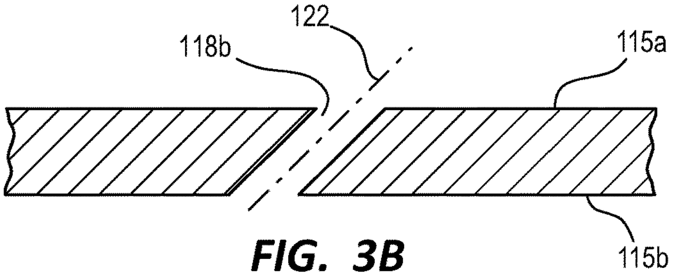
FIG. 3B illustrates a cross-sectional view of a perforation of a perforated partially acoustically transparent material.

The perforations of respective FIGS. 3A and 3B, which may be used in any perforated structure discussed herein, can have a generally uniform cross-sectional dimension along a length of the perforation. For instance, perforations 120*a*, 118*b* have a generally uniform circular cross-section so that the perforations are generally cylindrical. In other configurations the perforations can have other cross-sectional geometries, configurations, and orientations, such as, but not limited to, tapered cross-sections, polygonal, oval, elliptical, elongate along one axis of the hole, and combinations and/or modifications thereof.

Figure 3C:
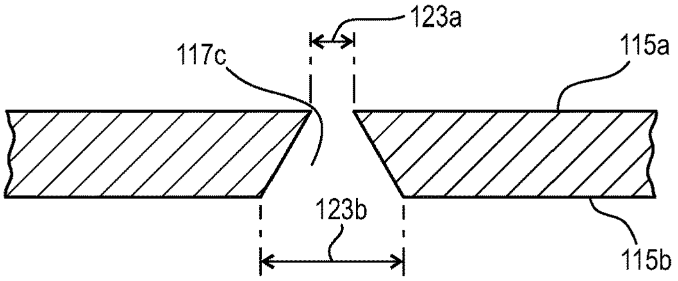
FIG. 3C illustrates a cross-sectional view of a perforation of a perforated partially acoustically transparent material.
Figure 3D:
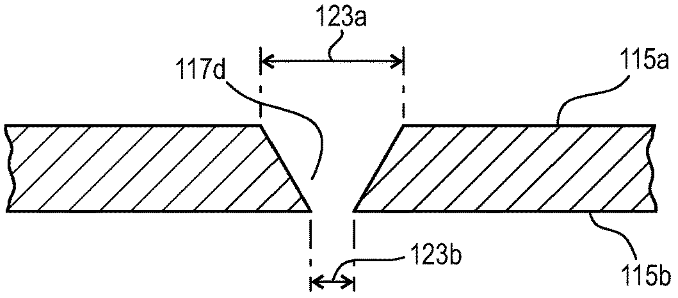
FIG. 3D illustrates a cross-sectional view of a perforation of a perforated partially acoustically transparent material.

Turning to FIGS. 3C and 3D, perforations 117*c*, 117*d*, which may be used in any perforated structure discussed herein, have a tapered orientation when viewed from a side. This can result in the perforations 117*c*, 117*d* having a frustoconical shape. In FIG. 3C, the hole 117*c* tapers from the first surface 115*a* to the second surface 115*b* so that opening 123*a* in the first surface 115*a* is smaller than opening 123*b* in the second surface 115*b*, while hole 117*d* of FIG. 3D tapers away from the first surface 115*b* so that opening 123*a* the first surface 115*a* is larger than opening 123*b* in the second surface 115*b*. It will be understood that the perforations of FIGS. 3C and 3D can be combined so that the hole can have a box-tie or bow-tie shape as viewed from the side, i.e., two frustoconical portions meeting with their smaller ends disposed between the first surface 115*a* and the second surface 115*b*. It will also be understood that one or both of the structures illustrated in FIGS. 3C and 3D can be combined with one or both of the structures of FIGS. 3A and/or 3B. Different hole shapes or sizes may be provided within the same perforated partially acoustically transparent structure. Perforations 117*c-d* may be employed in any of the structures discussed herein.

Figure 3E:
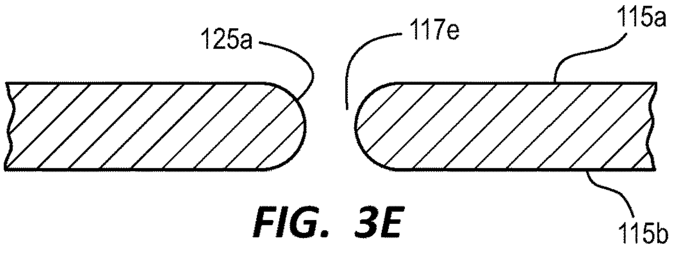
FIG. 3E illustrates a cross-sectional view of a perforation of a perforated partially acoustically transparent material.
Figure 3F:
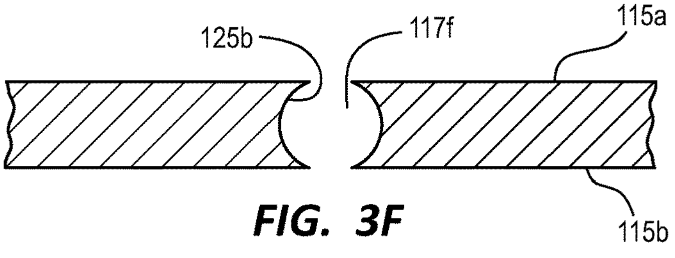
FIG. 3F illustrates a cross-sectional view of a perforation of a perforated partially acoustically transparent material.

Turning now to FIGS. 3E and 3F, a surface forming the perforations 117*e*, 117*f*, which may be used in any perforated structure discussed herein, can be curved, when viewed from a side, so that surface 125*a* is convex (FIG. 3E) or surface 125*b* is concave (FIG. 3F). The surfaces 125*a*, 125*b* forming the perforations 117*e*, 117*f*, can be combined with geometries, configurations, and orientations of the perforations 117*a*, 117*b*, 117*c*, 117*d*, illustrated, described, or otherwise contemplated with the disclosure of FIGS. 3A-3D, and vice versa. Perforations 117*e-f* may be employed in any of the structures discussed herein. Additionally, the perforated partially acoustically transparent structures can have perforations having the same or different geometries, configurations, and orientations over the perforated partially acoustically transparent structure and can have different densities of such perforations over the perforated partially acoustically transparent structure based, in part, upon one or more of desired sound properties or characteristics, perforated partially acoustically transparent structure aesthetics, and strength of the perforated partially acoustically transparent structure.

Speakers 102 are embedded within the solid, rigid base 106 and are hidden from view. As shown in FIG. 1, to provide further options and functionality to a user, one or more induction electrical chargers 121 can be mounted to and embedded within table base 106 and hidden from view for aesthetic purposes. The induction charger(s) 121, which provide wireless electrical charging to various electrical devices selectively mounted on base 106, may be covered by and adjacent to a portion of the partially acoustically transparent material having a thickness of about 0.25 millimeter to about 30 millimeters, or about 0.5 millimeter to about 20 millimeters, or about 1 millimeter to about 10 millimeters, for example, such that the charger(s) is/are embedded within base 106 and hidden from view. Such chargers 121 may be embedded about 0.25 millimeter to about 30 millimeters below the surface of base 106, about 0.5 millimeter to about 20 millimeters below the surface of base 106, or about 1 millimeter to about 10 millimeters below the surface of base 106, for example, such that the charger(s) is/are embedded within base 106 and conveniently hidden from view. This allows the user to conveniently, wirelessly charge an electrical device by placing the device above the embedded, hidden induction charger while conveniently listening to the speakers 102 without requiring or seeing any unsightly or tangled cords or wires.

Thus, furniture assembly 104, or other solid, rigid furniture assemblies or portions thereof having perforations therein, such as tables, coffee tables, end tables, side tables, bed frames, cabinets, chairs, etc. of the present invention can have audio speakers and electrical induction charger(s) embedded therein and hidden from view, as shown, for example, in FIG. 1, for convenient integrated wireless charging of electrical devices via electrical induction chargers that are hidden from view and for conveniently listening to music, etc. from hidden speakers (e.g., surround sound speakers) tuned through the rigid structures.

As shown in FIG. 1, each speaker 102 is connected by a wire 116 to a speaker controller 118 that controls tuning of each speaker. Alternatively, speaker 102 can be in wireless communication with speaker controller 118, or individual speaker controllers can be directly integrated with each speaker 102. In an embodiment, speaker controller 118 may include an amplifier and/or receiver. Speakers 102 can be tuned, according to the methods described herein, to account for sound loss through a variety of perforated partially acoustically transparent structures 113. For example, speaker controller 118 can include firmware operable to adjust decibel level (volume) of one or more target frequencies or frequency bands emitted by speakers 102, depending on the particular perforated partially acoustically transparent structure covering the speaker. Alternatively, the frequency response of speakers 102 can be adjusted by altering the signal received and transmitted by speaker controller 118 to speakers 102. In any case, the signal sent to any given speaker may be altered to "boost" one or more target frequencies or frequency ranges of the audio signal before transduction of such signal by the speaker. The amount of such "boost" will depend on the particular perforated partially acoustically transparent material covering the speaker 102.

Referring now to the drawings, FIG. 1 illustrates a sample furniture assembly having perforations to enhance its acoustic properties. The disclosure of the present invention is also applicable to the other furniture systems described herein, such as the furniture systems discussed with respect to FIGS. 4A-15B. Furthermore, the tuning and adjustment techniques and profiles and the sound compensation, equalization, and adjustment techniques discussed with respect to FIGS. 4A-15B are applicable to the furniture systems of FIGS. 1-3F, such that the sound compensation, tuning and adjustment techniques and methods discussed with respect to FIGS. 4A-15B can also be employed with respect to the furniture systems of FIGS. 1-3F. For example, the techniques discussed with respect to FIGS. 4A-15B can be employed in connection with the furniture systems of FIGS. 1-3F and further adjustments can be made by adjusting the amount, size and/or diameter of the respective perforations in a rigid structure, and/or the thickness and type of a perforated rigid material adjacent a speaker. Thus, the tuning, equalization, and sound compensation techniques and disclosure discussed with respect to the furniture structures of FIGS. 4A-15B can be applied to the furniture structures of FIGS. 1-3F.

Figure 4:
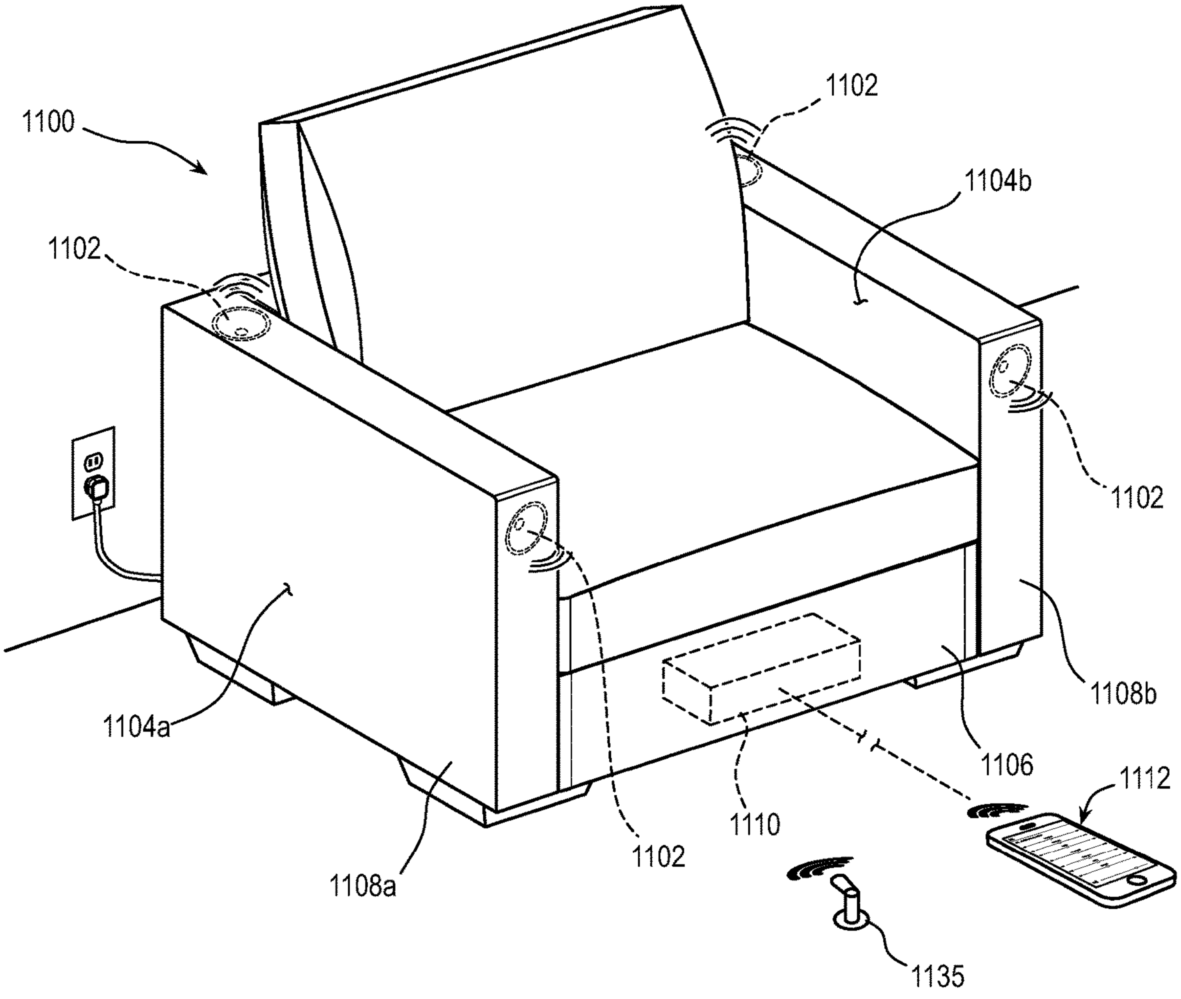
FIG. 4 illustrates a perspective view of a modular furniture assembly having audio speakers mounted thereto, each audio speaker being covered by an upholstery fabric.

FIG. 4, illustrates a modular furniture assembly 1100 having an embedded speaker system including multiple audio speakers 1102 integrated with modular furniture assembly 1100, each audio speaker 1102 being covered by an upholstery fabric **1104*a*, 1104*b*. Such fabric 1104*a*, 1104*b* is an example of a partially acoustically transparent material. As illustrated, modular furniture assembly 1100 includes a base 1106, and first and second audio-enhanced upright members 1108*a*, 1108*b*, each audio-enhanced upright member 1108*a*, 1108*b* having, in the illustrated configuration, two audio speakers 1102 mounted thereto. First and second upholstery fabrics 1104*a*, 1104*b* cover first and second audio-enhanced upright members 1108*a*, 1108*b*, thus also covering each of speakers 1102 embedded within upright members 1108*a*, 1108*b*. Modular furniture assembly 1100** can also include a variety of additional components, such as cushions, feet, additional bases and upright members (audio-enhanced or not), and additional embedded speakers.

According to embodiments of the present disclosure, the system of speakers 1102 covered by upholstery fabric **1104*a*, 1104*b*, are tuned to compensate for sound being emitted from each speaker 1102 through upholstery fabric 1104*a*, 1104*b* by an adjustment to an equalization (i.e., adjustment of the frequency response) of the at least one speaker at one or more target frequencies or frequency bands. Adjustment of the equalization of one or more target frequencies or frequency bands can depend on at least one of a fabric type, a density, a thickness, and a weight of upholstery fabric 104*a*, 104*b***, for example.

Further, the tuning of speakers 1102 can be implemented by one or more speaker controllers in communication with and configured to control the tuning of each speaker 1102. For example, modular furniture assembly 1100 includes a receiver/amplifier 1110, such being an example of a speaker controller, configured to receive signals from an audio source, such as mobile device 1112 (via wired connection or wireless signal) and operable to transmit the received signals and provide power to speakers 1102. Tuning of speakers 1102 can thus be implemented by receiver/amplifier 1110 via firmware or other known methods for adjusting the equalization of the output of an amplifier. Alternatively, tuning can be implemented by adjusting the equalization of the audio signals transmitted by the audio source (e.g., by execution of tuning software on mobile device 1112). Additionally, the tuning of speakers 1102 can be made selectable by mobile device 1112, or by any means for communicating with the receiver/amplifier 1110, such as a remote controller, a control console, mobile device, such as a cellular phone, or combinations, modifications, or alternatives thereof. Alternatively, the tuning can be permanently implemented via firmware associated with receiver/amplifier 1110. In some embodiments, a microphone 1135 is also provided to enable custom tuning of speakers 1102 according to the methods disclosed herein. Alternatively, the disclosed methods can be performed by the consumer using a microphone of mobile device 1112.

While modular furniture assembly 1100 is depicted with receiver/amplifier 1110 mounted within base 1106, embodiments also include receivers, amplifiers, and/or speaker controllers provided at virtually any location that allows for communication with speakers 102. For example, receiver/amplifier 1110 can be integral with a center console or similar device, and can be connected to speakers 1102 via wired or wireless connections. Alternatively, each speaker 1102 can have a speaker controller individually associated therewith and secured directly or proximate thereto. One skilled in the art should appreciate that the illustrated embodiments are provided as exemplary configurations and do not limit the scope or spirit of the present disclosure to the physical configuration specifically illustrated.

While mobile device 1112 is illustrated as an exemplary audio source, it will be appreciated that any of a wide variety of sources may be used with the present systems (e.g., including, but not limited to TV, disc player such as a CD player, DVD player, Blu-ray player, over-the air radio, streaming service, TV or other transmissions, etc.). Additionally, the mobile device 1112 can be used not only as an audio source, but can optionally control other audio sources, such as those described herein, and so allow a user to tune the speakers 1102 based upon the signals received by other audio sources. For instance, and not by way of limitation, the mobile device 1112 can tune the speakers 1102 based upon a TV, disc player such as a CD player, DVD player, Blu-ray player, over-the air radio, streaming service, TV or other transmissions, etc. providing a signal to the receiver/amplifier 1110. The mobile device 1112 can, therefore, be another speaker controller.

Figure 5A:
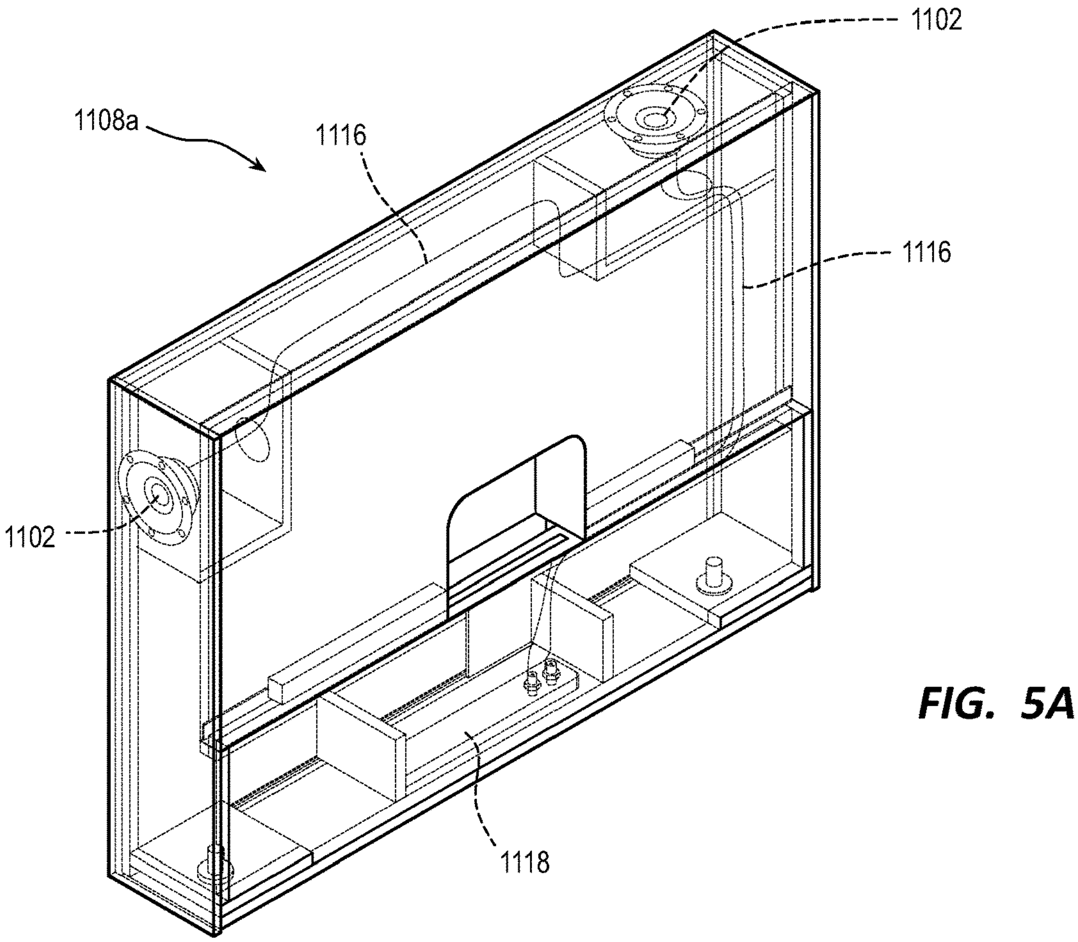
FIG. 5A illustrates a perspective view of an upright member of a modular furniture assembly having audio speakers mounted thereto.
Figure 5B:
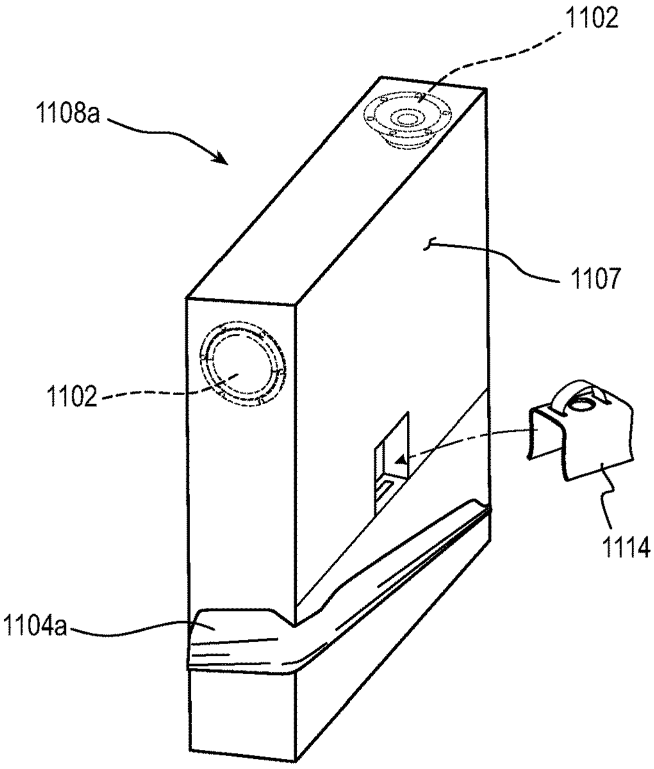
FIG. 5B illustrates a perspective view of the upright member of FIG. 5A with a removable upholstery fabric cover being applied thereto.

FIGS. 5A-5B demonstrate an example upright member 108*a* of an assemble-able modular furniture assembly, such as furniture assembly 1100 of FIG. 1, having audio speakers 1102 mounted to an internal framework thereof. A fabric cover 1104*a* including an upholstery fabric 1107 is operable to cover upright member 1108*a*, thus covering and concealing speakers 1102 from view. Fabric cover 1104*a* can thus be removed from upright member 1108*a* to be cleaned, to enable access to and maintenance of speakers 1102 and any other components mounted within upright member 1108*a*, or to exchange the fabric cover 104*a* with another cover designed to fit upright member 1108*a*. In some embodiments, consumers may select one or more interchangeable fabric covers 1104*a* from a catalog of upholstery fabrics 1107. Available upholstery fabrics include but are not limited to polyester, chenille, tweed, linen, polyester linen, velvet, leather, cotton, cotton blend, denim, twill, or faux fur. As shown, a coupler 1114 is provided to enable upright member 108*a* to be selectively and securely mounted to a base, such as base 1106 of FIG. 1. Although upright member 108*a* is shown in detail in FIGS. 5A-5B, it will be appreciated that upright member 108*b* may be similarly configured, but in a mirror configuration to upright member 108*a*, as apparent from FIG. 1.

As shown in FIG. 5A, each speaker 102 of upright member 108*a* is connected by a wire 1116 to a speaker controller 1118. Alternatively, speaker 1102 can be in wireless communication with speaker controller 1118, or individual speaker controllers can be directly integrated with each speaker 1102. Speakers 1102 can be tuned, according to the methods described herein, to account for sound loss through a variety of upholstery fabrics 1107. For example, speaker controller 1118 can include firmware operable to adjust one or more target frequencies or frequency bands emitted by speakers 1102, depending on the particular fabric within which the speaker is covered. Alternatively, the frequency response of speakers 1102 can be adjusted by altering the signal received and transmitted by speaker controller 1118 to speakers 1102. In any case, the signal sent to any given speaker may be altered to "boost" one or more target frequencies or frequency ranges of the audio signal before transduction of such signal by the speaker. The amount of such "boost" will depend on the particular fabric with which the speaker 1102 is covered, as exemplified by FIGS. 7-8H.

Figure 5C:
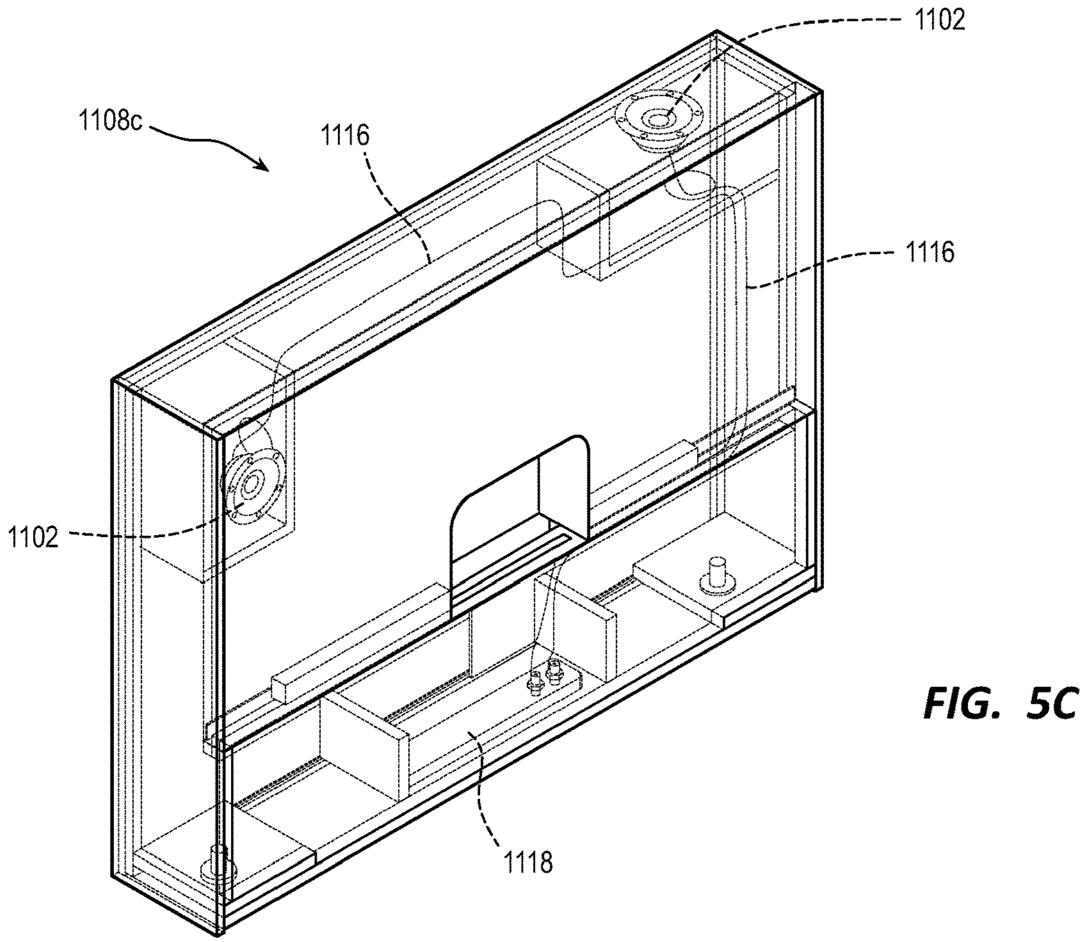
FIG. 5C illustrates a perspective view of another upright member of a modular furniture assembly having audio speakers mounted thereto.
Figure 5D:
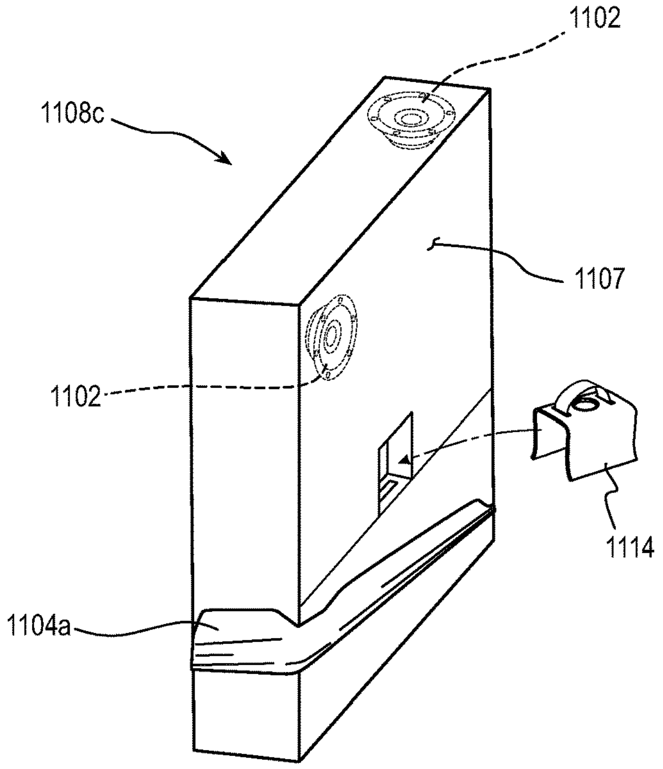
FIG. 5D illustrates a perspective view of the upright member of FIG. 5C with a removable upholstery fabric cover being applied thereto.
Figure 5E:
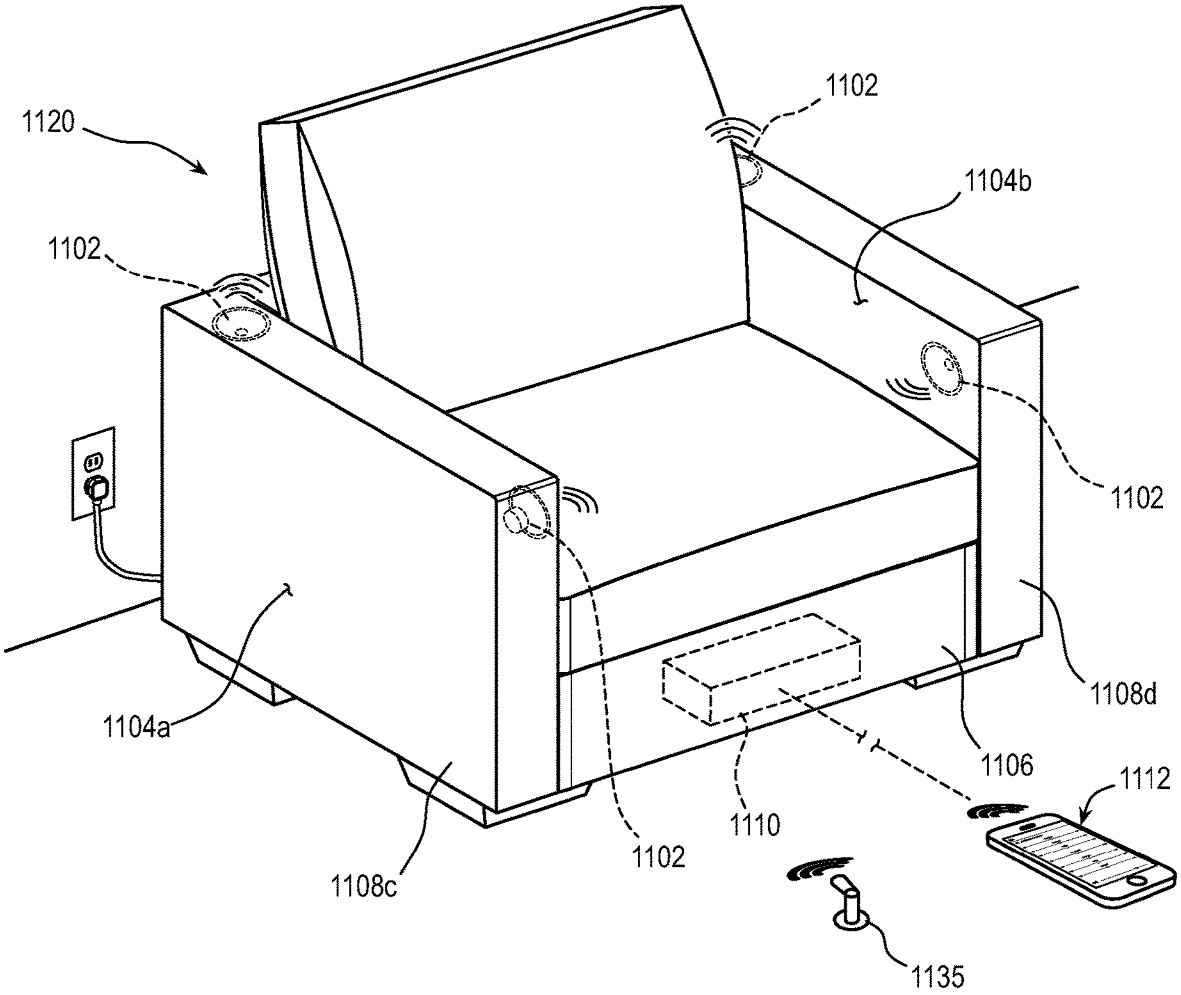
FIG. 5E illustrates a perspective view of a modular furniture assembly formed using upright members with speakers positioned therein as shown in FIGS. 5C-5D.

FIGS. 5A-5B illustrate an upright member configuration where the illustrated audio-enhanced upright member includes two speakers mounted therein, for example, with a front channel speaker positioned in a front edge of the upright member (near a top of the front edge), and a surround speaker positioned in a top edge of the upright member (near a rear of the top edge). FIGS. 5C-5D are similar to FIGS. 5A-5B, but show an alternative speaker placement, where the front channel speaker 1102 is positioned in an inside face of the upright member 1108*c* (e.g., near the top, front corner), and the surround speaker 1102 is positioned similar to that shown in FIGS. 5A-5B, in a top edge of the upright member 1108*c*, near a rear of the top edge of the upright member. The configuration seen in FIGS. 5C-5D may thus include front channel speaker placement such that the sound is emitted directly towards the seating position on a chair or sofa. FIG. 5E illustrates such a chair 1120, including upright members 108*c*, 108*d*, configured as shown in FIGS. 5C-5D. The configuration of FIGS. 5A-5B includes a front channel speaker placement that may rely on reflection of sound emitted from the front channel speakers off a front wall, TV or the like, for reflection back to the user seated on the chair or sofa. It will be apparent that many alternatives are possible, for placement and positioning of the speakers within the upright members. Any of such may benefit from the embodiments described herein, whereby equalization is applied to the audio signal to compensate for the sound from the speakers being emitted through upholstery fabric that covers the speakers.

FIGS. 6A-6D illustrate perspective views of modular furniture assemblies 1122*a-d* of various configurations, each having multiple audio speakers 1102 mounted thereto, each audio speaker 1102 being covered by an upholstery fabric 1104. As illustrated, a variety of furniture configurations can be achieved by rearrangement of the various bases 1106 and upright members 1108, and by introducing additional members. Also, interchangeable fabric covers can be provided, such that the consumer may select the upholstery fabric 1107 for the entire assembly or for each individual member of the assembly. Embodiments of the present disclosure enable tuning of any speaker covered by fabric to account for sound loss through virtually any fabric.

Figure 6A:
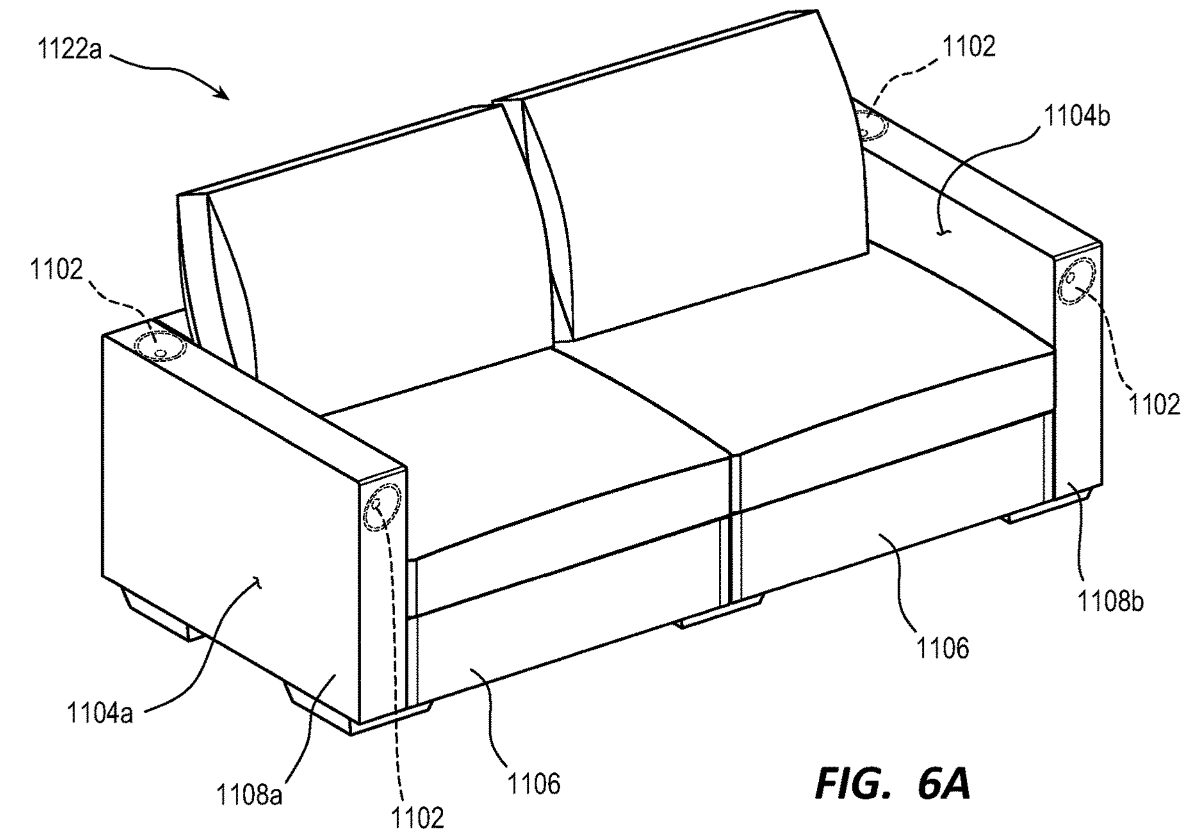
FIGS. 6A-6D illustrate perspective views of modular furniture assemblies of various configurations, each having audio speakers mounted thereto, each audio speaker being covered by an upholstery fabric.

As shown in FIG. 6A, modular furniture assembly 1122*a* includes two audio-enhanced upright members 1108*a-b*, each arranged relative to bases 1106 to act as armrests. Audio-enhanced upright members 1108*a-b* each have two speakers 1102 mounted thereto, one speaker facing forward and one speaker facing upward. Each of speakers 1102 are positioned underneath upholstery fabric covers 1104*a* or 1104*b* covering respective audio-enhanced upright members 1108*a* or 1108*b*. Each speaker 1102 may be tuned so that sound emitted from the speaker compensates for sound loss though respective upholstery fabric covers 1104*a* or 1104*b*.

Figure 6B:
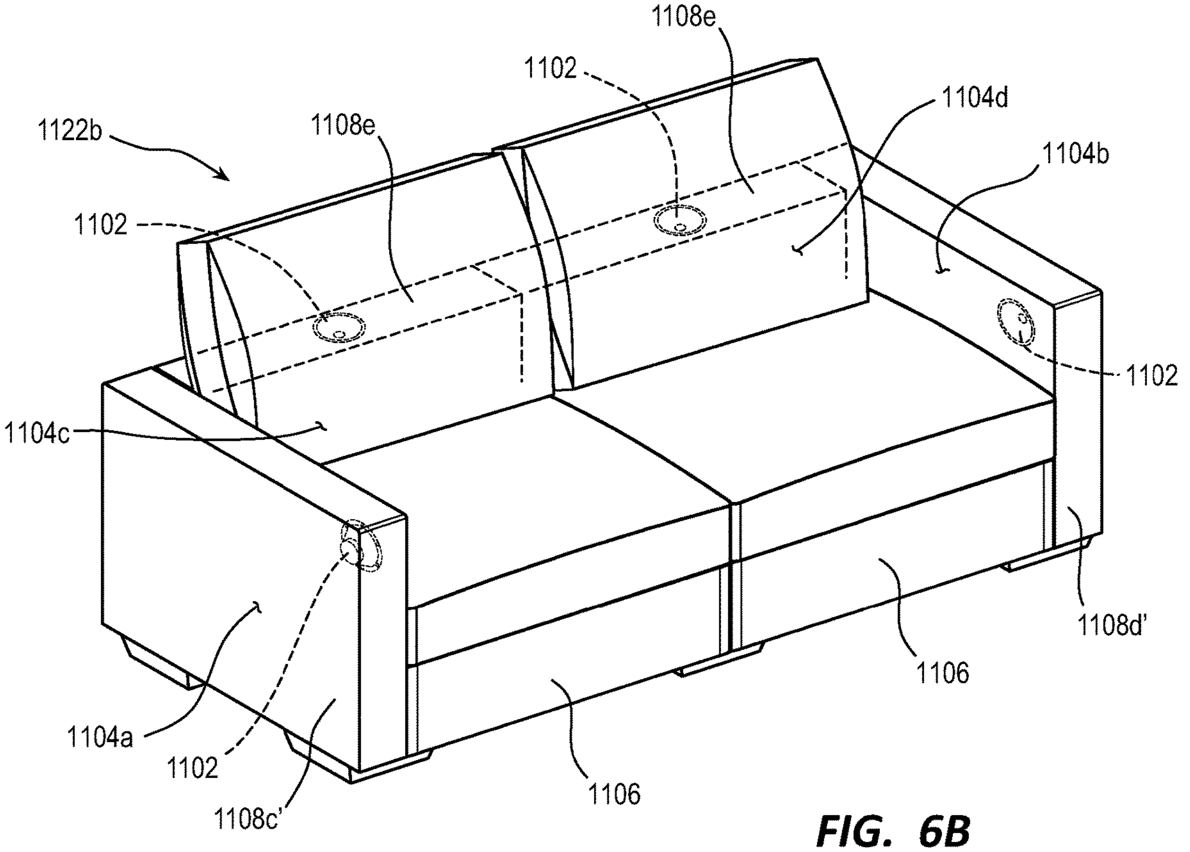

FIG. 6B illustrates a modular furniture assembly 1122*b* having four audio-enhanced upright members 11'8*c*', 11'8*d*' 1108*e*, each having a single speaker 1102 mounted thereto. Audio-enhanced upright member 11'8*c*' and 11'8*d*' each act as an armrest and include a speaker 1102 oriented inward, towards bases 1106, whereas audio-enhanced upright members 1108*e* each provide a backrest and include a speaker 1102 oriented upward and positioned behind respective bases 1106. Also, each audio-enhanced upright member 11'8c', 11'8d', 1108e is covered in a upholstery fabric cover 1104a-d, such that each speaker 1102 of modular furniture assembly 1122b is positioned underneath one of upholstery fabric covers 1104a-d. Accordingly, each speaker 1102 of modular furniture assembly 1122b may be tuned so that sound emitted from the speaker compensates for sound loss though respective upholstery fabric covers 1104a, 1104b, 1104c, or 1104d. In an embodiment, the various covers of a given furniture assembly may be of the same given material, or of different fabric materials (e.g., one given material on the bases, another on the upright members, or a mix and match configuration between various bases and/or upright members).

Figure 6C:
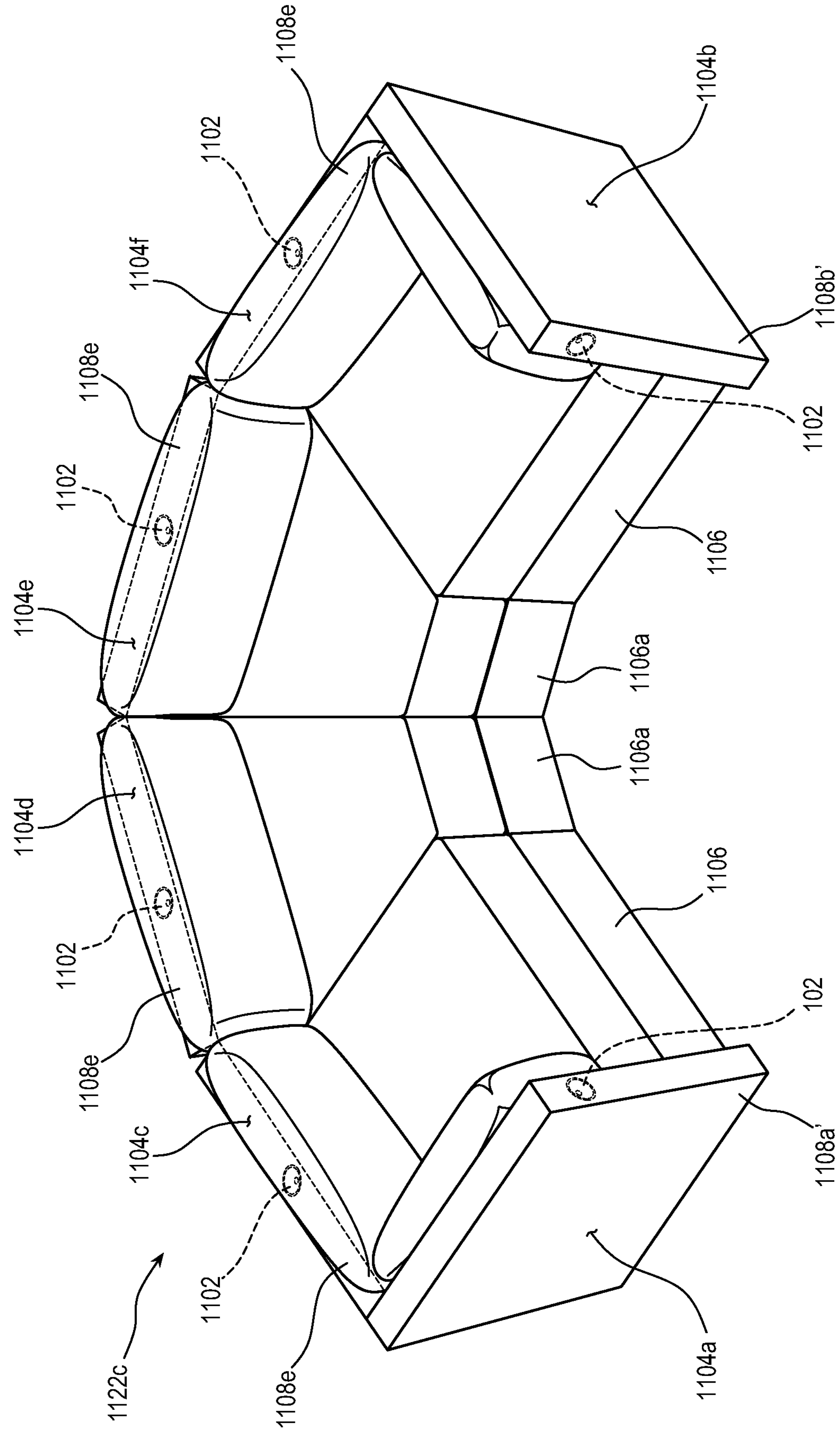

By way of an additional example, FIG. 6C illustrates modular furniture assembly 1122c, wherein six audio-enhanced upright members 11'8a', 11'8b', 1108e are arranged about bases 1106, 1106a, where the two bases 1106a are wedge-shaped to create a curved style of sofa or couch. As shown, audio-enhanced upright members 11'8a' and 11'8b' act as armrests and include mounted speakers 1102 oriented forwards, the other audio-enhanced upright members 1108e acting as backrests and each having a speaker 1102 oriented upwards. Upright members 11'8c' and 11'8d' may be similar to upright members 1108c and 1108d, except that upright members 11'8c' and 11'8d' are shown as including only a single speaker each (e.g., in the inside face), without any surround speaker. Each of upright members 1108e may be identically configured to one another, as shown (e.g., with a single surround speaker positioned centrally, within the top edge of the upright member). Upright members 11'8a' and 11'8b' may be similar to upright members 1108a and 1108b, except that upright members 11'8a' and 11'8b' are shown as including only a single speaker each (e.g., in the front edge), without any surround speaker. As with the prior examples, each speaker 1102 is positioned beneath one of upholstery fabric covers 1104a-f and can be tuned to compensate for sound loss through respective upholstery fabric cover 1104a, 1104b, 1104c, 1104d, 1104e, or 1104f.

Figure 6D:
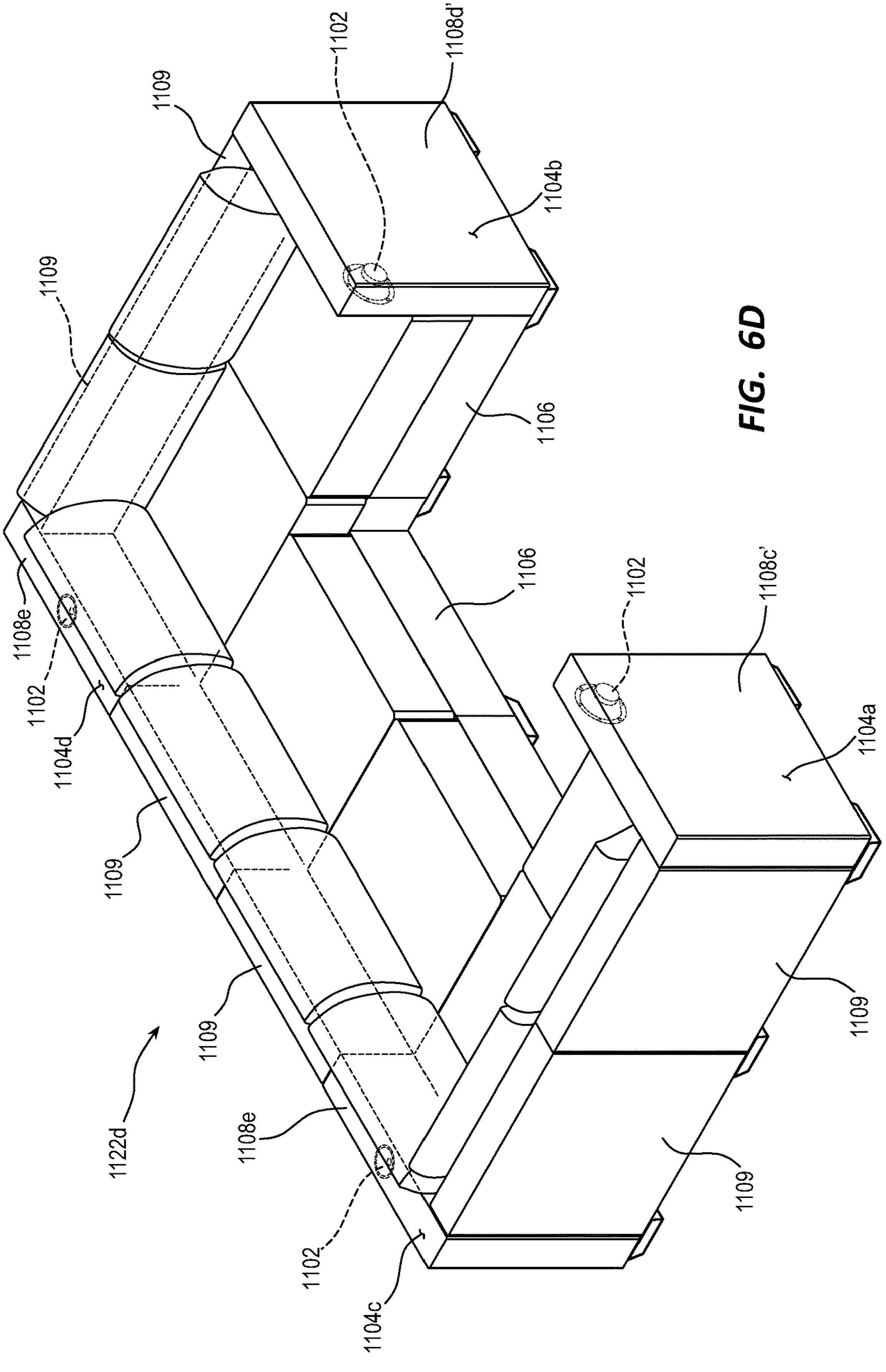

As yet another example, FIG. 6D illustrates modular furniture assembly 1122d having four audio-enhanced upright members 11'8c', 11'8d', 1108e and with six bases 1106 and several non-audio-enhanced upright members 1109 to form a U-shaped sofa or couch. As shown, audio-enhanced upright members 11'8c' and 11'8d' provide armrests and each include a speaker 1102 oriented inward, whereas audio-enhanced upright members 108e provide backrests and each include a speaker 1102 oriented upward. As with the other examples provided, speaker 1102 of each audio enhanced upright member 11'8c', 11'8d', 1108e is positioned beneath respective upholstery fabric covers 1104a-d and can be tuned to compensate for sound loss through respective upholstery fabric covers 1104a, 1104b, 1104c, and 1104d.

Although FIGS. 4-6D illustrate particular combinations of specifically configured upright members with various bases, it will be appreciated that any of the described upright members and bases may be used in any combination, with any desired speaker placement, size, or orientation in the upright members, and with any desired placement of the upright members relative to the bases, to provide any of a wide variety of furniture configurations.

Because the speakers are positioned within the modular furniture assembly components, this provides great flexibility to a user in where the speakers can be positioned within the assembled furniture assembly, whether the assembly is modifiable by the user, custom built according to the user's request, or otherwise provided. Further, the use of interchangeable covers for each of the modular furniture assembly components enables the user to change upholstery fabrics at will. Accordingly, embodiments of the present disclosure also enable a user to selectively tune the speakers of an audio-enhanced furniture assembly to compensate for sound loss through the fabric selected by the user, as discussed further herein.

Figure 7A:
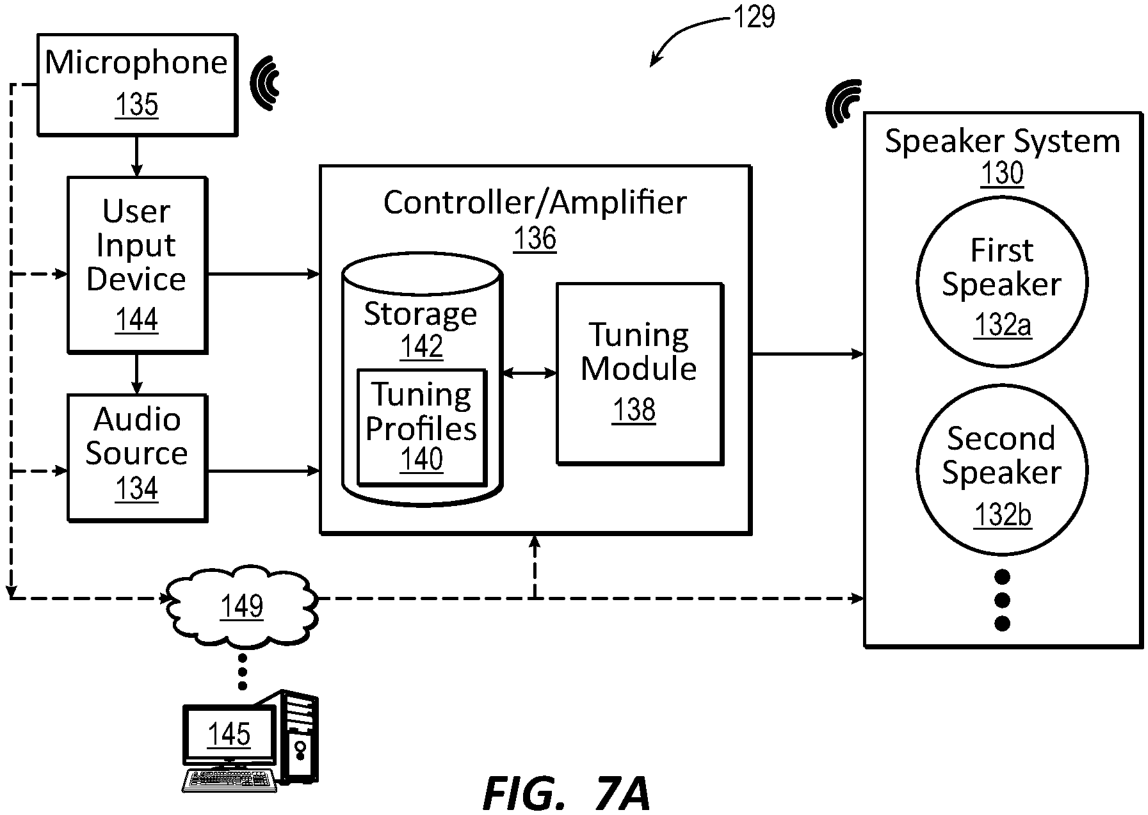
FIGS. 7A-7C illustrate schematics of exemplary audio systems operable to tune speakers to compensate for sound loss through any of the partially acoustically transparent materials discussed herein.
Figure 7B:
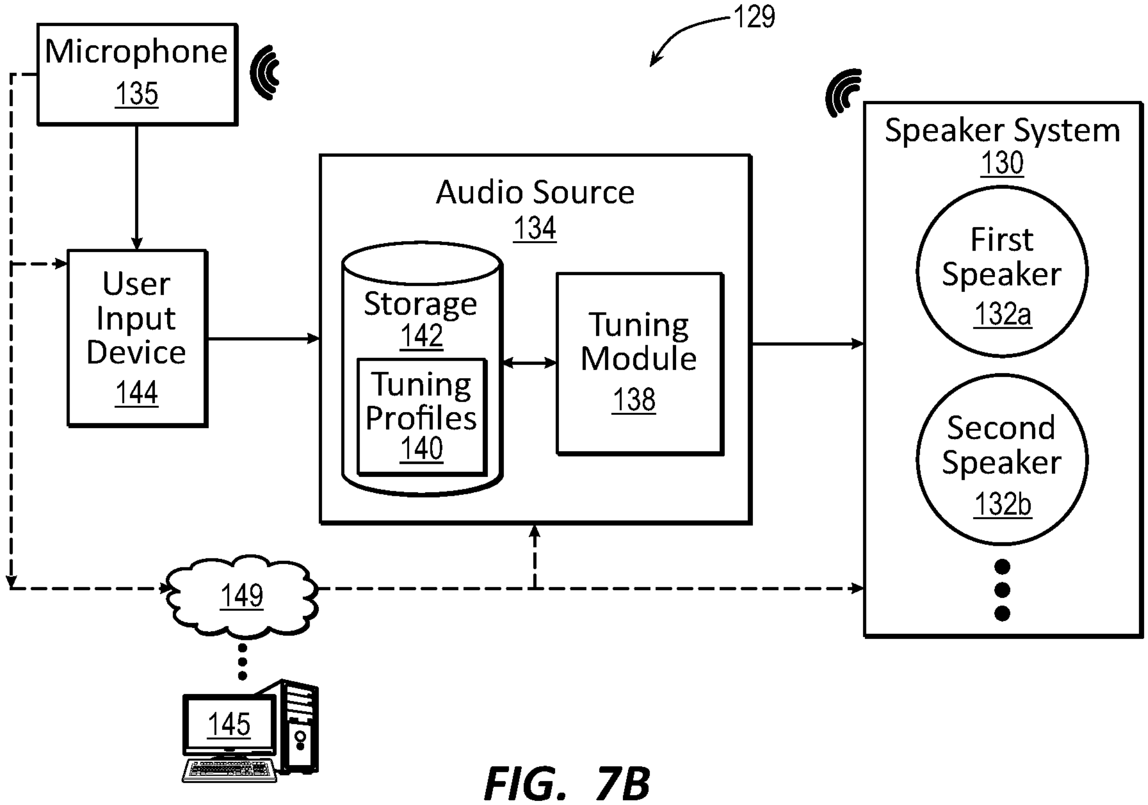
Figure 7C:
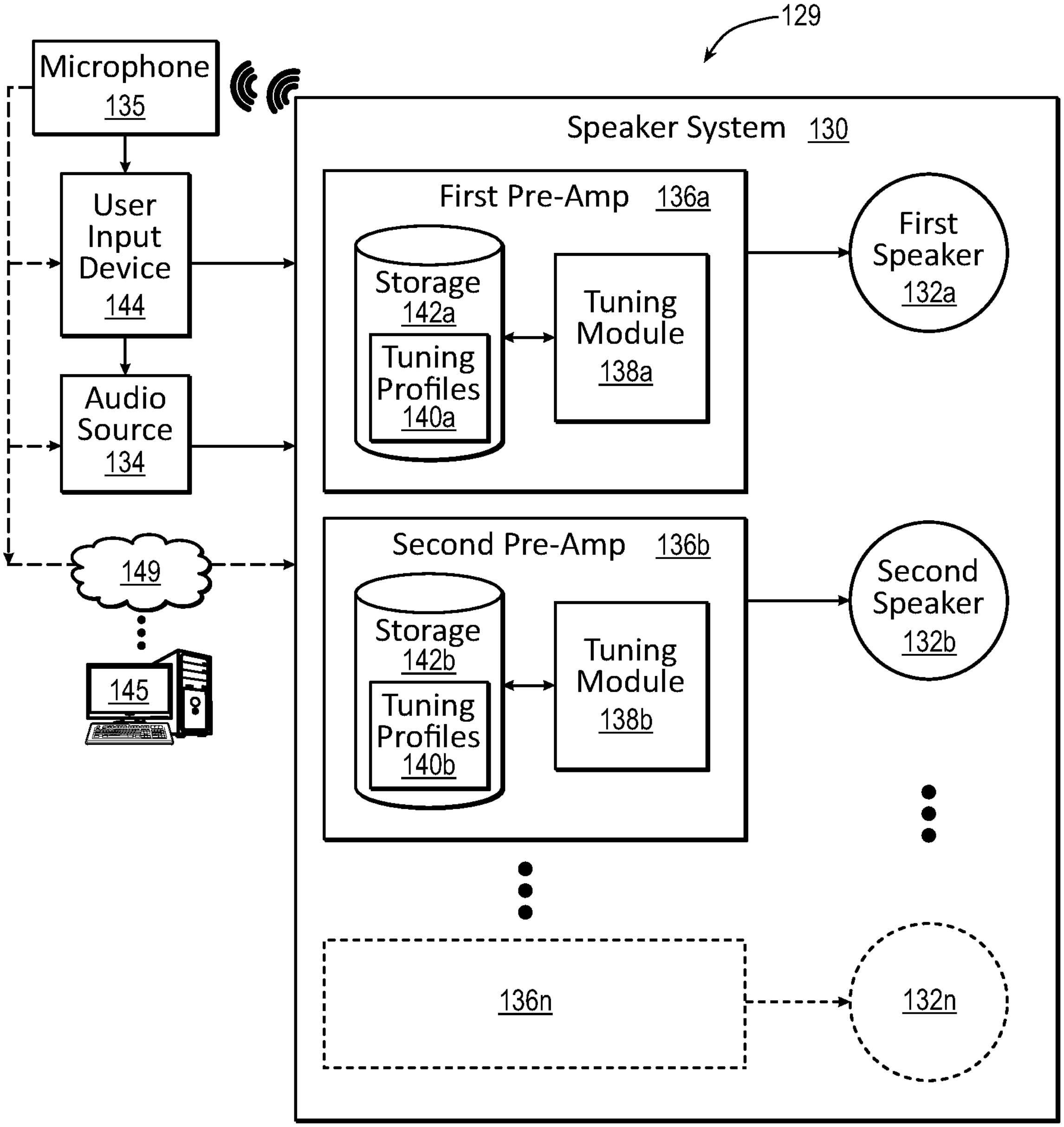

Referring now to FIGS. 7A-7C, schematics of exemplary audio systems operable to tune speakers to compensate for sound loss through partially acoustically transparent material (e.g., fabrics or perforated, rigid structures) are illustrated. As shown, each audio system 129 includes a speaker system 130 having a first speaker 132a, a second speaker 132b, and any number of additional speakers. Each audio system 129 also includes an audio source 134 configured to transmit audio signals to be emitted by speaker system 130, as well as a user input device 144 operable to control various aspects of the audio system 129, such as adjustment of the output of audio source 134 or modification of one or more settings of controller or amplifier 136. User input device 144 can be a separate component of the audio system 129, such as a console, remote controller, or a mobile device, or can be an integral component of audio source 134, such as a user interface on an audio receiver. One should appreciate that the provided exemplary audio systems 129 are for illustrative purposes and do not limit the scope of the present disclosure.

In the example illustrated by FIG. 7A, a controller or amplifier 136 includes a tuning module 138 operable to adjust one or more frequencies or frequency bands of a received audio signal as it is transmitted to speaker system 130 by amplifier 136. Tuning module 138 can be implemented, for example, by firmware directly integrated with amplifier 136. In some embodiments, a tuning profile 140 is selectable from a plurality of tuning profiles 140 stored within a storage 142 associated with the controller or amplifier 136. For instance, tuning module 138 may incorporate a tuning profile associated with a particular partially acoustically transparent material in response to a user's selection of a tuning profile from tuning profiles 140 via user input device 144. Controller or amplifier 136 can be operable to tune speaker system 130 as a whole, or to tune each individual speaker 132 separately, or both. By incorporating the tuning module within amplifier 136, speaker system 130 can be tuned irrespective of audio source 134.

Alternatively, the exemplary audio system 129 of FIG. 7B illustrates an audio source 134 having a tuning module 138 operable to tune speaker system 130 to compensate for sound loss through partially acoustically transparent material by selection of a tuning profile from a plurality of tuning profiles 140 from a storage device 142 of audio source 134. Accordingly, a user input device 144 can be used to select a tuning profile 140 corresponding to a particular partially acoustically transparent material, and tuning module 138 can apply the selected tuning profile 140 to adjust the equalization or frequency response of speaker system 130 at one or more target frequencies or frequency bands. By incorporating tuning module 138 within audio source 134, an existing speaker system 130 can be tuned without the need for a specialized amplifier or controller.

As illustrated in FIG. 7C, another alternative exemplary audio system 129 includes a speaker system 130 wherein first and second pre-amps 136a, 136b are associated with respective first and second speakers 132a, 132b to independently tune each speaker 132a, 132b for sound loss through a partially acoustically transparent material, thus enabling each speaker to be covered by a different partially acoustically transparent material and still be tuned with a tuning profile specific to the partially acoustically transparent material. Accordingly, each pre-amp 136*a*, 136*b* includes a respective storage device 142*a*, 142*b* from which a tuning profile is selectable from a plurality of tuning profiles 140*a*, 140*b*. A user can thus select a tuning profile for each individual speaker 132 by use of user input device 144, such that the equalization of an audio signal received from audio source 134 by respective pre-amps 136*a*, 136*b* is adjusted prior to transmission to respective speakers 132*a*, 132*b*. In an embodiment, all speakers (e.g., 132*a*, 132*b*, etc.) within the system may have the same tuning profile 140 applied thereto (e.g., all speakers adjusted to compensate for sound emission through a given partially acoustically transparent material). Alternatively, each speaker may have a different individual tuning profile 140 applied thereto when different partially acoustically transparent materials cover each speaker.

Embodiments also include methods and systems for enabling speaker system 130 to be configured by a user to account for sound loss through any fabric covering speakers 132*a*, 132*b*, for example, of speaker system 130 without a predetermined tuning profile (e.g., methods allowing a user to create a new tuning profile corresponding to the actual fabric covering speakers 132*a*, 132*b*, etc.). For instance, FIGS. 7A-7C each depict a microphone 135 configured to receive and measure sounds emitted by speaker system 130. As illustrated, microphone 135 is in communication with at least one (or both) of user input device 144 or network 149. The microphone 135 is located outside of the partially acoustically transparent material associated with each speaker, such that microphone 135 is configured to receive and measure sound as heard as it passes though the partially acoustically transparent material.

Such auto-tuning embodiments further includes using the user input device 144 as a computer system that is operable to apply the methods disclosed herein. The user input device 144 is in communication with network 149 and includes a necessary hardware and software for implementing the disclosed methods. Alternatively, a separate personal computer, a mobile device, and so forth could communicate with the microphone 135, either directly or via the network 149. As such, the user input device 144, for instance, is in communication with microphone 135 to receive audio measurements therefrom as speaker system 130 emits a preset sequence of audio tones stored within storage 142, or within a remote computer system communicating with the speaker system 130, or otherwise transmitted to speaker system 130 via audio source 134. Microphone 135 is operable to measure the tones emitted by speaker system 130 through the partially acoustically transparent material. Having received the measurements from microphone 135, the user input device 144 is able to calculate adjustments to the equalization of speaker system 130 according to the methods disclosed herein to create a new tuning profile 140 and communicate with tuning module 138 to store the new tuning profile 140 within storage 142 and to implement the tuning profile to adjust the equalization of each speaker 132*a*, 132*b*, etc. of speaker system 130. It will be understood that a separate computer system 145 could apply the methods disclosed herein, including the auto-tuning using the microphone 135.

The schematic illustration of portions of the audio systems described here can be considered as representations of functional modules or components to perform particular operations for any of the furniture materials discussed herein. Generally, the operation modules, controllers, systems, etc. described herein may refer to software objects or routines that execute on a special purpose processing device to perform a certain function or group of functions. In at least some instances, a hardware processor is provided that is operable to carry out executable instructions for performing a method or process, such as the methods and processes disclosed herein. It is contemplated that implementations in hardware or a combination of software and hardware are possible. For instance, the controllers, modules, systems, etc. described herein may include the use of computer hardware or software modules. Such hardware and software modules or structures may include a processor and computer storage media carrying instructions that, when executed by the processor and/or caused to be executed by the processor, perform any one or more of the methods disclosed herein, or any part(s) of any method disclosed. By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

The functionality and operation of the controller/amplifier, user input device, audio source, speaker system, audio system, and other structures and components described herein can be performed, at least in part, by one or more hardware logic components. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Optionally, while the user input device 144 and audio source 134 are illustrated as communicating directly with the controller/amplifier 136 and/or the speaker system 130 as illustrated in FIGS. 7A-7C, any of the structures described herein can communication and deliver signals between or to other structures via a network 149. A "network," like network 149, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The controller/amplifier 136, the user device 144, the audio source 134, the microphone 135, the speaker system 130, and the computer system 145 can include one or more communication channels that are used to communicate with the network 149. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Figure 8:
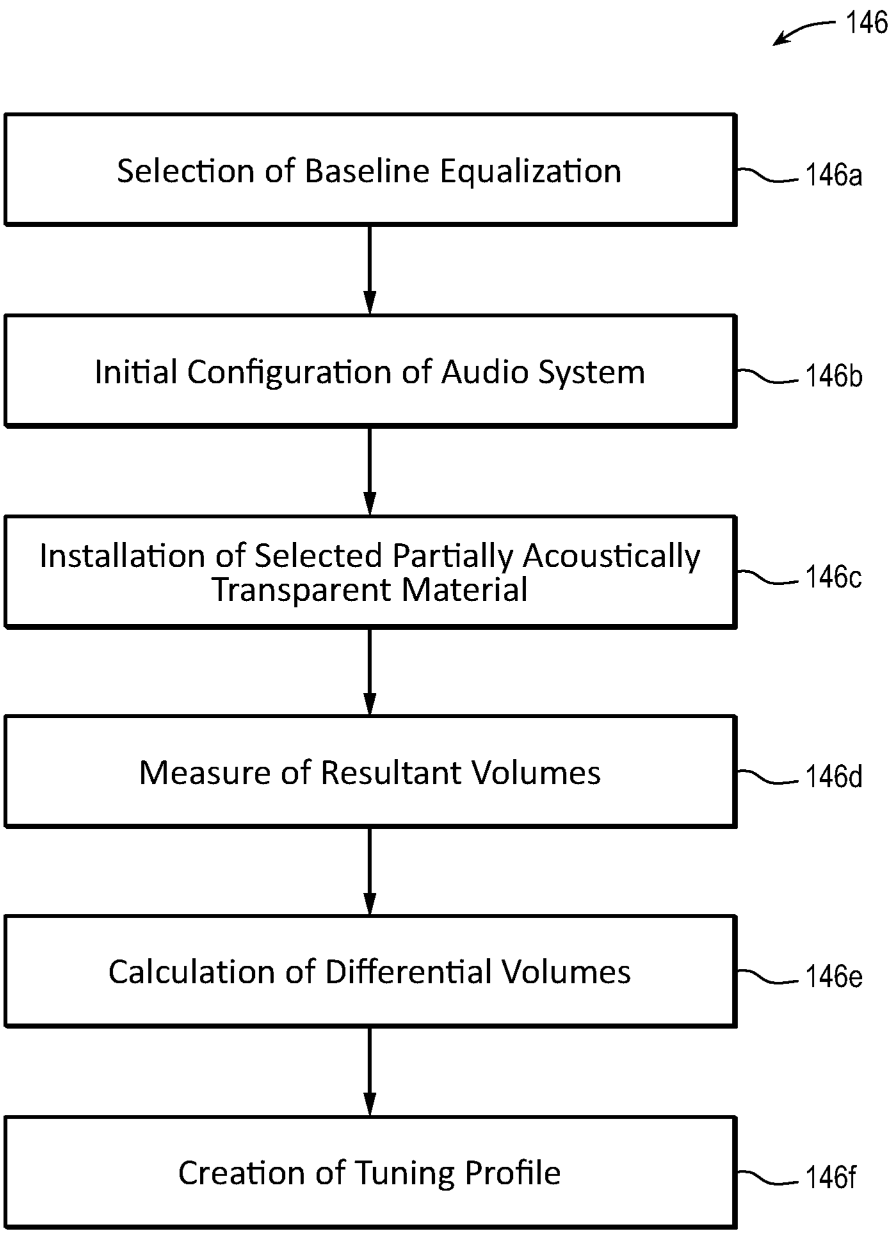
FIG. 8 illustrates a flowchart of a method of the present invention for acoustically correcting sound loss through any of the partially acoustically transparent materials discussed herein.

FIG. 8 illustrates a flowchart of a method 146 of the present invention for acoustically correcting sound loss through any of the furniture materials discussed herein. More specifically, method 146 includes various acts for creating a tuning profile operable to tune a speaker to compensate for sound loss through a selected partially acoustically transparent material. By way of example (but not limitation), such a method may be performed by a manufacturer or other provider of systems such as those described herein. The method can be performed, for example, by any of the audio systems illustrated in FIGS. 7A-7C.

Method 146 begins with act 146*a* of selecting a baseline equalization of one or more audio frequencies for a speaker of an audio system, such as the audio systems illustrated in FIGS. 7A-7C. Such a baseline equalization may correspond to a desired frequency response curve or, alternatively, may correspond to the unaltered frequency response of a given speaker system at a selected volume level. Embodiments may include virtually any baseline equalization that enables measurement of the volume of each target frequency or frequency band as the speaker emits sound through the fabric or other material for which the speaker is to be tuned. In other words, the volume of each target frequency within the selected baseline equalization needs to be sufficiently high to enable the proceeding method steps to be performed accurately.

With respect to any of the furniture systems discussed herein, as a non-limiting example, baseline decibel levels for each target frequency or frequency band of a baseline equalization can be between about 40 decibels or less, 60 decibels or less, 70 decibels or less, 90 decibels or less, 100 decibels or less, 120 decibels or less, or 130 decibels or less. Stated another way, the baseline equalization can be based upon baseline decibel levels from about 40 decibels to about 130 decibels, from about 60 decibels to about 120 decibels, or from about 70 decibels to about 100 decibels. Further, the baseline decibel levels of each target frequency or frequency band can be adjusted if it is found that the previously selected decibel level is too low to be heard or detected by a microphone, such as microphone 135, as the sound passes through the selected partially acoustically transparent material. Further still, methods as disclosed herein may be performed at a variety of baseline decibel levels to determine accurate adjustments to the baseline equalization at each selected decibel level.

In act 146*b*, the audio system is configured to emit each of the one or more target frequencies or frequency bands from the speaker at an actual volume according to the selected baseline equalization. For example, for a frequency range of about 20 Hz to about 21 kHz, the frequency range can include up to 3, up to 5, up to 10, up to 31 target frequencies, or up to one target frequency for each frequency of the range so that for a range from 0 Hz to about 21 kHz there can be 21,000 target frequencies. Stated another way, the full frequency range could be adjusted at each frequency as would be characterized by a continuous equation, or through a step function as would result in bands. A particular frequency range can be divided into a number of frequency bands, such as about 1 to about 21000 target frequency bands, about 1 to about 31 target frequency bands, about 2 to about 20 target frequency bands, about 3 to about 15 target frequency bands, or from about 5 to about 10 target frequency bands. More specifically, as an example only, the following 10 target frequencies can be selected for adjustment: about 32 Hz, about 63 Hz, about 125 Hz, about 250 Hz, about 500 Hz, about 1 kHz, about 2 kHz, about 4 kHz, about 8 kHz, and about 16 kHz. The target frequencies can also be implemented as frequency bands, such as, for example, the following 10 frequency bands, as provided in Table 1: about 20 Hz to about 49 Hz, about 50 Hz to about 99 Hz, about 100 Hz to about 199 Hz, about 200 Hz to about 399 Hz, about 400 Hz to about 999 Hz, about 1 kHz to about 1.9 kHz, about 2 kHz to about 3.9 kHz, about 4 kHz to about 7.9 kHz, about 8 kHz to about 15.9 kHz, and about 16 kHz to about 21 kHz. One skilled in the art should appreciated that adjustment of target frequencies or frequency bands can be implemented by a variety of devices currently available, such as a parametric equalizer, a graphical equalizer, a semi-graphical equalizer, a custom designed equalizer, and so forth.

After the audio system has been configured according to the selected baseline configuration, act 146*c* includes covering the speaker with a selected partially acoustically transparent material. Preferably, the selected partially acoustically transparent material is either the same partially acoustically transparent material as or substantially similar in type, density, thickness, weight, hole density, hole area, material, etc. to a partially acoustically transparent material intended to be used to cover a speaker system product, such as furniture assembly, during use.

With the speaker covered by the selected partially acoustically transparent material, act 146*d* includes activating the audio system and measuring a resultant volume of each of the one or more target frequencies as the speaker emits sound through the selected partially acoustically transparent material. The resultant volume of the one or more target frequencies will differ based on the fabrics or other material used to cover the speaker, with the resulting frequency response affected differently, depending at least one of, for example, partially acoustically transparent material type, density, thickness, hole density, hole area, or weight. For example, one fabric may significantly affect certain frequencies while having only a nominal or substantially no effect on others, and an alternative partially acoustically transparent material may affect different frequencies by varying amounts, as discussed further herein.

At act 146*e*, a differential volume (e.g., in dB) is calculated between the actual volume of each of the one or more target frequencies from act 146*b* and the resultant volume of each of the one or more target frequencies measured in act 146*d*. These differential volumes can be calculated for any number of audio frequencies, preferably at least for each audio frequency or frequency band that is adjustable by the audio system. When the audio system emits target frequencies, in one example configuration, ranging from about 20 Hz to about 21 kHz, with a baseline ranging from about 70 dB to about 100 dB over the range of about 20 Hz to about 21 kHz, the compensation values can be up to about 25 dB for each of the one or more adjusted frequency bands, with the adjusted frequency bands having a band width of about 1 Hz to about 4000 Hz, from about 2 Hz to about 2000 Hz, from about 3 Hz to about 1000 Hz, from about 4 Hz to about 500 Hz, from about 5 Hz to about 200 Hz, from about 5 Hz to about 100 Hz, from about 5 Hz to about 50 Hz, combinations and/or modification thereof, or some other band width for the selected target frequency or target frequency band. Stated another way, the compensation values can range from about 1 dB to about 25 dB when compensation of a particular frequency band occurs for a particular partially acoustically transparent material during tuning. Alternatively, the compensation values can range from about 1 dB to about 30 dB, from about 2 dB to about 21 dB, from about 3 dB to about 16 dB, from about 1 dB to about 21 dB, or from about 1 dB to about 16 dB.

In other examples, the differential volumes can be, as provided in Table 2, up to about 2 dB, about 4 dB, or about 5 dB for a target frequency of about 32 Hz or a frequency band of about 20 Hz to about 49 Hz; up to about 1 dB, about 4 dB, or about 5 dB for a target frequency of about 63 Hz or a frequency band of about 50 Hz to about 99 Hz; up to about 3 dB, about 4 dB, or about 5 dB for a target frequency of about 125 Hz or a frequency band of about 100 Hz to about 199 Hz; up to about 1 dB, about 4 dB, or about 5 dB for a target frequency of about 250 Hz or a frequency band of about 199 Hz to about 399 Hz; up to about 1 dB, about 4 dB, or about 5 dB for a target frequency of about 500 Hz or a frequency band of about 400 Hz to about 999 Hz; up to about 3 dB, about 5 dB, or about 7 dB for a target frequency of about 1 kHz or a frequency band of about 1 kHz to about 1.9 kHz; up to about 8 dB, about 10 dB, or about 12 dB for a target frequency of about 2 kHz or a frequency band of about 2 kHz to about 3.9 kHz; up to about 11 dB, about 14 dB, or about 16 dB for a target frequency of about 4 kHz or a frequency band of about 4 kHz to about 7.9 kHz; up to about 15 dB, about 18 dB, or about 20 dB for a target frequency of about 8 kHz or a frequency band of about 8 kHz to about 15.9 kHz; and up to about 16 dB, about 21 dB, or about 25 dB for a target frequency of about 16 kHz or a frequency band of about 16 kHz to about 21 kHz. It is to be understood that the foregoing volume adjustments include lower magnitude adjustments below the presented upper limit, such as, for example, increasing the volume of each target frequency or frequency band expressed above by a magnitude from about 1 decibel to the presented maximum number of decibels.

The foregoing adjustments are provided as examples and are not intended to limit the scope of the present disclosure. For instance, while certain differential volumes are provided in each of Examples 1-3, it will be understood that any differential volumes from any examples can be combined together. For instance, any differential volumes of Example 1 can be combined with any differential volumes of either or both of Example 2 and 3. Additionally, any differential volumes of Example 2 can be combined with any differential volumes of either or both of Example 1 and 3. Additionally, any differential volumes of Example 3 can be combined with any differential volumes of either or both of Example 1 and 2.

Finally, in act **146*f***, the audio system is reconfigured to compensate for sound loss through the selected partially acoustically transparent material by adjusting the actual volume of each of the one or more target frequencies or frequency bands emitted by the speaker and adjustable by the audio system by the corresponding calculated differential volume. As illustrated in Table 2, some embodiments include adjustments to higher frequencies (e.g., frequencies around 1 kHz or higher) that are greater in magnitude than adjustments made to lower frequencies. The exact magnitude of adjustment to each target frequency or frequency range depends on the magnitude of volume that is attenuated (i.e., reduced) by the particular partially acoustically transparent material covering the speaker.

Method 146 may also include creation of a tuning profile corresponding to the selected partially acoustically transparent material, such that the tuning profile may be implemented to tune any speaker covered by a partially acoustically transparent material identical or similar to the selected partially acoustically transparent material to compensate for sound loss through the partially acoustically transparent material. The tuning profile created may include a partially acoustically transparent material identifier and the calculated differential volume of each of the one or more target frequencies or frequency bands as obtained by methods of the present disclosure. Alternatively, the tuning profile may include a fabric (or other material) identifier and ratios of the differential volume and the baseline volume to allow for linear adjustment of equalization as the overall volume level of the speaker is altered by a user. Also, differential volumes and/or ratios may be calculated at varying levels of overall volume by repeating method 146 for each of the various levels of overall volume, thus creating a stepwise volume adjustment profile. The calculated differential volumes or volume ratios of a tuning profile can thus be used to tune a speaker or speaker system by adjusting the actual volume of the one or more frequencies for which a calculated differential volume is provided.

Additional tuning profiles can also be created using methods of the present disclosure, each tuning profile corresponding to an additional partially acoustically transparent material. For instance, during act **146*c* of method 146**, the selected partially acoustically transparent material may be replaced with each additional partially acoustically transparent material—in turn, then the remaining acts carried out for each additional partially acoustically transparent material to create a corresponding tuning profile.

Accordingly, a speaker mounted within a furniture assembly can be tuned according to any of the tuning profiles, such as tuning profiles 140, **140*a*, 140*b* (FIGS. 7A-7C) created by selecting the tuning profile corresponding to the particular partially acoustically transparent material-covering the mounted speaker, those tuning profiles 140, 140*a*, 140*b***,

TABLE 2

| | Frequency Ranges vs Differential Volumes (dB) | | | | | | | | | |
|---|---|---|---|---|---|---|---|---|---|---|
| | 20-49 Hz | 50-99 Hz | 100-199 Hz | 200-399 Hz | 400-999 Hz | 1000-1999 Hz | 2-3.99 kHz | 4.00-7.99 kHz | 8.00-15.99 kHz | 16.00-21 kHz |
| Example 1 | about 2 | about 1 | about 3 | about 1 | about 1 | about 3 | about 8 | about 11 | about 15 | about 16 |
| Example 2 | about 4 | about 4 | about 4 | about 4 | about 4 | about 5 | about 10 | about 14 | about 18 | about 21 |
| Example 3 | about 5 | about 5 | about 5 | about 5 | about 5 | about 7 | about 12 | about 16 | about 20 | about 25 |

being stored in a storage 142, 142*a*, 142*b* as illustrated in FIGS. 7A-7C. Application of the tuning profile can be achieved, for example, via a speaker controller 136 configured to control one or more speakers of the furniture assembly or by adjusting the output of an audio source 134. The speaker controller can include any known means for tuning the audio output of a speaker or system of speakers, such as but not limited to a center console associated with the speaker system, individual pre-amps associated with each speaker, a programmable audio output source, and so forth.

Figure 9:
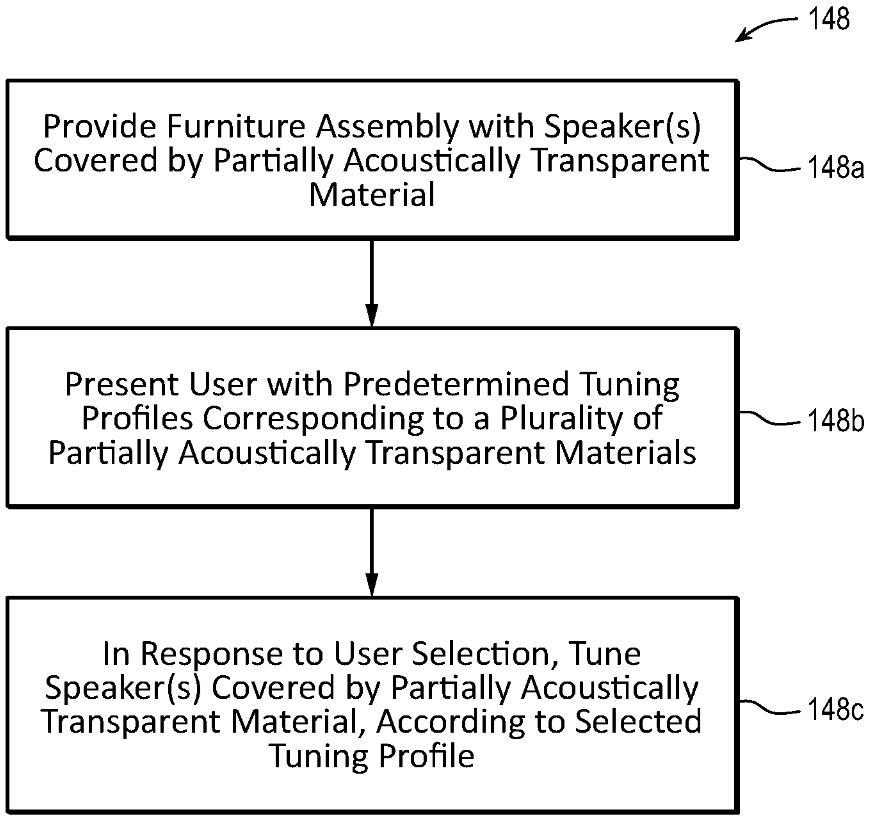
FIG. 9 illustrates a flowchart of a method of the present invention for tuning an audio-enhanced modular furniture system to compensate for sound loss through any of the partially acoustically transparent materials discussed herein.

FIG. 9 illustrates a flowchart of a method 148 for incorporating tuning profiles, such as those obtained by method 146, to tune a furniture system, such as but not limited to those illustrated in FIGS. 1-6D, to compensate for sound loss through a partially acoustically transparent material. Such a method may be performed, e.g., by an end user, by the manufacturer, or other furniture provider. Act 148*a* of method 148 includes providing a furniture assembly with at least one partially acoustically transparent material covered speaker controlled by a speaker controller, such as but not limited to a dedicated console or amplifier, a pre-amp or other controller individually dedicated to the at least one partially acoustically transparent material covered speaker, or an audio source configured to control the frequency response of the at least one partially acoustically transparent material covered speaker.

The furniture assembly, for example, can include one or more bases, a plurality of upright members configured to attach to the one or more bases, and a speaker system, wherein at least one of upright members is an audio-enhanced upright member, such as the modular furniture assemblies illustrated in FIGS. 1-6D. The speaker system can include at least one speaker mounted within the first audio-enhanced upright member or some other portion of the furniture assembly, the at least one speaker being hidden from view by a first partially acoustically transparent material—that covers the first audio-enhanced upright member.

According to act 148*b*, a plurality of predetermined tuning profiles is presented, each corresponding to a partially acoustically transparent material and each operable by the speaker controller to adjust a volume of one or more target frequencies or frequency bands emitted by the at least one partially acoustically transparent material covered speaker to compensate for sound being emitted from the at least one speaker through the partially acoustically transparent material.

In response to selection of a tuning profile, act 148*c* includes tuning the at least one partially acoustically transparent material covered speaker via the speaker controller to adjust an actual volume of one or more target frequencies or frequency bands by a magnitude approximately equal to a calculated differential volume included in the selected tuning profile. The calculated differential volume of each of the one or more audio frequencies is equal to the difference between: (i) a baseline volume corresponding to sound emitted from the at least one speaker or a similar speaker, and (ii) a resultant volume corresponding to sound emitted from the at least one speaker or similar speaker when covered with the first partially acoustically transparent materials or a similar acoustically transparent material. Tuning of the at least one speaker can be accomplished by any known means of adjusting the equalization of audio frequencies of a speaker or speaker system, such as but not limited to the means discussed in connection with FIGS. 7A-7C herein.

One skilled in the art should appreciate that the disclosed methods can be performed under various circumstances. For instance, tuning profiles can be predetermined for one or more selected partially acoustically transparent material during design or development of an audio system, such as the furniture assembly. Also, the plurality of tuning profiles can be presented and selectable via a user interface on a mobile device, a remote-control device, or a dedicated console associated with the speaker system. Alternatively, the furniture assembly can be provided to the consumer with a tuning profile already selected based on the partially acoustically transparent material selected by the user when ordering the furniture. In at least one embodiment, the disclosed methods can be applied to an existing speaker, audio system, or speaker system having speakers at least partially covered in partially acoustically transparent material to improve the sound quality of the existing system. As discussed herein, a user may be provided with means, such as a microphone or software capable of operating a microphone of a mobile device, for measuring the actual volume emitted through the partially acoustically transparent material covering one or more speakers to determine a resultant volume of one or more target frequencies, calculate a differential volume for each target frequency, and reconfigure the existing system to adjust the actual volume of each target frequency, or corresponding frequency band, as emitted by each speaker to compensate for sound loss through the partially acoustically transparent material.

Additionally, some embodiments include a furniture assembly with a plurality of speakers, each speaker being separately tunable by separate selection of one of the pluralities of tuning profiles. In some embodiments, a user can select a tuning profile from the plurality of tuning profiles via a dedicated console, a remote controller, or a user interface of a mobile device or computer system, for the speaker system as a whole or for each individual speaker, depending on the placement of the partially acoustically transparent material relative to the speakers included with the furniture assembly.

Referring now to FIG. 10, an illustrative table of audio frequency adjustments for acoustically correcting sound loss through partially acoustically transparent material according to embodiments of the present invention is provided. The illustrated table may be created for any partially acoustically transparent material using the methods described herein, such as method 146 discussed in connection with FIG. 8 herein. For example, any number of target audio frequencies F1-Fn can be selected for adjustment, e.g., those frequencies typically adjustable by an equalizer function of equalization systems currently available.

These frequencies F1-Fn can include, for example, 32 Hz, 63 Hz, 125 Hz, 250 Hz, 500 Hz, 1 kHz, 2 kHz, 4 kHz, 6 kHz, and 16 kHz. These frequencies F1-Fn can include, for example, any frequencies ranging from about 20 Hz to about 21 kHz, with one or more adjustable frequencies from 20 Hz to 49 Hz, with one or more adjustable frequencies from 50 Hz to 99 Hz, with one or more adjustable frequencies from 100 Hz to 199 Hz, with one or more frequencies from 200 Hz to 399 Hz, with one or more frequencies from 400 Hz to 399 Hz, with one or more frequencies from 1 kHz to 1.999 kHz, with one or more frequencies from 2 kHz to 3.999 kHz, with one or more frequencies from 4 kHz to 7.999 kHz, with one or more frequencies from 8 kHz to 15.999 kHz, and with one or more frequencies from 16 kHz to 21 kHz. Alternatively, one or more of the foregoing frequency ranges can be targeted for adjustment using, for example, a graphical equalizer or similar device. Also, one skilled in the art should appreciate that the total range of frequencies selected for adjustment is not limited to between 20 Hz and 21 kHz but can be expanded to include any lower or higher frequencies if so desired.

A baseline equalization of the selected audio frequencies F1-Fn can then be selected, the baseline equalization including actual desired volumes V1-Vn corresponding to the selected audio frequencies F1-Fn (e.g., a desired frequency response curve for the speaker). Embodiments may include virtually any baseline equalization that enables measurement of the volume of each target frequency or frequency band as the speaker emits sound through the partially acoustically transparent material for which the speaker is to be tuned. In other words, the volume of each target frequency within the selected baseline equalization needs to be sufficiently high to enable the proceeding method steps to be performed accurately.

Once the baseline equalization frequencies F1-Fn and the actual desired volumes V1-Vn are determined, resultant volumes V1_partially acoustically transparent material1-Vn partially acoustically transparent material1 corresponding to sound emitted from a speaker through a first partially acoustically transparent material (acoustically transparent material1) can be determined according to methods of the present disclosure, and corresponding differential volumes ÄV1-ÄVn can be calculated and stored as a tuning profile corresponding to the first partially acoustically transparent material, such that the calculated differential volumes ÄV1-ÄVn may be used to adjust the equalization of a speaker (the speaker's frequency response) covered by the first partially acoustically transparent material, or a partially acoustically transparent material similar thereto, to compensate for sound loss through the partially acoustically transparent material. The disclosed methods can be performed for any number of partially acoustically transparent material to create corresponding tuning profiles in this manner. The differential volumes ÄV1-ÄVn vary based upon the particular audio frequencies F1-Fn being tested. As an alternative to adjusting discrete target frequencies F1-Fn (e.g., by parametric equalization at each target frequency F1-Fn), the differential volumes ÄV1-ÄVn can be applied to frequency bands that respectively include target frequencies F1-Fn (e.g., by graphical equalization at each respective frequency band).

Adjustments to the equalization or frequency response of a speaker can alternatively be implemented as a ratio of the calculated differential volume and the respective baseline volume, such that the equalization adjustment depends on the volume level of the speaker as selected by a user.

For example, and as illustrated in Table 3, each audio frequency can be adjusted by a multiplication factor or ratio up to about 1.03, about 1.06, or about 1.07 for a target frequency of about 32 Hz or a frequency band of about 20 Hz to about 49 Hz; up to about 1.01, about 1.05, or about 1.06 for a target frequency of about 63 Hz or a frequency band of about 50 Hz to about 99 Hz; up to about 1.03, about 1.04, or about 1.05 for a target frequency of about 125 Hz or a frequency band of about 100 Hz to about 199 Hz; up to about 1.01, about 1.04, or about 1.05 for a target frequency of about 250 Hz or a frequency band of about 199 Hz to about 399 Hz; up to about 1.01, about 1.04, or about 1.06 for a target frequency of about 500 Hz or a frequency band of about 400 Hz to about 999 Hz; up to about 1.03, about 1.06, or about 1.08 for a target frequency of about 1 kHz or a frequency band of about 1 kHz to about 1.9 kHz; up to about 1.09, about 1.11, or about 1.13 for a target frequency of about 2 kHz or a frequency band of about 2 kHz to about 3.9 kHz; up to about 1.12, about 1.16, or about 1.18 for a target frequency of about 4 kHz or a frequency band of about 4 kHz to about 7.9 kHz; up to about 1.17, about 1.21, or about 1.23 for a target frequency of about 8 kHz or a frequency band of about 8 kHz to about 15.9 kHz; and up to about 1.19, about 1.25, or about 1.30 for a target frequency of about 16 kHz or a frequency band of about 16 kHz to about 21 kHz. It is to be understood that the foregoing volume adjustments include lower magnitude adjustments below the presented upper limit, such as, for example, multiplying the volume of each target frequency or frequency band expressed above by a factor from about 1 to the presented maximum multiplication factor. Also, the foregoing adjustments ratios are provided as examples and are not intended to limit the scope of the present disclosure.

For instance, while certain multiplication factors or ratios are provided in each of Examples 1-3, it will be understood that any multiplication factors or ratios from any examples can be combined together. For instance, any multiplication factor or ratio of Example 1 can be combined with any multiplication factor or ratio of either or both of Example 2 and 3. Additionally, any multiplication factor or ratio of Example 2 can be combined with any multiplication factor or ratio of either or both of Example 1 and 3. Additionally, any multiplication factor or ratio of Example 3 can be combined with any multiplication factor or ratio of either or both of Example 1 and 2.

TABLE 3

| | Frequency Ranges vs Multiplication Factor or Ratio | | | | | | | | | |
|---|---|---|---|---|---|---|---|---|---|---|
| | 20-49 Hz | 50-99 Hz | 100-199 Hz | 200-399 Hz | 400-999 Hz | 1000-1999 Hz | 2-3.99 kHz | 4.00-7.99 kHz | 8.00-15.99 kHz | 16.00-21 kHz |
| Example 1 | 1.03 | 1.01 | 1.03 | 1.01 | 1.01 | 1.03 | 1.09 | 1.12 | 1.17 | 1.19 |
| Example 2 | 1.06 | 1.05 | 1.04 | 1.04 | 1.04 | 1.06 | 1.11 | 1.16 | 1.21 | 1.25 |
| Example 3 | 1.07 | 1.06 | 1.05 | 1.05 | 1.06 | 1.08 | 1.13 | 1.18 | 1.23 | 1.30 |

FIGS. 11A-11K show tables of target audio frequency adjustments for acoustically correcting sound loss through a variety of exemplary partially acoustically transparent materials. Specifically, FIGS. 11A-11K include target audio frequency adjustments corresponding to upholstery fabrics including polyester (FIG. 11A), chenille (FIG. 11B), tweed (FIG. 11C), linen (FIG. 11D), velvet (FIG. 11E), leather (FIG. 11F), polyester linen (FIG. 11G), and faux fur (FIG. 11H), respectively. More specifically, the "EQ compensation" values provided in each table can be implemented by adjusting the actual volume of each target frequency (or a frequency band that includes the target frequency) as it is emitted from a speaker covered in the partially acoustically transparent material corresponding to the respective table or tuning profile. One skilled in the art should appreciate that the boosting of audio frequencies provided herein specifically correspond to exemplary partially acoustically transparent material materials of a particular composition, density, thickness, weight, hole density, hole area, etc. and to the specific baseline equalization presented, and that audio frequencies corresponding to virtually any material and/or baseline equalization can be calculated by the methods and systems described herein.

As illustrated in FIG. 11A-11E, the "EQ compensation" values below about 1000 Hz can range from about 1 dB to about 5 dB, from about 1 dB to about 4 dB, from about 1 dB to about 3 dB, or from about 1 dB to about 2 dB for a baseline equalization from about 70 dB to about 100 dB. More generally, the EQ compensation" values can be from about 1 dB to about 8 dB, from about 1 dB to about 7 dB, from about 1 dB to about 6 dB, from about 1 dB to about 5 dB, from about 2 dB to about 7 dB, from about 2 dB to about 6 dB, from about 2 dB to about 5 dB, from about 2 dB to about 4 dB, or from about 2 dB to about 3 dB.

Alternatively, speaker tuning can be accomplished by multiplication of one or more audio frequencies by a predetermined ratio or multiplication factor. For instance, each audio frequency can be adjusted by a multiplication factor ranging between about 1 and about 1.235 for speakers covered by leather, between about 1 and about 1.115 for speakers covered by polyester, between about 1 and about 1.063 for speakers covered by chenille or velvet, and between about 1 and about 1.037 for speakers covered by tweed or linen. One skilled in the art should appreciate that the foregoing values are provided as an example and are specific to example materials having a particular composition, density, thickness, hole weight, hole area, etc. As disclosed herein, specific adjustment values are preferably calculated on an individual basis for each partially acoustically transparent material-intended to cover a speaker or speaker system to ensure optimal sound quality as the sound is emitted though the selected partially acoustically transparent material.

Figure 12:
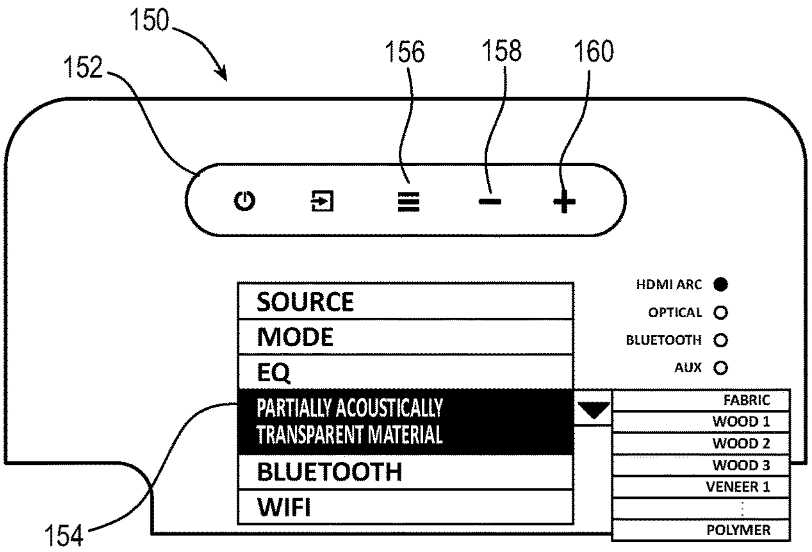
FIG. 12 illustrates a planar view of a control console of the present invention.

Referring now to FIG. 12, embodiments can include a control console dedicated to a speaker system and configured to enable a user to select a tuning profile from a plurality of tuning profiles, according to the present disclosure. The control console can be one configuration of the user input device 144, the audio source 134 and/or the computer system 135 of FIGS. 7A-7C. As illustrated, control console 150 includes a series of buttons 152 and a display 154, thus providing a user with means for selecting a tuning profile stored within a storage unit of the audio system and implemented by a tuning module, as illustrated in any of FIGS. 7A-7C. For example, a user can select menu button 156 and use navigation buttons 158 and 160 to select a tuning profile corresponding to any partially acoustically transparent material for which a tuning profile is provided.

While display 154 can be configured as a liquid crystal display (LCD), alternative displays can be implemented, such as but not limited to a series of light-emitting diodes (LED) corresponding to each available tuning profile. Alternatively, the user can be provided with instructions for selecting, deselecting, and/or changing the tuning profile via a series of button selections, thus foregoing the need for an LCD or other display on control console 150.

Figure 13:
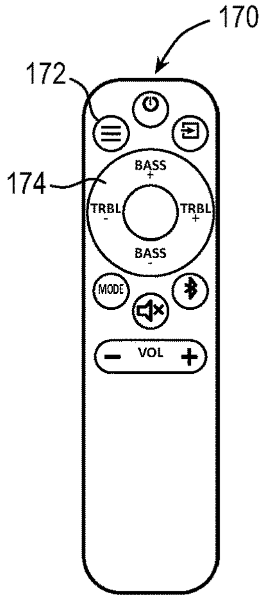
FIG. 13 illustrates a planar view of a remote control device of the present invention.

FIG. 13 illustrates an embodiment of a remote control device 170. The remote control device 170 can be one configuration of the user input device 144 or audio source 134 of FIGS. 7A-7C. Remote control device 170 can be operable to interact with a controller of an audio system using menu button 172 and navigation buttons 174. For example, remote control device 170 can be operable to interact with control console 150 via a wire or wireless connection, to assist a user in selection of a tuning profile for the audio system, as well as adjustment of other system settings. As an alternative example, remote control device 170 can be operable to interact with an interface programmed to display on a television screen or other display via a computer system included within control console 150.

FIGS. 14A-15B illustrate an exemplary mobile device 180 displaying an embodiment of a user control interface. The mobile device 180 can be one configuration of the user input device 144, the audio source 134, and/or the computer system 145 of FIGS. 7A-7C. Embodiments of a mobile device application can be operable to control various functions of the audio system, such as input/output, volume, user-adjustable equalization, and selection of tuning profiles based on partially acoustically transparent material. Mobile device 180 can be configured to connect to a system controller via wireless communication directly with the controller, via a network connection, or via a wired connection. One skilled in the art should appreciate that the user interface is not limited to mobile devices but can be implemented on any system or device having a user interface, such as a computer console, a television, and so forth.

Figure 15A:
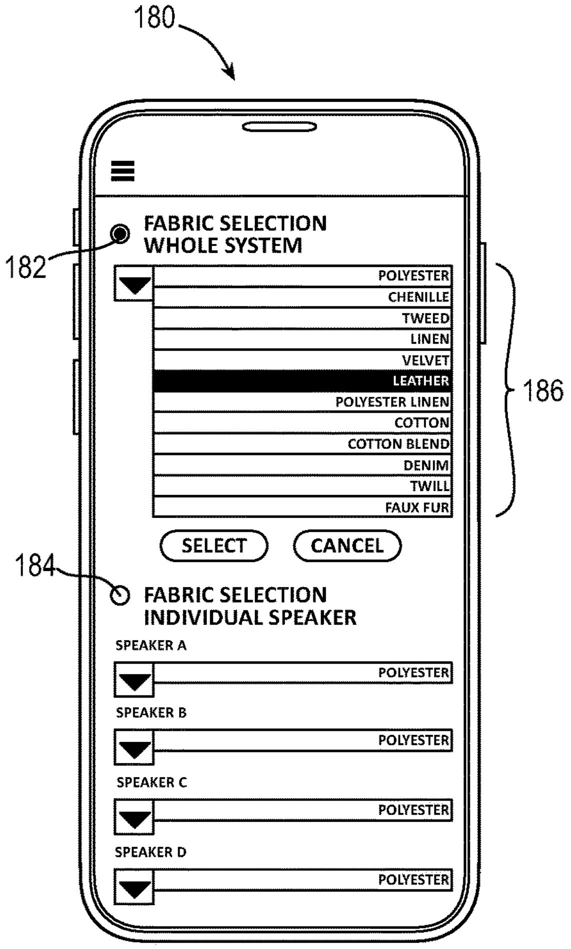
FIG. 15A illustrates a planar view of a mobile device displaying a user control interface of the present invention.
Figure 15B:
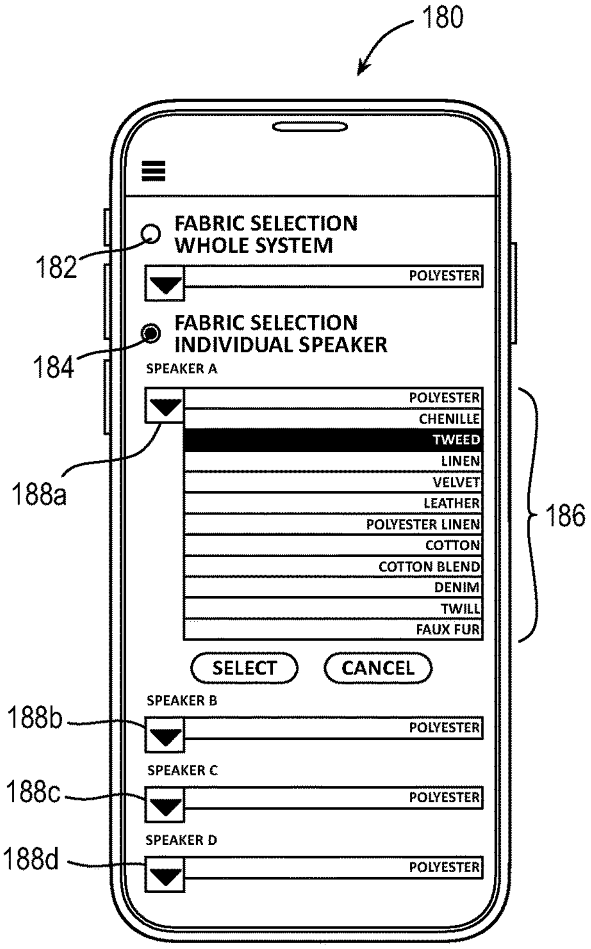
FIG. 15B illustrates a planar view of a mobile device displaying an additional feature of the user control interface of FIG. 15A.

As illustrated, mobile device 180 has been programmed to display various selectable options to a user, including selection 182 of a tuning profile based on partially acoustically transparent material—for a whole speaker system, and selection 184 of a tuning profile based on partially acoustically transparent material—for each individual speaker 188*a-d* of a speaker system. Selection 184 thus allows for use of different partially acoustically transparent materials on different components of the speaker system, such as by covering different audio-enhanced members (e.g., upright members and/or bases) of a modular furniture assembly with different fabric covers. An exemplary list 186 of selectable partially acoustically transparent materials is shown, allowing the user to select a tuning profile corresponding to any partially acoustically transparent material listed. It is also possible to include a sub-list or sub-menu from one or more of the partially acoustically transparent materials listened in the drop down list. For instance, if the user selects a partially acoustically transparent material, the interface presented on the mobile device 180 can display different materials, such as illustrated in FIGS. 15A and 15B.

Figure 14A:
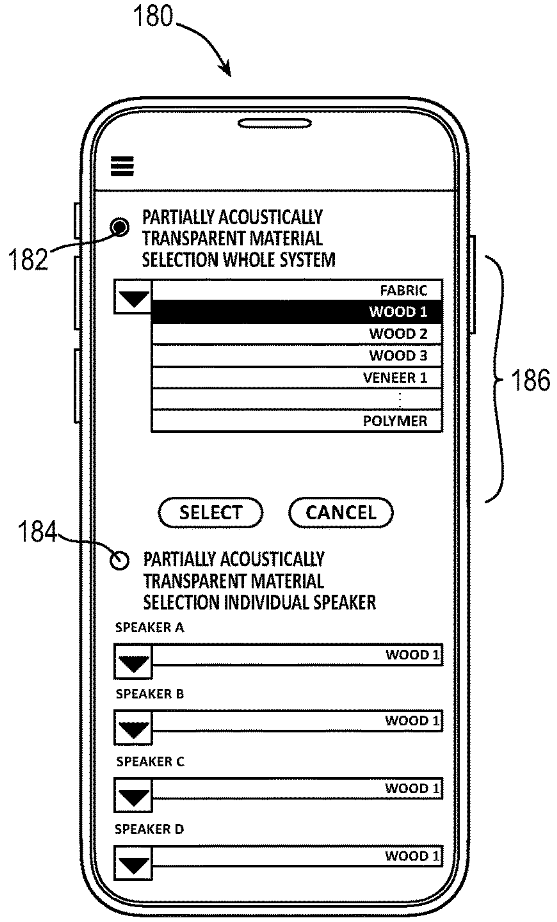
FIG. 14A illustrates a planar view of a mobile device displaying a user control interface of the present invention.
Figure 14B:
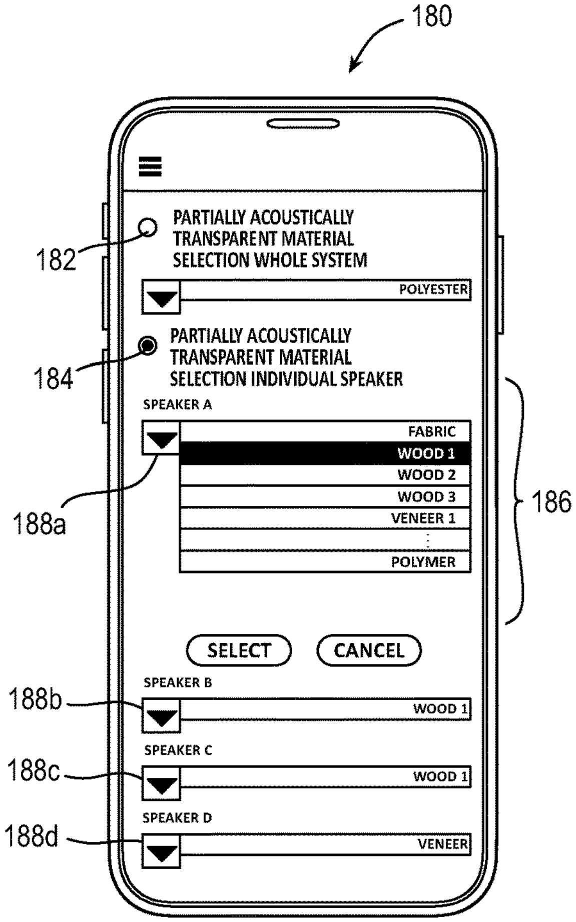
FIG. 14B illustrates a planar view of a mobile device displaying an additional feature of the user control interface of FIG. 14A.

When a user makes selection 182 for tuning of the whole system, a drop down list 186 of partially acoustically transparent materials are displayed for user selection. If the user selects the partially acoustically transparent material as a perforated wood (as shown in FIG. 14A), such as shown in FIG. 1, for example, the mobile device will transmit a signal to a receiver, amplifier, or other appropriate component of the audio system to implement a tuning profile specifically configured to compensate for sound loss through perforated wood, such as shown in FIG. 1. If instead the user makes selection 184 for tuning each individual speaker 188*a-d*, a drop down list 186 is made available for each of speakers 188*a-d*, such that the user may select any of the listed partially acoustically transparent materials for each speaker 188*a-d*. For instance, if the user selects perforated wood (see, e.g., FIG. 1) for speaker 188*a* (as shown in FIG. 14B), the mobile device will transmit a signal to a receiver, amplifier, or other appropriate component of the audio system to implement a tuning profile specifically configured to compensate for sound loss through perforated wood for speaker 188*a* only. FIGS. 15A-15B illustrate interfaces of the mobile device 180 when the user selects a partially acoustically transparent material for a whole system or for individual speakers.

FIGS. 14A-B illustrate that the tuning and adjustment techniques and profiles and the sound compensation, equalization, and adjustment techniques discussed with respect to FIGS. 4A-15B are applicable to the furniture systems of FIGS. 1-3F, such that the sound compensation, tuning and adjustment techniques and methods discussed with respect to FIGS. 4A-15B can also be employed with respect to the furniture systems of FIGS. 1-3F. Thus, the tuning, equalization, and sound compensation techniques and disclosure discussed with respect to the furniture structures of FIGS. 4A-15B can be applied to the furniture structures of FIGS. 1-3F.

Embodiments of a tuning profile can include the information used to adjust the equalization or frequency response of the speaker to which the tuning profile is applied to compensate for sound loss through the partially acoustically transparent material—to which the tuning profile corresponds. For example, each tuning profile can include a partially acoustically transparent material name or identification number and a plurality of target frequency or frequency band adjustments, such as the "EQ Compensation" decibel values disclosed in FIGS. 11A-11K. Alternatively, adjustments can be included in various forms, such as but not limited to ratio or multiplication factors. Also, tuning profiles can include adjustment values, ratios, or factors corresponding to a variety of baseline volume levels, such that the magnitude of adjustment is varied as the user adjusts the output volume of the audio system.

Thus, fabrics (e.g., upholstery fabrics) and perforated rigid structures (e.g., perforated wooden table faces) are each examples of partially acoustically transparent materials of the present invention, which can cover a speaker system positioned within the furniture assembly, the speaker system comprising at least one speaker covered by the acoustically transparent materials, such that the at least one speaker is hidden from view, wherein the at least one speaker is configured to be tuned to compensate for sound loss as sound is emitted from the speaker through the perforated structure.

Perforated leather is another example of a partially acoustically transparent material of the present invention, which can cover a speaker system positioned within the furniture assembly, the speaker system comprising at least one speaker covered by the acoustically transparent material, such that the at least one speaker is hidden from view, wherein the at least one speaker is configured to be tuned to compensate for sound loss as sound is emitted from the speaker through the perforated leather.

In one embodiment, for example, about 5% to about 70% of the portion of the leather material adjacent the at least one speaker is perforated; and the thickness of the portion of the perforated leather material adjacent the at least one speaker is in the range of about 0.25 millimeter to about 30 millimeters; and the diameter of each of the perforations in the perforated leather material adjacent the at least one speaker is in the range of a micromillimeter to about 10 millimeters.

In another embodiment, for example, about 5% to about 70% of the portion of the leather material adjacent the at least one speaker is perforated; and the thickness of the portion of the perforated leather material adjacent the at least one speaker is in the range of about 0.25 millimeter to about 30 millimeters; and the diameter of each of the perforations in the perforated leather material adjacent the at least one speaker is in the range of about 0.1 millimeter to about 10 millimeters.

In another embodiment, about 30% to about 60% of the portion of the leather material adjacent the at least one speaker is perforated; and the thickness of the portion of the perforated leather material adjacent the at least one speaker is in the range of about 1 millimeter to about 2 millimeters; and the diameter of each of the perforations in the perforated leather material adjacent the at least one speaker is in the range of a about 0.25 millimeter to about 1 millimeter.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant work of furniture assemblies and audio systems.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Some ranges may be disclosed herein. Additional ranges may be defined between any values disclosed herein as being exemplary of a particular parameter, including disclosed range endpoints. All such ranges are contemplated and within the scope of the present disclosure.

Following are some further example embodiments of the invention. These are presented only by way of example and are not intended to limit the scope of the invention in any way. Further, any example embodiment can be combined with one or more of the example embodiments.

Embodiment 1: An audio-enhanced furniture system, comprising: a furniture assembly having a partially acoustically transparent material; and a speaker system positioned within the furniture assembly, the speaker system comprising at least one speaker covered by the partially acoustically transparent material, such that the at least one speaker is hidden from view, wherein the at least one speaker is configured to be tuned to compensate for sound being emitted from the at least one speaker through the partially acoustically transparent material.

Embodiment 2: An audio-enhanced furniture system as recited in embodiment 1, wherein the partially acoustically transparent material is at least one of a fabric material or a perforated leather material.

Embodiment 3: An audio-enhanced furniture system, comprising: a furniture assembly having a partially acoustically transparent material; and a speaker system positioned within the furniture assembly, the speaker system comprising at least one speaker covered by the partially acoustically transparent material, such that the at least one speaker is hidden from view, wherein the at least one speaker is configured to be tuned to compensate for sound being emitted from the at least one speaker through the partially acoustically transparent material, and wherein the partially acoustically transparent material is a perforated, nondrapable, rigid structure.

Embodiment 4: An audio-enhanced furniture system as recited in embodiment 3, wherein the perforated rigid structure comprises at least one of wood, veneer, plastic, polymer or metal.

Embodiment 5: An audio-enhance furniture system as recited in any of embodiments 3-4, wherein the perforations in the perforated rigid structure are finely tuned perforations in the native surface of the rigid structure, such that the rigid structure is visually aesthetically pleasing.

Embodiment 6: An audio-enhanced furniture system as recited in any of embodiments 3-5, wherein the speaker system is tuned by boosting one or more select frequencies to compensate for attenuation of such frequencies as sound from the speaker system is emitted through the perforated rigid structure.

Embodiment 7: An audio-enhanced furniture system as recited in any of embodiments 3-6, wherein the perforations are in a vertically oriented or substantially vertically oriented portion of the perforated rigid structure in order to be more resistant to environmental factors.

Embodiment 8: The audio-enhanced furniture system in any of embodiments 3-7, further comprising at least one speaker controller in communication with the at least one speaker, the speaker controller being configured to control tuning of the at least one speaker, wherein the at least one speaker controller is selectively controlled by at least one of a mobile device, a remote controller, or a console controller.

Embodiment 9: The audio-enhanced furniture system in any of embodiments 3-8, wherein the furniture assembly having the perforated, rigid structure comprises a table, coffee table, end table, side table, cupboard, door, credenza, console, sideboard, cabinet, bookcase, desk, door, bed frame, or combinations thereof.

Embodiment 10: The audio-enhanced furniture system in any of embodiments 3-9, wherein the at least one speaker is configured to be tuned by selection from a plurality of tuning profiles corresponding to (i) material type of the perforated, rigid structure; (ii) perforation amount of the perforated, rigid structure; and (iii) thicknesses of the perforated rigid structure.

Embodiment 11: The audio-enhanced furniture system in any of embodiments 3-10, wherein the at least one speaker is configured to be tuned by selection from a plurality of tuning profiles corresponding to: (i) material type of the perforated, rigid structure; (ii) perforation amount of the perforated rigid structure; (iii) thickness of the perforated rigid structure, and (iv) a perforation size of the perforations in the perforated rigid structure.

Embodiment 12: The audio-enhanced furniture system in any of embodiments 3-11, wherein about 5% to about 70% of the portion of the rigid structure adjacent the at least one speaker is perforated.

Embodiment 13: The audio-enhanced furniture system in any of embodiments 3-12, wherein about 10% to about 60% of the portion of the rigid structure adjacent the at least one speaker is perforated.

Embodiment 14: The audio-enhanced furniture system in any of embodiments 3-13, wherein about 50% to about 60% of the portion of the rigid structure adjacent the at least one speaker is perforated.

Embodiment 15: The audio-enhanced furniture system in any of embodiments 3-14, wherein about 10% to about 30% of the portion of the rigid structure adjacent the at least one speaker is perforated.

Embodiment 16: The audio-enhanced furniture system in any of embodiments 3-15, wherein the thickness of the portion of the perforated, rigid structure adjacent the at least one speaker is in the range of about 0.25 millimeter to about 30 millimeters.

Embodiment 17: The audio-enhanced furniture system in any of embodiments 3-16, wherein the thickness of the portion of the perforated, rigid structure adjacent the at least one speaker is in the range of about 0.5 millimeter to about 20 millimeters.

Embodiment 18: The audio-enhanced furniture system in any of embodiments 3-17, wherein the thickness of the portion of the perforated, rigid structure adjacent the at least one speaker is in the range of about 1 millimeter to about 10 millimeters.

Embodiment 19: The audio-enhanced furniture system in any of embodiments 3-18, wherein the thickness of the portion of the perforated, rigid structure adjacent the at least one speaker is in the range of about 1 millimeter to about 2 millimeters.

Embodiment 20: The audio-enhanced furniture system in any of embodiments 3-19, wherein the diameter of each of the perforations in the perforated rigid structure adjacent the at least one speaker is in the range of a micromillimeter to about 10 millimeters.

Embodiment 21: The audio-enhanced furniture system in any of embodiments 3-20, wherein the diameter of each of the perforations in the perforated rigid structure adjacent the at least one speaker is in the range of about 0.1 millimeter to about 10 millimeters.

Embodiment 22: The audio-enhanced furniture system in any of embodiments 3-21, wherein the diameter of each of the perforations in the perforated, rigid structure adjacent the at least one speaker is in the range of about 0.1 millimeter to about 5 millimeters.

Embodiment 23: The audio-enhanced furniture system in any of embodiments 3-22, wherein the diameter of each of the perforations in the perforated, rigid structure adjacent the at least one speaker is in the range of about 0.5 millimeter to about 1 millimeter.

Embodiment 24: The audio-enhanced furniture system in any of embodiments 3-23, wherein about 5% to about 70% of the portion of the perforated rigid structure adjacent the at least one speaker is perforated and about 95% to about 30% of the portion of the perforated rigid structure adjacent the at least one speaker is solid, unperforated material; and wherein the thickness of the portion of the perforated, rigid structure adjacent the at least one speaker is in the range of about 0.25 millimeter to about 30 millimeters; and wherein the diameter of each of the perforations in the perforated rigid structure adjacent the at least one speaker is in the range of a micromillimeter to about 10 millimeters.

Embodiment 25: The audio-enhanced furniture system in any of embodiments 3-24, wherein about 5% to about 70% of the portion of the perforated, rigid structure adjacent the at least one speaker is perforated; and wherein the thickness of the portion of the perforated, rigid structure adjacent the at least one speaker is in the range of about 0.25 millimeter to about 30 millimeters; and wherein the diameter of each of the perforations in the perforated rigid structure adjacent the at least one speaker is in the range of about 0.1 millimeter to about 10 millimeters.

Embodiment 26: The audio-enhanced furniture system in any of embodiments 3-25, wherein about 30% to about 60% of the portion of the perforated, rigid structure adjacent the at least one speaker is perforated; and wherein the thickness of the portion of the perforated, rigid structure adjacent the at least one speaker is in the range of about 1 millimeter to about 2 millimeters; and wherein the diameter of each of the perforations in the perforated, rigid structure adjacent the at least one speaker is in the range of a about 0.25 millimeter to about 1 millimeter.

Embodiment 27: The audio-enhanced furniture system in any of embodiments 3-26, wherein about 50% to about 60% of the portion of the perforated, rigid structure adjacent the at least one speaker is perforated; and wherein the thickness of the portion of the perforated, rigid structure adjacent the at least one speaker is in the range of about 1 millimeter to about 2 millimeters; and wherein the diameter of each of the perforations in the perforated, rigid structure adjacent the at least one speaker is in the range of a about 0.5 millimeter to about 1 millimeter.

Embodiment 28: An audio-enhanced furniture system in any of embodiments 3-27, wherein the at least one speaker is configured to be tuned to compensate for variations in sound resulting from sound being emitted from the speakers through the partially acoustically transparent material by an adjustment to an equalization of one or more target audio frequencies or frequency bands emitted by the at least one speaker.

Embodiment 29: The audio-enhanced furniture system in any of embodiments 3-28, wherein tuning the at least one speaker comprises reconfiguring an audio system associated with the at least one speaker to adjust an actual volume of each of the one or more target audio frequencies or frequency bands by a magnitude approximately equal to a calculated differential volume of each of the one or more audio target frequencies or frequency bands, and wherein the calculated differential volume of each of the one or more target audio frequencies or frequency bands is equal to the difference between: (i) a baseline volume corresponding to sound emitted from the speaker, and (ii) a resultant volume corresponding to sound emitted from the speaker when covered with the perforated partially acoustically transparent structure, and wherein the system is configured to present a user with a plurality of tuning profiles corresponding to a plurality of different perforated rigid structures; and in response to selection of one of the plurality of tuning profiles by the user, tuning the speaker to compensate for sound being emitted from the speaker through the perforated rigid structure to which the selected tuning profile corresponds, and wherein the speaker being separately tunable by separate selection of one of the plurality of tuning profiles.

Embodiment 30: The audio-enhanced furniture system in any of embodiments 3-29, wherein tuning the speaker comprises adjusting a signal transmitted from an audio source to the speaker.

Embodiment 31: The audio-enhanced furniture system in any of embodiments 3-30, further comprising a speaker controller directly associated with the speaker, the speaker controller configured to tune the speaker independent of signals transmitted to the speaker by an audio source.

Embodiment 32: The audio-enhanced furniture system in any of embodiments 3-31, wherein the one or more target audio frequencies or frequency bands are adjusted by increasing an actual volume of each of the one or more target audio frequencies or frequency bands by a magnitude up to about 25 decibels.

Embodiment 33: The audio-enhanced furniture system in any of embodiments 3-32, wherein each of the one or more target audio frequencies or frequency bands are adjusted by a magnitude between about 1 decibel and about 25 decibels.

Embodiment 34: The audio-enhanced furniture system in any of embodiments 3-33, wherein at least one of the one or more target audio frequencies or frequency bands is below 1000 Hz and is adjusted by a magnitude between about 1 decibel and about 8 decibels.

Embodiment 35: The audio-enhanced furniture system in any of embodiments 3-34, wherein the one or more target audio frequencies or frequency bands are adjusted by multiplying an actual volume of each of the one or more target audio frequencies or frequency bands by a factor from about 1 to about 1.3.

Embodiment 36: The audio-enhanced furniture system in any of embodiments 3-35, wherein the one or more target frequencies or frequency bands comprises at least four target frequencies or frequency bands.

Embodiment 37: The audio-enhanced furniture system in any of embodiments 3-36, wherein the one or more target frequencies or frequency bands comprises at least four target frequencies or frequency bands; and wherein two or more of the at least four target frequencies or frequency bands are below 1000 Hz and are each adjusted by increasing an actual volume thereof by a magnitude from about 1 decibel to about 8 decibels; and wherein two or more of the at least four target frequencies or frequency bands are above 1000 Hz and are each adjusted by increasing an actual volume thereof by a magnitude from about 1 decibel to about 25 decibels.

Embodiment 38: The audio-enhanced furniture system in any of embodiments 3-37, wherein a magnitude of the adjustment of the equalization of one or more target audio frequencies or frequency bands depends on a selected volume of the speaker system.

Embodiment 39: The audio-enhanced furniture system in any of embodiments 3-38, wherein the rigid structure comprises a veneer covering the at least one speaker.

Embodiment 40: An audio-enhanced furniture system as recited in any of embodiments 3-39, wherein the at least one speaker is mounted to the rigid structure.

Embodiment 41: The audio-enhanced furniture system in any of embodiments 3-40, wherein the rigid structure is a solid structure having perforations therein and wherein the perforations in the rigid structure are finely tuned perforations in the native surface of the rigid structure that are invisible or substantially invisible to an unaided eye.

Embodiment 42: An audio-enhance furniture system as recited in any of embodiments in any of embodiments 3-41, further comprising an induction charger embedded within the furniture system.

Embodiment 43: An audio-enhance furniture system as recited in any of embodiments 3-42, further comprising an induction charger embedded within the furniture system, the induction charger being covered by and adjacent to a partially acoustically transparent material having a thickness of about 0.25 millimeter to about 30 millimeters.

Embodiment 44: An audio-enhanced furniture system, comprising: a furniture assembly having a solid, nondrapable, rigid structure having perforations therein such that the perforated, rigid structure is partially acoustically transparent; and a speaker system positioned within the furniture assembly, the speaker system comprising at least one speaker covered by the rigid structure, such that the at least one speaker is hidden from view, wherein the at least one speaker is configured to be tuned to compensate for variations in sound resulting from sound being emitted from the speakers through the partially acoustically transparent material by an adjustment to an equalization of one or more target audio frequencies or frequency bands emitted by the at least one speaker, said adjustment including adjusting volume of one or more target audio frequencies or frequency bands emitted by the at least one speaker; wherein the perforated, rigid structure comprises wood, veneer, plastic, polymer or metal; wherein the perforations in the perforated rigid structure are finely tuned perforations in the native surface of the rigid structure, such that the rigid structure is visually aesthetically pleasing; wherein the perforations are in a vertically oriented portion of the rigid structure; wherein the perforations are in a vertically oriented or substantially vertically oriented portion of the perforated rigid structure in order to be more resistant to environmental factors; wherein about 5% to about 70% of the portion of the perforated rigid structure adjacent the at least one speaker is perforated; wherein the thickness of the perforated, rigid structure adjacent the at least one speaker is in the range of about 0.25 millimeter to about 30 millimeters; and wherein the diameter of each of the perforations in the perforated rigid structure adjacent the at least one speaker is in the range of a micromillimeter to about 10 millimeters.

Embodiment 45: The audio-enhanced furniture system in embodiment 44, wherein about 50% to about 60% of the portion of the perforated, rigid structure adjacent the at least one speaker is perforated; and wherein the thickness of the portion of the perforated, rigid structure adjacent the at least one speaker is in the range of about 1 millimeter to about 2 millimeters; and wherein the diameter of each of the perforations in the perforated, rigid structure adjacent the at least one speaker is in the range of a about 0.5 millimeter to about 1 millimeter.

Embodiment 46: An audio-enhanced furniture system, comprising: a furniture assembly having a furniture body, the furniture body comprised of one or more perforated, solid, nondrapable, rigid structures configured such that the one or more rigid structures are partially acoustically transparent; and a speaker system positioned within the furniture assembly, the speaker system comprising: a plurality of speakers mounted within the furniture body and being hidden from view by the one or more perforated, solid, nondrapable, rigid structures; and at least one speaker controller configured to control each speaker of the plurality of speakers; wherein each speaker of the plurality of speakers is configured to be tuned through the at least one speaker controller, to compensate for variations in sound resulting from sound being emitted from the speakers through the perforated, rigid structure, by an adjustment to an equalization of one or more target audio frequencies or frequency bands emitted by the at least one speaker, said adjustment including adjusting volume of one or more target audio frequencies or frequency bands emitted by the at least one speaker; wherein the perforated, rigid structure comprises at least one of wood, veneer, plastic, polymer or metal; wherein the perforations in the perforated rigid structure are finely tuned perforations in the native surface of the rigid structure, such that the rigid structure is visually aesthetically pleasing; wherein the perforations are in a vertically oriented portion of the perforated rigid structure in order to be more resistant to environmental factors; wherein about 5% to about 70% of the portion of the perforated rigid structure adjacent the at least one speaker is perforated; wherein the thickness of the perforated, rigid structure adjacent the at least one speaker is in the range of about 0.25 millimeter to about 30 millimeters; and wherein the diameter of each of the perforations in the perforated rigid structure adjacent the at least one speaker is in the range of about 0.1 millimeter to about 10 millimeters.

Embodiment 47: The audio-enhanced modular furniture system of embodiment 46, wherein each speaker of the plurality of speakers is configured to be tuned according to a tuning profile comprised of at least one adjustment to at least one target audio frequency or frequency band emitted by the speaker.

Embodiment 48: The audio-enhanced modular furniture system in any of embodiments 46-47, wherein the tuning profile of each speaker of the speaker system is selectable from a plurality of tuning profiles corresponding to a variety of perforated, partially acoustically transparent structures.

Embodiment 49: The audio-enhanced modular furniture system in any of embodiments 46-48, wherein the tuning profile of each speaker is selectable via a user interface on a mobile device, the mobile device selectively communicating with the at least one speaker controller, or the tuning profile of each speaker is selectable via a dedicated control console, the control console selectively communicating with at least one speaker controller, or the tuning profile of each speaker is selectable via a dedicated remote controller, the remote controller selectively communicating with at least one speaker controller.

Embodiment 50: The audio-enhanced modular furniture system in any of embodiments 46-49, wherein the at least one speaker controller comprises a plurality of dedicated speaker controllers, each dedicated speaker controller dedicated to an individual speaker of the speaker system; and wherein: the tuning profile of each speaker is separately selectable via a user interface on a mobile device, the mobile device selectively communicating with the dedicated speaker controller of each speaker, or the tuning profile of each speaker is selectable via a dedicated control console, the control console selectively communicating with the dedicated speaker controller of each speaker; or the tuning profile of each speaker is selectable via a dedicated remote controller, the remote controller selectively communicating with the dedicated speaker controller of each speaker.

Embodiment 51: A method of tuning a speaker to compensate for sound being emitted through a partially acoustically transparent material, the method comprising: selecting a baseline equalization for a speaker within an audio system, the baseline equalization comprising one or more target audio frequencies, each audio frequency having a selected baseline volume; configuring the audio system such that the speaker emits sound at an actual volume approximately equal to the selected baseline volume of each of the one or more target audio frequencies; covering the speaker with a selected partially acoustically transparent material; measuring a resultant volume of each of the one or more target audio frequencies as the speaker emits sound through the selected partially acoustically transparent material; calculating a differential volume defined by the difference between the resultant volume and the selected baseline volume of each of the one or more target audio frequencies; and reconfiguring the audio system such that the speaker emits sound through the selected partially acoustically transparent material according to the selected baseline equalization by adjusting the actual volume of each of the one or more target audio frequencies by a magnitude approximately equal to the differential volume of each respective target audio frequency.

Embodiment 52: The method of embodiment 51, further comprising: creating a tuning profile corresponding to the selected partially acoustically transparent material, the tuning profile including each differential volume calculated for each of the one or more target audio frequencies.

Embodiment 53: The method of embodiment in any of embodiments 51-52, further comprising: creating at least one additional tuning profile corresponding to at least one additional partially acoustically transparent material by repeating each step of the recited method with the selected partially acoustically transparent material being replaced by the at least one additional partially acoustically transparent material.

Embodiment 54: The method in any of embodiments 51-53, further comprising: tuning a furniture-integrated speaker according to the tuning profile, wherein the furniture-integrated speaker is mounted within a furniture assembly and covered by a partially acoustically transparent material that is identical or substantially similar to the selected partially acoustically transparent material.

Embodiment 55: The method in any of embodiments 51-54, further comprising at least one speaker controller configured to control the at least one speaker, wherein reconfiguring the audio system further comprises tuning the speaker through at least one speaker controller associated with a modular furniture assembly.

Embodiment 56: The method in any of embodiments 51-55, wherein the at least one speaker controller comprises a dedicated center console configured to control the audio system.

Embodiment 57: The method in any of embodiments 51-56, further comprising: uploading the tuning profile to an audio source, such that the audio output signal of the audio source to a speaker system connected thereto is adjusted according to the tuning profile.

Embodiment 58: An audio-enhanced furniture system as recited in any of embodiments 51-57, wherein the partially acoustically transparent material is at least one of a fabric material, a perforated leather material, or a perforated, solid, nondrapable rigid structure.

Embodiment 59: An audio-enhanced furniture system as recited in any of embodiments 51-58, wherein the partially acoustically transparent material is a perforated, solid, nondrapable rigid structure, and wherein a speaker system positioned within the furniture assembly, the speaker system comprising at least one speaker covered by the rigid structure, such that the at least one speaker is hidden from view, wherein the at least one speaker is configured to be tuned to compensate for variations in sound resulting from sound being emitted from the speakers through the partially acoustically transparent material by an adjustment to an equalization of one or more target audio frequencies or frequency bands emitted by the at least one speaker, said adjustment including adjusting volume of one or more target audio frequencies or frequency bands emitted by the at least one speaker; wherein the perforated, rigid structure comprises wood, veneer, plastic, polymer or metal; wherein the perforations in the perforated rigid structure are finely tuned perforations in the native surface of the rigid structure that are invisible or substantially invisible to an unaided eye such that the rigid structure is visually aesthetically pleasing; wherein the perforations are in a vertically oriented portion of the rigid structure; wherein the perforations are in a vertically oriented portion of the perforated rigid structure in order to be more resistant to environmental factors; wherein about 5% to about 70% of the portion of the perforated rigid structure adjacent the at least one speaker is perforated; wherein the thickness of the perforated, rigid structure adjacent the at least one speaker is in the range of about 0.25 millimeter to about 30 millimeters; and wherein the diameter of the perforations in the perforated rigid structure adjacent the at least one speaker is in the range of a micromillimeter to about 10 millimeters.

Embodiment 60: A method of tuning a speaker to compensate for loss of sound being emitted through a partially acoustically transparent material, the method comprising: providing a furniture assembly comprising a furniture body, a speaker supported by the furniture body, and having a partially acoustically transparent material covering the speaker; and tuning the speaker mounted within the furniture body to compensate for sound being emitted from the speaker through the perforated partially acoustically transparent structure by adjusting the volume of one or more target audio frequencies or frequency bands emitted by the speaker.

Embodiment 61: The method of embodiment 60, wherein tuning the speaker comprises reconfiguring an audio system associated with the speaker to adjust an actual volume of each of the one or more target audio frequencies or frequency bands by a magnitude approximately equal to a calculated differential volume of each of the one or more audio target frequencies or frequency bands.

Embodiment 62: The method in any of embodiments 60-61, wherein the calculated differential volume of each of the one or more target audio frequencies or frequency bands is equal to the difference between: (i) a baseline volume corresponding to sound emitted from the speaker, and (ii) a resultant volume corresponding to sound emitted from the speaker when covered with the partially acoustically transparent material.

Embodiment 63: The method in any of embodiments 60-62, further comprising: presenting a user with a plurality of tuning profiles corresponding to a plurality of different partially acoustically transparent materials, one of which is the partially acoustically transparent material; and in response to selection of one of the plurality of tuning profiles by the user, tuning the speaker to compensate for sound being emitted from the speaker through the partially acoustically transparent material to which the selected tuning profile corresponds.

Embodiment 64: The method in any of embodiments 60-63, wherein the speaker being separately tunable by separate selection of one of the plurality of tuning profiles.

Embodiment 65: The method in any of embodiments 60-64, wherein the plurality of tuning profiles is presented and selectable via a user interface on a mobile device.

Embodiment 66: The method in any of embodiments 60-65, wherein the plurality of tuning profiles is presented and selectable via a dedicated console associated with the speaker system.

Embodiment 67: The method in any of embodiments 60-66, wherein tuning the speaker comprises adjusting a signal transmitted from an audio source to the speaker.

Embodiment 68: The method in any of embodiments 60-67, further comprising the speaker controller directly associated with the speaker, the speaker controller configured to tune the speaker independent of signals transmitted to the speaker by an audio source.

Embodiment 69: The method in any of embodiments 60-68, wherein the one or more target audio frequencies or frequency bands are adjusted by increasing an actual volume of each of the one or more target audio frequencies or frequency bands by a magnitude up to about 25 decibels.

Embodiment 70: The method in any of embodiments 60-69, wherein each of the one or more target audio frequencies or frequency bands are adjusted by a magnitude between about 1 decibel and about 25 decibels.

Embodiment 71: The method in any of embodiments 60-70, wherein the one or more target audio frequencies or frequency bands are adjusted by increasing an actual volume of each of the one or more target audio frequencies or frequency bands by a magnitude up to about 21 decibels.

Embodiment 72: The method in any of embodiments 60-71, wherein each of the one or more target audio frequencies or frequency bands are adjusted by a magnitude between about 1 decibel and about 21 decibels.

Embodiment 73: The method in any of embodiments 60-72, wherein the one or more target audio frequencies or frequency bands are adjusted by increasing an actual volume of each of the one or more target audio frequencies or frequency bands by a magnitude up to about 16 decibels.

Embodiment 74: The method in any of embodiments 60-73, wherein each of the one or more target audio frequencies or frequency bands are adjusted by a magnitude between about 1 decibel and about 16 decibels.

Embodiment 75: The method in any of embodiments 60-74, wherein at least one of the one or more target audio frequencies or frequency bands is below 1000 Hz and is adjusted by a magnitude between about 1 decibel and about 8 decibels.

Embodiment 76: The method in any of embodiments 60-75, wherein the at least one target audio frequency or frequency band below 1000 Hz is adjusted by a magnitude between about 1 decibel and about 7 decibels.

Embodiment 77: The method in any of embodiments 60-76, wherein the at least one target audio frequency or frequency band below 1000 Hz is adjusted by a magnitude between about 1 decibel and about 6 decibels.

Embodiment 78: The method in any of embodiments 60-77, wherein the at least one target audio frequency of frequency band below 1000 Hz is adjusted by a magnitude between about 1 decibel and about 5 decibels.

Embodiment 79: The method in any of embodiments 60-78, wherein the at least one target audio frequency of frequency band below 1000 Hz is adjusted by a magnitude between about 1 decibel and about 4 decibels.

Embodiment 80: The method in any of embodiments 60-79, wherein the at least one target audio frequency of frequency band below 1000 Hz is adjusted by a magnitude between about 1 decibel and about 3 decibels.

Embodiment 81: The method in any of embodiments 60-80, wherein the at least one target audio frequency of frequency band below 1000 Hz is adjusted by a magnitude between about 1 decibel and about 2 decibels.

Embodiment 82: The method in any of embodiments 60-81, wherein the one or more target audio frequencies or frequency bands are adjusted by multiplying an actual volume of each of the one or more target audio frequencies or frequency bands by a factor from about 1 to about 1.3.

Embodiment 83: The method in any of embodiments 60-82, wherein the one or more target audio frequencies or frequency bands are adjusted by multiplying an actual volume of each of the one or more target audio frequencies or frequency bands by a factor from about 1 to about 1.25.

Embodiment 84: The method in any of embodiments 60-83, wherein the one or more target audio frequencies or frequency bands are adjusted by multiplying an actual volume of each of the one or more target audio frequencies or frequency bands by a factor from about 1 to about 1.2.

Embodiment 85: The method in any of embodiments 60-84, wherein the one or more target frequencies or frequency bands comprises at least four target frequencies or frequency bands.

Embodiment 86: The method in any of embodiments 60-85, wherein two or more of the at least four target frequencies or frequency bands are below 1000 Hz and are each adjusted by increasing an actual volume thereof by a magnitude from about 1 decibel to about 8 decibels.

Embodiment 87: The method in any of embodiments 60-86, wherein two or more of the at least four target frequencies or frequency bands are above 1000 Hz and are each adjusted by increasing an actual volume thereof by a magnitude from about 1 decibel to about 25 decibels.

Embodiment 88: The method in any of embodiments 60-87, wherein a magnitude of the adjustment of the equalization of one or more target audio frequencies or frequency bands depends on a selected volume of the speaker system.

Embodiment 89: An audio-enhanced furniture system as recited in any of embodiments 60-88, wherein the partially acoustically transparent material is at least one of a fabric material, a perforated leather material, or a perforated, solid, nondrapable rigid structure.

Embodiment 90: An audio-enhanced furniture system as recited in any of embodiments 60-89, wherein the partially acoustically transparent material is a perforated, solid, nondrapable rigid structure, and wherein a speaker system positioned within the furniture assembly, the speaker system comprising at least one speaker covered by the rigid structure, such that the at least one speaker is hidden from view, wherein the at least one speaker is configured to be tuned to compensate for variations in sound resulting from sound being emitted from the speakers through the partially acoustically transparent material by an adjustment to an equalization of one or more target audio frequencies or frequency bands emitted by the at least one speaker, said adjustment including adjusting volume of one or more target audio frequencies or frequency bands emitted by the at least one speaker; wherein the perforated, rigid structure comprises wood, veneer, plastic, polymer or metal; wherein the perforations in the perforated rigid structure are finely tuned perforations in the native surface of the rigid structure that are invisible or substantially invisible to an unaided eye such that the rigid structure is visually aesthetically pleasing; wherein the perforations are in a vertically oriented portion of the rigid structure; wherein the perforations are in a vertically oriented portion of the perforated rigid structure in order to be more resistant to environmental factors; wherein about 5% to about 70% of the portion of the perforated rigid structure adjacent the at least one speaker is perforated; wherein the thickness of the perforated, rigid structure adjacent the at least one speaker is in the range of about 0.25 millimeter to about 30 millimeters; and wherein the diameter of the perforations in the perforated rigid structure adjacent the at least one speaker is in the range of a micromillimeter to about 10 millimeters.

Embodiment 91: An audio-enhanced furniture system as recited in any of embodiments 3-42, 44-45, 46-50, 51-59, or 60-88, wherein the furniture assembly having a perforated, rigid structure comprises a mantle, fireplace mantle, television frame, television frame surround, nightstand, projector shroud, shroud covering, housing for blinds, valence, valence for blinds, valence shroud, or projector, or combinations thereof.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An audio-enhanced furniture system, comprising:

a speaker system comprising at least one speaker positionable within a furniture assembly including a structure having a material that is at least partially acoustically transparent and is perforated, nondrapable and rigid, the at least one speaker covered by the material, such that the at least one speaker is hidden from view, wherein the at least one speaker is configured to be tuned to compensate for sound being emitted from the at least one speaker through the material, the at least one speaker being tuned by selection from a plurality of tuning profiles corresponding to a material type of the material, a perforation amount of the material, and one or more thicknesses of the material.

2. The audio-enhanced furniture system as recited in claim 1, wherein the material type comprises at least one of wood, veneer, plastic, polymer or metal.

3. The audio-enhanced furniture system as recited in claim 1, wherein the perforation amount corresponds to finely tuned perforations in a surface of the material.

4. The audio-enhanced furniture system as recited in claim 1, wherein the speaker system is tuned by boosting one or more select frequencies to compensate for attenuation of the one or more select frequencies as sound from the speaker system is emitted through the material.

5. The audio-enhanced furniture system as recited in claim 1, wherein perforations in the material are disposed in a vertical orientation.

6. The audio-enhanced furniture system of claim 1, further comprising at least one speaker controller in communication with the at least one speaker, the at least one speaker controller configured to control tuning of the at least one speaker, wherein the at least one speaker controller is selectively controlled by at least one of a mobile device, a remote controller, or a console controller.

7. The audio-enhanced furniture system of claim 1, wherein the furniture assembly comprises a table, coffee table, end table, side table, cupboard, door, credenza, console, sideboard, cabinet, bookcase, desk, bed frame, or combinations thereof.

8. The audio-enhanced furniture system of claim 1, wherein about 5% to about 70% of a portion of the structure adjacent the at least one speaker is perforated.

9. The audio-enhanced furniture system of claim 1, wherein about 10% to about 60% of a portion of the structure adjacent the at least one speaker is perforated.

10. The audio-enhanced furniture system of claim 1, wherein about 50% to about 60% of a portion of the structure adjacent the at least one speaker is perforated.

11. The audio-enhanced furniture system of claim 1, wherein about 10% to about 30% of a portion of the structure adjacent the at least one speaker is perforated.

12. The audio-enhanced furniture system of claim 1, wherein a thickness of a portion of the structure adjacent the at least one speaker is in a range of about 0.25 millimeter to about 30 millimeters.

13. The audio-enhanced furniture system of claim 1, wherein a thickness of a portion of the structure adjacent the at least one speaker is in a range of about 0.5 millimeter to about 20 millimeters.

14. The audio-enhanced furniture system of claim 1, wherein a thickness of a portion of the structure adjacent the at least one speaker is in a range of about 1 millimeter to about 10 millimeters.

15. The audio-enhanced furniture system of claim 1, wherein a thickness of a portion of the structure adjacent the at least one speaker is in a range of about 1 millimeter to about 2 millimeters.

16. The audio-enhanced furniture system of claim 1, wherein a diameter of individual perforations in the structure adjacent the at least one speaker is in a range of a micromillimeter to about 10 millimeters.

17. The audio-enhanced furniture system of claim 1, wherein a diameter of individual perforations in the structure adjacent the at least one speaker is in a range of about 0.1 millimeter to about 10 millimeters.

18. The audio-enhanced furniture system of claim 1, wherein a diameter of individual perforations in the structure adjacent the at least one speaker is in a range of about 0.1 millimeter to about 5 millimeters.

19. The audio-enhanced furniture system of claim 1, wherein a diameter of individual perforations in the structure adjacent the at least one speaker is in a range of about 0.5 millimeter to about 1 millimeter.

20. The audio-enhanced furniture system of claim 1, wherein about 5% to about 70% of a portion of the structure adjacent the at least one speaker is perforated and about 95% to about 30% of the portion of the structure adjacent the at least one speaker is solid, unperforated material, wherein a thickness of a portion of the structure adjacent the at least one speaker is in a range of about 0.25 millimeter to about 30 millimeters, and wherein a diameter of individual perforations in the structure adjacent to the at least one speaker is in a range of a micromillimeter to about 10 millimeters.

21. The audio-enhanced furniture system of claim 1, wherein about 5% to about 70% of a portion of the structure adjacent the at least one speaker includes perforations, wherein a thickness of the portion of the structure adjacent the at least one speaker is in a range of about 0.25 millimeter to about 30 millimeters, and wherein a diameter of each of the perforations in the structure adjacent to the at least one speaker is in a range of about 0.1 millimeter to about 10 millimeters.

22. The audio-enhanced furniture system of claim 1, wherein about 30% to about 60% of a portion of the structure adjacent to the at least one speaker includes perforations, wherein a thickness of the portion of the structure adjacent to the at least one speaker is in a range of about 1 millimeter to about 2 millimeters, and wherein a diameter of each of the perforations in the structure adjacent to the at least one speaker is in a range of about 0.25 millimeter to about 1 millimeter.

23. The audio-enhanced furniture system of claim 1, wherein about 50% to about 60% of a portion of the structure adjacent the at least one speaker includes perforations, wherein a thickness of the portion of the structure adjacent the at least one speaker is in a range of about 1 millimeter to about 2 millimeters, and wherein a diameter of each of the perforations in the structure adjacent the at least one speaker is in a range of a about 0.5 millimeter to about 1 millimeter.

24. The audio-enhanced furniture system as recited in claim 1, wherein the at least one speaker is configured to be tuned to compensate for variations in sound resulting from one or more sounds being emitted from the at least one speaker through the material by an adjustment to an equalization of one or more target audio frequencies or frequency bands emitted by the at least one speaker.

25. The audio-enhanced furniture system of claim 24, wherein tuning of the at least one speaker comprises reconfiguring an audio system associated with the at least one speaker to adjust an actual volume of each of the one or more target audio frequencies or frequency bands by a magnitude corresponding to a calculated differential volume of each of the one or more target audio frequencies or frequency bands, wherein the calculated differential volume of each of the one or more target audio frequencies or frequency bands is equal to a difference between a baseline volume corresponding to sound emitted from the at least one speaker and a resultant volume corresponding to sound emitted from the at least one speaker when covered with the structure, wherein the speaker system is configured to present a plurality of tuning profiles corresponding to a plurality of different structures, in response to selection of one of the plurality of tuning profiles, tuning the at least one speaker to compensate for sound being emitted from the at least one speaker through the structure to which the selected one of the plurality of tuning profiles corresponds, and wherein the at least one speaker is configured to be separately tunable by a separate selection of one of the plurality of tuning profiles.

26. An audio-enhanced furniture system, comprising:

a speaker system positionable within a furniture assembly having a solid, nondrapable, structure including perforations in a surface of the structure, the speaker system comprising at least one speaker covered by the structure, wherein the at least one speaker is configured to be tuned to compensate for sound being emitted from the at least one speaker through the structure by selection from a plurality of tuning profiles corresponding to a material type of the structure, a perforation amount of the structure, and one or more thicknesses of the structure;

wherein the perforations are in a vertically oriented portion of the rigid-structure;

wherein about 5% to about 70% of a portion of the structure adjacent to the at least one speaker includes the perforations;

wherein a thickness of the structure adjacent to the at least one speaker is in a range of about 0.25 millimeter to about 30 millimeters, and wherein a diameter of each of the perforations in the structure adjacent to the at least one speaker is in a range of a micromillimeter to about 10 millimeters.

27. The audio-enhanced furniture system of claim 26, wherein about 50% to about 60% of the portion of the structure adjacent the at least one speaker is perforated, wherein the thickness of the portion of the structure adjacent the at least one speaker is in a range of about 1 millimeter to about 2 millimeters, and wherein the diameter of each of the perforations in the structure adjacent to the at least one speaker is in a range of about 0.5 millimeters to about 1 millimeter.

28. An audio-enhanced furniture system, comprising:

a speaker system positionable within a furniture assembly having a furniture body comprising one or more structures, the one or more structures being perforated, solid, nondrapable, and rigid, the speaker system comprising a plurality of speakers mounted within the furniture body and being hidden from view by the one or more structures; and at least one speaker controller configured to control each speaker of the plurality of speakers, wherein each speaker of the plurality of speakers is configured to be tuned through the at least one speaker controller, to compensate for variations in sound resulting from sound being emitted from each speaker through the one or more structures, by an adjustment to an equalization of at least one of one or more target audio frequencies or one or more frequency bands emitted by each speaker, the adjustment including adjusting volume of at least one of the one or more target audio frequencies or the one or more frequency bands emitted by each speaker, wherein about 5% to about 70% of a portion of the one or more structures adjacent each speaker is perforated, wherein a thickness of the one or more structures adjacent each speaker is in a range of about 0.25 millimeters to about 30 millimeters, and wherein each speaker is configured to be tuned by selection from a plurality of tuning profiles corresponding to a material type of the one or more structures, a perforation amount of the one or more structures, and one or more thicknesses of the one or more structures.

* * * * *